US011132120B2

(12) United States Patent
Lemay

(10) Patent No.: US 11,132,120 B2
(45) Date of Patent: *Sep. 28, 2021

(54) DEVICE, METHOD, AND GRAPHICAL USER INTERFACE FOR TRANSITIONING BETWEEN USER INTERFACES

(71) Applicant: Apple Inc., Cupertino, CA (US)

(72) Inventor: Stephen O. Lemay, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/399,930

(22) Filed: Apr. 30, 2019

(65) Prior Publication Data
US 2019/0258377 A1 Aug. 22, 2019

Related U.S. Application Data

(63) Continuation of application No. 14/291,601, filed on May 30, 2014, now Pat. No. 10,282,083.
(Continued)

(51) Int. Cl.
G06F 3/0488 (2013.01)
G06F 3/01 (2006.01)
(Continued)

(52) U.S. Cl.
CPC ............ G06F 3/0488 (2013.01); G06F 3/016 (2013.01); G06F 3/0482 (2013.01);
(Continued)

(58) Field of Classification Search
CPC ........................... G06F 3/0488; G06F 3/04817
(Continued)

(56) References Cited

U.S. PATENT DOCUMENTS 6,252,596 B1 * 6/2001 Garland .................. G06F 9/453
715/810
7,479,949 B2 1/2009 Jobs et al.
(Continued)

FOREIGN PATENT DOCUMENTS

GB        2 237 486 A       5/1991
WO   WO-2005073837 A1 *   8/2005   ........... H04N 21/482
WO    WO 2011/100623 A2    8/2011

OTHER PUBLICATIONS

Teague, Jason. "CSS Transitions 101."Webdesigner Depot RSS, Jan. 21, 2020, www.webdesignerdepot.com/2010/01/css-transitions-101/. (Year: 2010).*

(Continued)

Primary Examiner — Stephen S Hong
Assistant Examiner — Broderick C Anderson
(74) Attorney, Agent, or Firm — Morgan, Lewis & Bockius LLP

(57) ABSTRACT

An electronic device displays a text object that includes first text. While continuously displaying the text object, the device, in response to detecting a user input, varies one or more properties, other than position, of the continuously displayed text object from a first set of display property values to a second set of display property values through a plurality of intermediate states, the plurality of intermediate states including: a first intermediate state in which the first text has a first intermediate set of display property values that are between the first set of display property values and the second set of display property values; and a second intermediate state in which the first text has a second intermediate set of display property values that are between the first set of intermediate display values and the second set of display property values.

45 Claims, 38 Drawing Sheets

Related U.S. Application Data

(60) Provisional application No. 61/832,901, filed on Jun. 9, 2013.

(51) Int. Cl.
    *G06F 3/0482*     (2013.01)
    *G06F 3/0481*     (2013.01)
    *G06F 40/109*     (2020.01)

(52) U.S. Cl.
    CPC ...... *G06F 3/04817* (2013.01); *G06F 3/04883* (2013.01); *G06F 3/04886* (2013.01); *G06F 40/109* (2020.01); *G06F 2203/014* (2013.01); *G06F 2203/04104* (2013.01); *G06F 2203/04105* (2013.01); *G06F 2203/04108* (2013.01); *G06F 2203/04808* (2013.01)

(58) Field of Classification Search
    USPC .................................................. 715/834, 269
    See application file for complete search history.

(56) References Cited

U.S. PATENT DOCUMENTS

| | | | |
|---|---|---|---|
| 8,291,349 B1 | 10/2012 | Park et al. | |
| 8,615,721 B2 * | 12/2013 | Hara | G06F 3/0482 715/838 |
| 9,547,436 B2 * | 1/2017 | Ohki | G06F 3/04883 |
| 2002/0080157 A1 | 6/2002 | Chickles et al. | |
| 2003/0095135 A1 * | 5/2003 | Kaasila | G06F 3/0481 345/613 |
| 2006/0230356 A1 | 10/2006 | Sauve et al. | |
| 2008/0165210 A1 | 7/2008 | Platzer et al. | |
| 2009/0007014 A1 | 1/2009 | Coomer et al. | |
| 2011/0117898 A1 | 5/2011 | Pereira et al. | |
| 2011/0202834 A1 * | 8/2011 | Mandryk | G06F 3/04883 715/701 |
| 2012/0240041 A1 | 9/2012 | Lim et al. | |
| 2013/0036382 A1 | 2/2013 | Yuan et al. | |
| 2013/0117365 A1 | 5/2013 | Padmanabhan et al. | |
| 2013/0125020 A1 | 5/2013 | Lee et al. | |
| 2014/0208263 A1 | 7/2014 | Maklouf | |
| 2014/0365882 A1 | 12/2014 | Lemay | |
| 2014/0365912 A1 | 12/2014 | Shaw et al. | |
| 2014/0365919 A1 | 12/2014 | Shaw et al. | |
| 2014/0365953 A1 | 12/2014 | Zambetti et al. | |

OTHER PUBLICATIONS

"CSS Transitions Module Level 3; W3C Working Draft Mar. 20, 2009"; W3C; <https://www.w3.org/TR/2009/WD-css3-transitions-20090320/> (Year: 2009).*

Wroblewski, Luke. "Touch Gesture Reference Guide." LukeW, Apr. 20, 2010, www.lukew.com/ff/entry.asp?1071. (Year: 2010).*

Android Developers, "Crossfading Two Views", WayBackMachine, <http://developer.android.com/training/animation/crossfade.html>, Nov. 4, 2012, 3 pages.

Jacobs, "Navigation Controllers and View Controller Hierarchies", https://code.tutsplus.com/tutorials/navigation-controllers-and-view-controler-hierarchies--mobile-14052, Dec. 21, 2012, 40 pages.

Rakesh, "WiFi Direct is Better Than Bluetooth for Sharing Files Between Android Devices," http://www.droidviews.com/wifi-direct-is-better-than-bluetooth-for-exchanging-files-between-android-devices, Mar. 7, 2013, 12 pages.

Richardson, "Attract Your Target: 7 Ways to Emphasize Type", <http://ndrichardson.com/blog/2012/03/20/attract-your-target-7-ways-to-emphasize_type/>, Apr. 27, 2012, 6 pages.

Teague, "CSS Transitions 101", https://www.webdesignerdepot.com/2010/01/css-transitions-101, Jan. 2010, 6 pages.

Wallen, "Five Useful Tips for Your Samsung Galaxy S III," TechRepublic, http:www.techrepublic.com/blog.smartphones/five-useful-tips-for-your-Samsung-Galaxy-S-III, Nov. 1, 2012, 12 pages.

YouTube, "How to Use an Apple iPhone: How to Change iPhone Settings", https://www.youtube.com/watch?v=zK6uYz4Inh8; Mar. 9, 2008, 2 pages.

Office Action, dated Feb. 3, 2016, received in U.S. Appl. No. 14/291,601 (5901), 22 pages.

Office Action, dated Sep. 9, 2016, received in U.S. Appl. No. 14/291,601 (5901), 24 pages.

Office Action, dated Nov. 16, 2017, received in U.S. Appl. No. 14/291,601 (5901), 24 pages.

Final Office Action, dated Jul. 13, 2018, received in U.S. Appl. No. 14/291,601 (5901), 24 pages.

Notice of Allowance, dated Dec. 28, 2018, received in U.S. Appl. No. 14/291,601 (5901), 8 pages.

Dutch Search Report, dated May 12, 2015, received in Dutch Patent Application No. 2012929, which corresponds with U.S. Appl. No. 14/290,973, 6 pages.

Dutch Search Report, dated May 12, 2015, received in Dutch Patent Application No. 2012928, which corresponds with U.S. Appl. No. 14/290,973, 4 pages.

International Search Report, dated Nov. 27, 2014, received in International Patent Application No. PCT/US2014/040398, which correponds with U.S. Appl. No. 14/290,973, 15 pages.

International Search Report, dated Feb. 23, 2015, received in International Patent Application No. PCT/US2014/038943, which correponds with U.S. Appl. No. 14/290,850, 16 pages.

\* cited by examiner

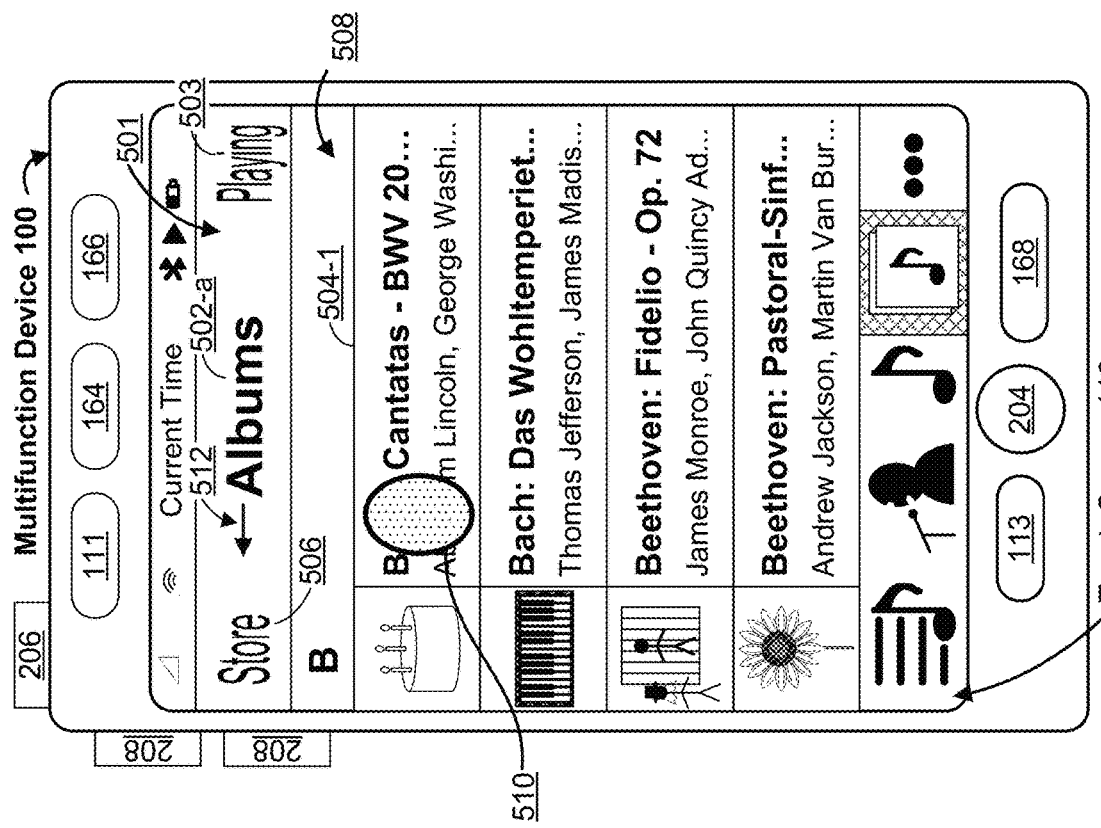
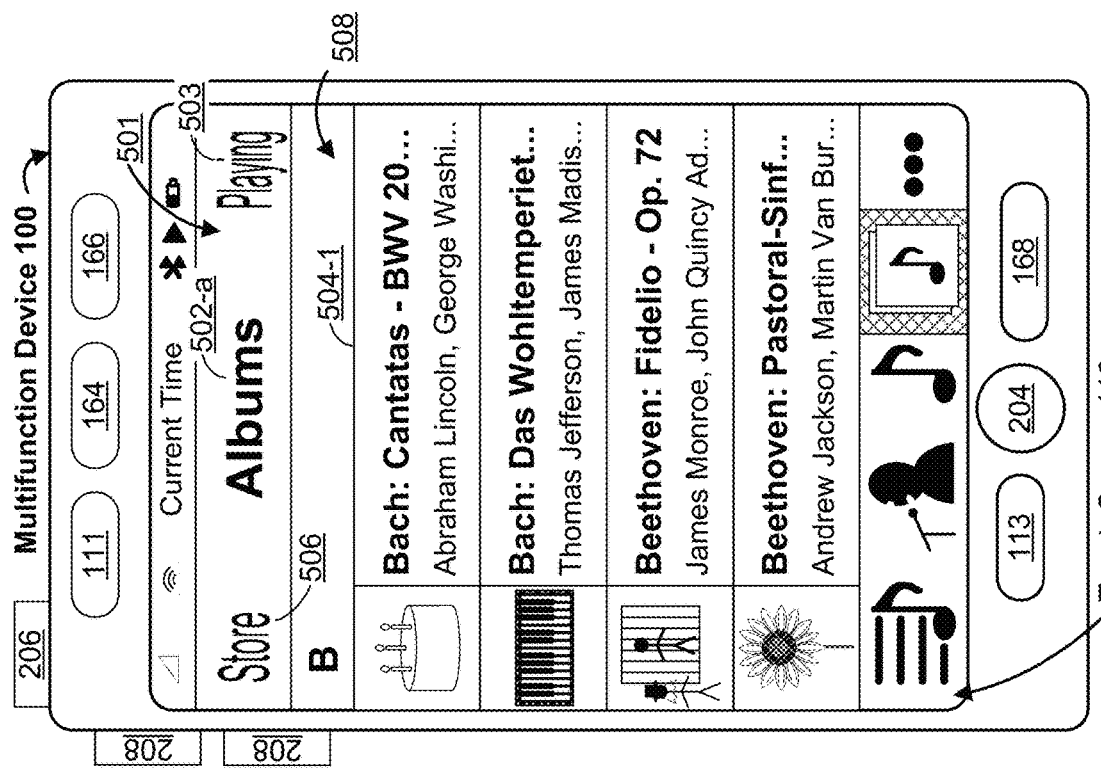
Figure 5B
Figure 5A

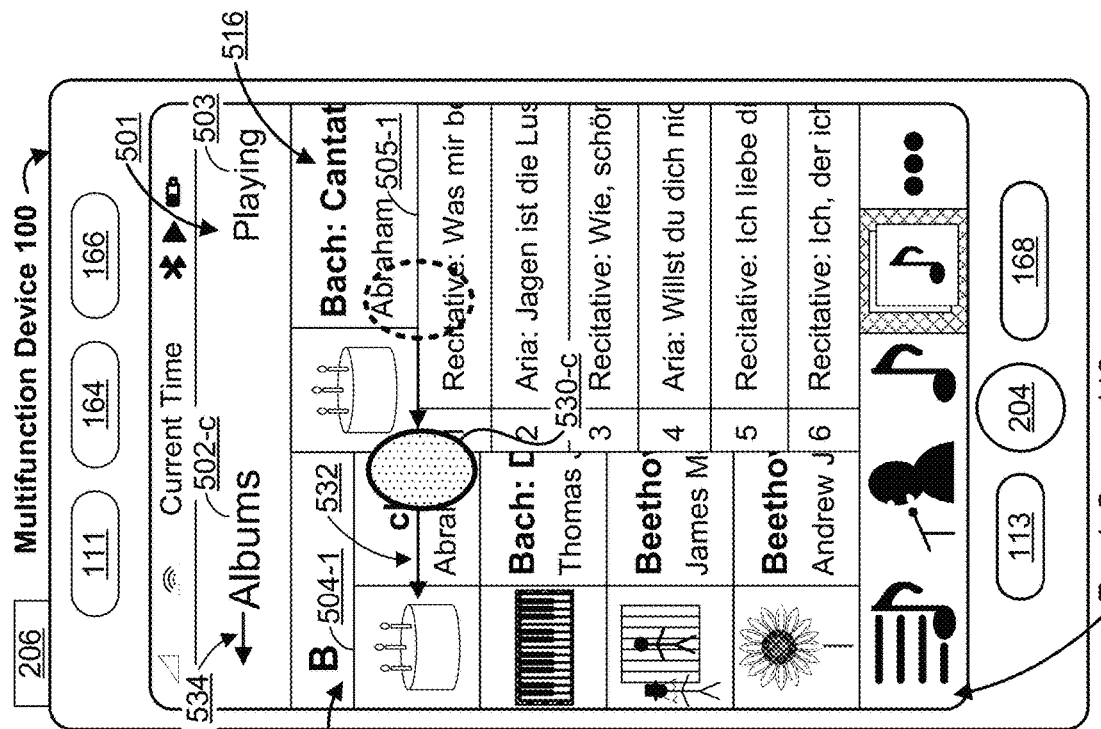
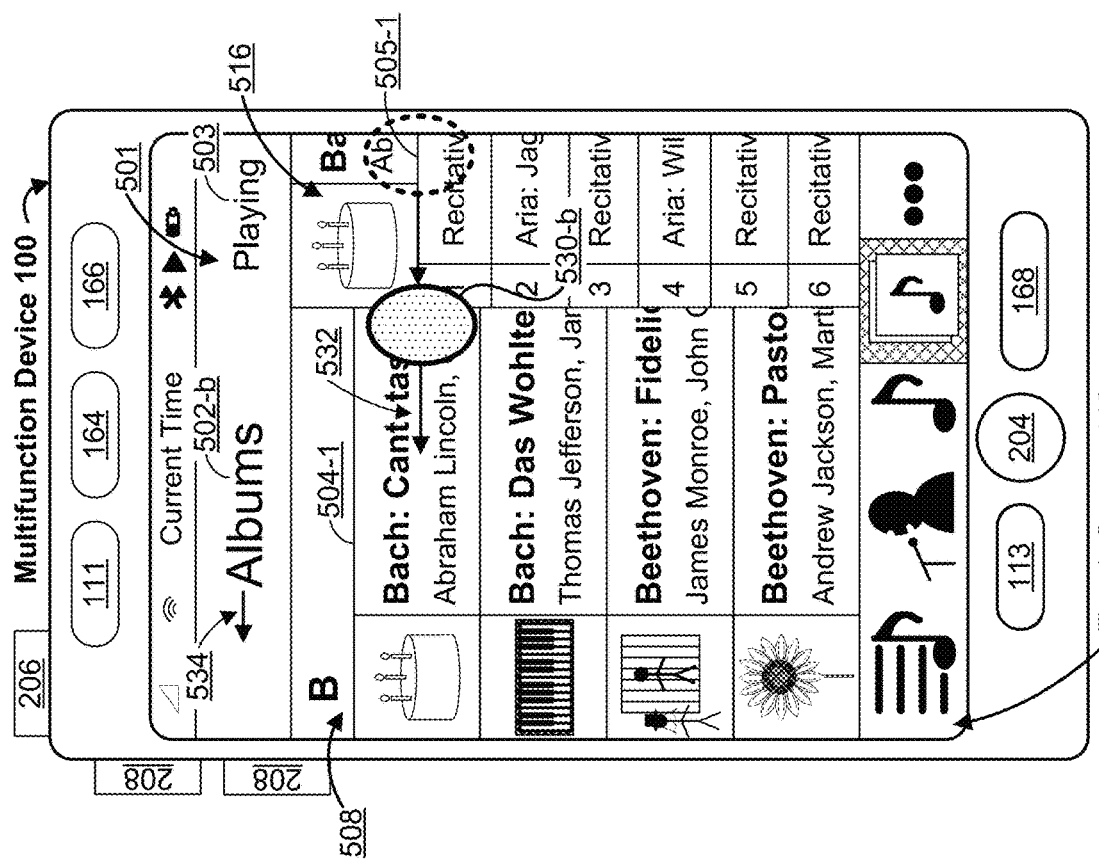
Figure 5V
Figure 5W

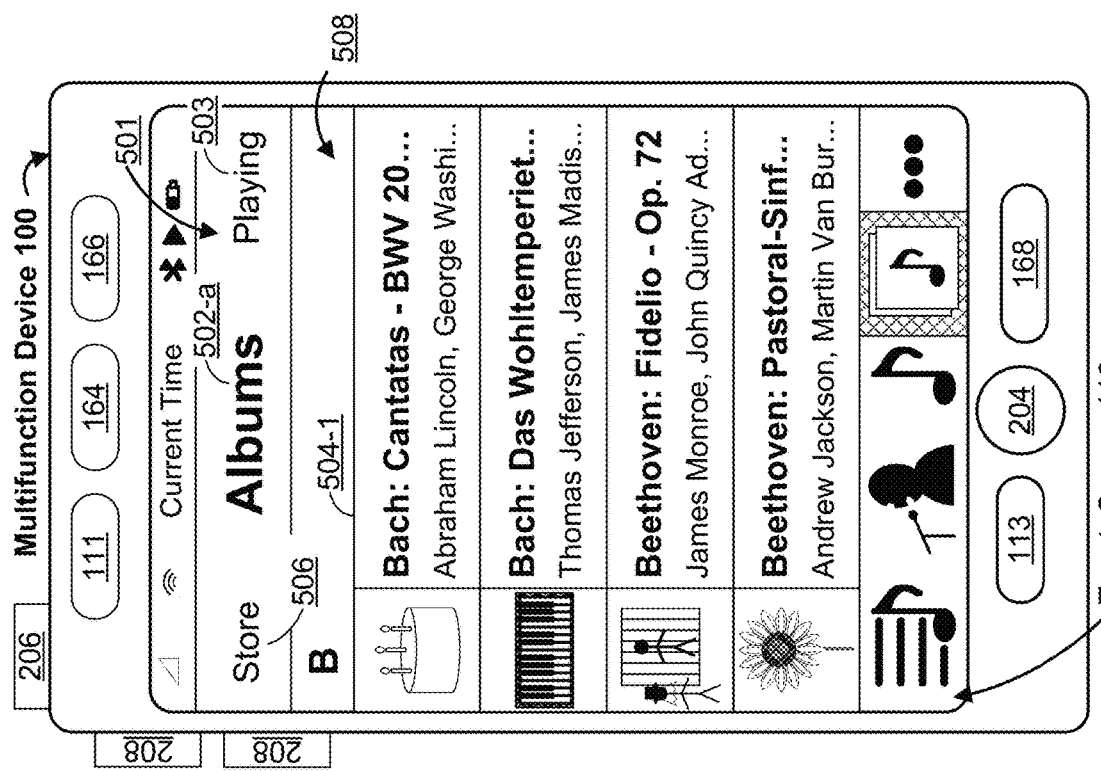
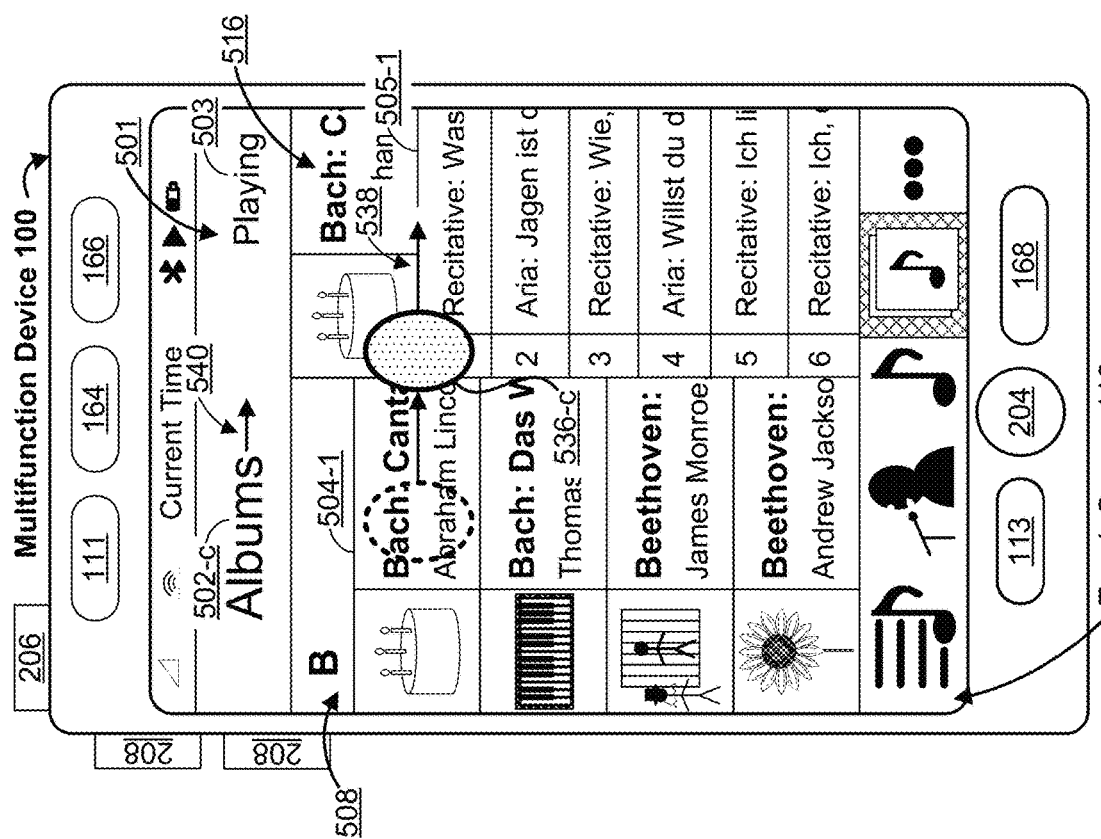

DEVICE, METHOD, AND GRAPHICAL USER INTERFACE FOR TRANSITIONING BETWEEN USER INTERFACES

RELATED APPLICATIONS

This application is a continuation of U.S. patent application Ser. No. 14/291,601, filed May 30, 2014, which claims priority to U.S. Provisional Patent Application No. 61/832,901, filed Jun. 9, 2013, each of which is incorporated by reference herein in its entirety.

TECHNICAL FIELD

This relates generally to electronic devices with touch-sensitive surfaces, including but not limited to electronic devices that detect inputs for transitioning between user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to navigate between related user interfaces (e.g., in a hierarchy of user interfaces).

Exemplary user interface hierarchies include groups of related user interfaces used for: organizing files and applications; storing and/or displaying digital images, editable documents (e.g., word processing, spreadsheet, and presentation documents), and/or non-editable documents (e.g., secured files and/or .pdf documents); recording and/or playing video and/or music; text-based communication (e.g., e-mail, texts, tweets, and social networking); voice and/or video communication (e.g., phone calls and video conferencing); and web browsing. A user will, in some circumstances, need to perform such user interface navigations in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).—

But methods for performing these navigations and animating the transition between related user interfaces in a user interface hierarchy are cumbersome and inefficient. For example, using a sequence of mouse-based inputs to navigate between two or more user interfaces is tedious and creates a significant cognitive burden on a user. In addition, these methods take longer than necessary, thereby wasting energy. This latter consideration is particularly important in battery-operated devices.

Additionally, abrupt transitions between different user interface elements can be distracting and jarring for users, which reduces the efficiency of the user when using the device.

SUMMARY

Accordingly, there is a need for electronic devices with faster, more efficient, intuitive, methods and interfaces for animating the transition when transitioning between user interfaces. Such methods and interfaces optionally complement or replace conventional methods for animating the transition when transitioning between user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at an electronic device with a display. The method includes: displaying first text at a first location on the display in a first user interface, the first text having a first set of display property values. The method also includes detecting an input that corresponds to a request to transition from the first user interface to a second user interface, where, in the second user interface: the first text is displayed at a second location on the display that is different from the first location, and the first text has a second set of display property values that are different from the first set of display property values. The method further includes, in response to detecting the input, transitioning from the first user interface to the second user interface, where transitioning from the first user interface to the second user interface includes: displaying continuous movement of the first text from the first location to the second location, and while displaying continuous movement of the first text from the first location to the second location, changing a respective display property values of the first text from the first set of display property values to the second set of display property values.

In accordance with some embodiments, an electronic device includes a display unit configured to display a first and a second user interface, and a processing unit coupled to the display unit. The processing unit is configured to enable display of first text at a first location on the display unit in a first user interface, the first text having a first set of display property values. The processing unit is also configured to detect an input that corresponds to a request to transition from enabling display of the first user interface to enabling display of a second user interface, where, in the second user interface: display of the first text is enabled at a second location on the display unit that is different from the first location, and the first text has a second set of display property values that are different from the first set of display property values. The processing unit is also configured to, in response to detecting the input, transition from enabling display of the first user interface to enabling display of the second user interface, where transitioning from enabling display of the first user interface to enabling display of the second user interface includes: enabling display of continuous movement of the first text from the first location to the second location, and while enabling display of continuous movement of the first text from the first location to the second location, enabling display of a change of a respective display property of the first text from the first set of display property values to the second set of display property values.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a display, optionally a touch-sensitive surface, optionally one or more sensors to detect intensity of contacts with the touch-sensitive surface, a memory, and one or more processors to execute one or more programs stored in the memory includes one or more of the elements displayed in any of the methods described above, which are updated in response to inputs, as described in any of the methods described above. In accordance with some embodiments, a computer readable storage medium has stored therein instructions which when executed by an electronic device with a display, optionally a touch-sensitive surface, and optionally one or more sensors to detect intensity of contacts with the touch-sensitive surface, cause the device to perform the operations of any of the methods referred described above. In accordance with some embodiments, an electronic device includes: a display, optionally a touch-sensitive surface, and optionally one or more sensors to detect intensity of contacts with the touch-sensitive surface; and means for performing the operations of any of the methods described above. In accordance with some embodiments, an information processing apparatus, for use in an electronic device with a display and a touch-sensitive surface, optionally one or more sensors to detect intensity of contacts with the touch-sensitive surface, includes means for performing the operations of any of the methods described above.

Thus, electronic devices with displays are provided with faster, more efficient methods and interfaces for animating the transition when transitioning between user interfaces, thereby increasing the effectiveness, efficiency, and user satisfaction with such devices. Such methods and interfaces may complement or replace conventional methods for animating the transition when transitioning between user interfaces.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
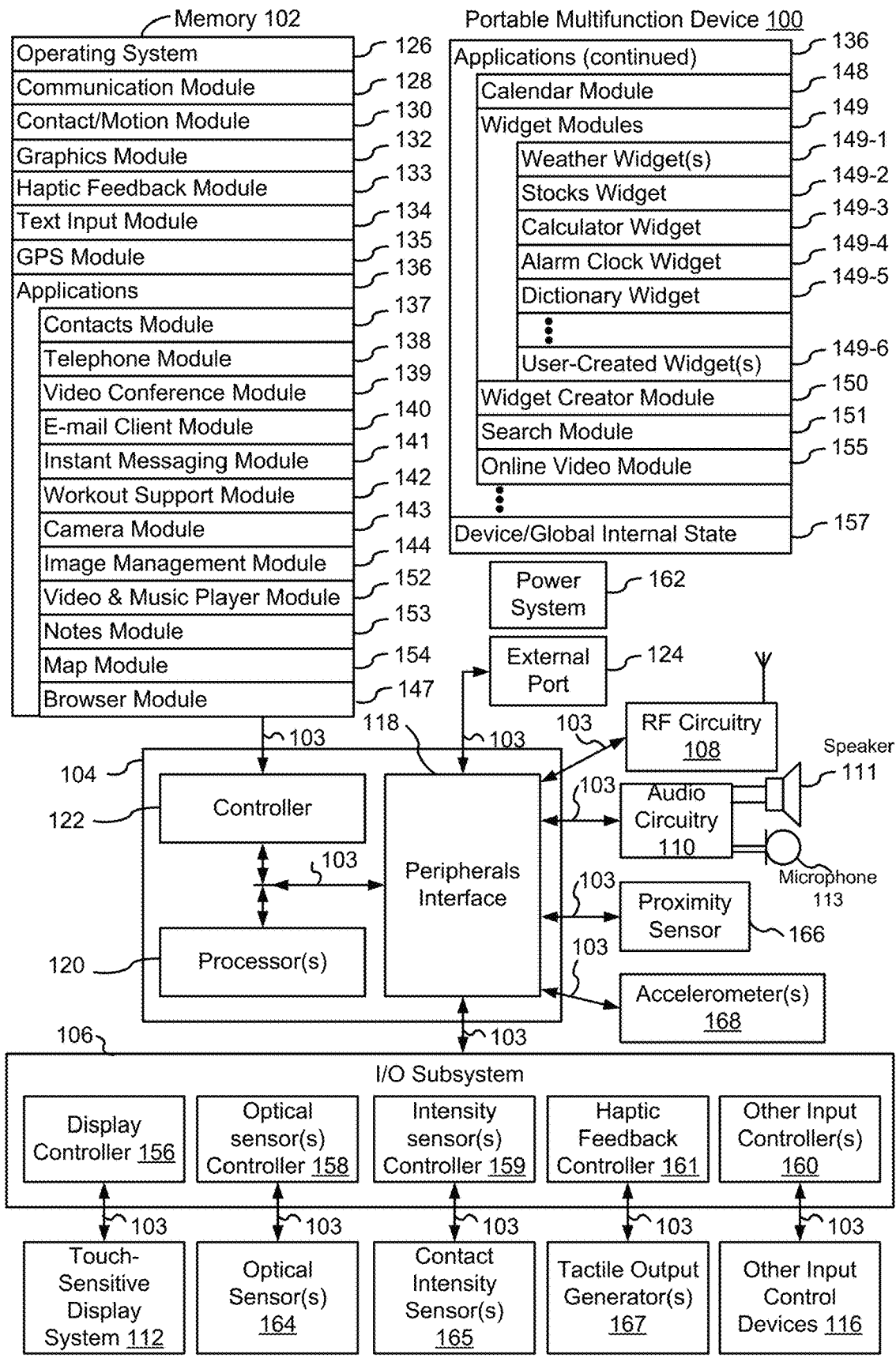
FIG. 1A is a block diagram illustrating a portable multifunction device with a touch-sensitive display in accordance with some embodiments.

Many electronic devices have hierarchies of related user interfaces associated with one or more applications such as image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. A user needs to navigate between different levels in a user interface hierarchy in order to access desired content. For example, in some cases, an application used to store, categorize, record, and/or play music files has a user interface hierarchy that includes a first user interface displaying a plurality of selectable representations of different music albums and a plurality of second user interfaces, each displaying selectable representations of songs on a respective album listed in the first user interface. When the user selects an album listed in the first user interface, the electronic device changes from the first user interface to the second user interface corresponding to the selected album. Thus, the input used to select the album from the first user interface (e.g., a mouse click, a contact on a touch-sensitive surface, or a gesture including movement of a contact or mouse click) serves as a user request to transition from the first user interface to the second user interface.

The way in which the electronic device transitions between a first user interface and a related second user interface in a user interface hierarchy affects the interaction between the user and the machine. In some methods for transitioning between a first user interface and a second user interface in a hierarchy of user interfaces, the operational continuity between the user interfaces is temporarily or permanently disrupted, for example, by a drastic change to the overall layout of the user interface, disappearance of a navigational control or control-associated region, appearance of a new navigational control and/or control-associated region, and/or the inability for the user to quickly navigate back to the previous user interface. In the embodiments described below, improved methods, devices, and graphical user interfaces are provided for animating the transition between a first user interface and a second user interface when transitioning between user interfaces (e.g., when navigating through selectable content on an electronic device).

In some embodiments described below, the improved methods, devices and graphical user interfaces simplify for the user the transition from a first user interface to a second user interface, especially when the transition proceeds via direct manipulation by the user, for example, by providing continuity between the first user interface and the second user interface. In some embodiments, this is achieved by displaying smooth, continuous transition of a first text used to describe content displayed in the first user interface into selectable text in the second user interface associated with a control allowing the user to navigate backwards in the corresponding the user interface hierarchy to reach the first user interface. In some embodiments, this is achieved by displaying the descriptive text in a region of the first user interface that is shared with the second user interface (e.g., in a status bar) and by affecting a continuous movement and change in one or more display properties of the text from a position associated with descriptive text in the first user interface to a position associated with a control operation in the second user interface. By maintaining the legibility of the text, the user is able to clearly read and identify a function associated with the text during the entirety of the transition. This is particularly helpful in situations where the transition is proceeding via direct user manipulation. Thus, the embodiments described below improve the user's ability to interact with the electronic device and more quickly access desired content stored within the device.

Below, FIGS. 1A-1B, 2, and 3 provide a description of exemplary devices. FIGS. 4A-4B and 5A-5EE illustrate exemplary user interfaces for animating the transition when transitioning between user interfaces. FIGS. 5FF-5NN illustrate exemplary relationships between user inputs, movement of first text on a display, and progress of display property change of first text on the display associated with animating the transition when transitioning between user interfaces. FIGS. 6A-6D are flow diagrams illustrating a method of animating the transition when transitioning between user interfaces. The user interfaces in FIGS. 5A-5EE and graphs illustrated in FIGS. 5FF-5NN are used to illustrate the processes in FIGS. 6A-6D.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer, optionally with a touch-sensitive surface (e.g., a touch screen display and/or a touch pad).

In the discussion that follows, an electronic device that includes a display and, optionally, a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
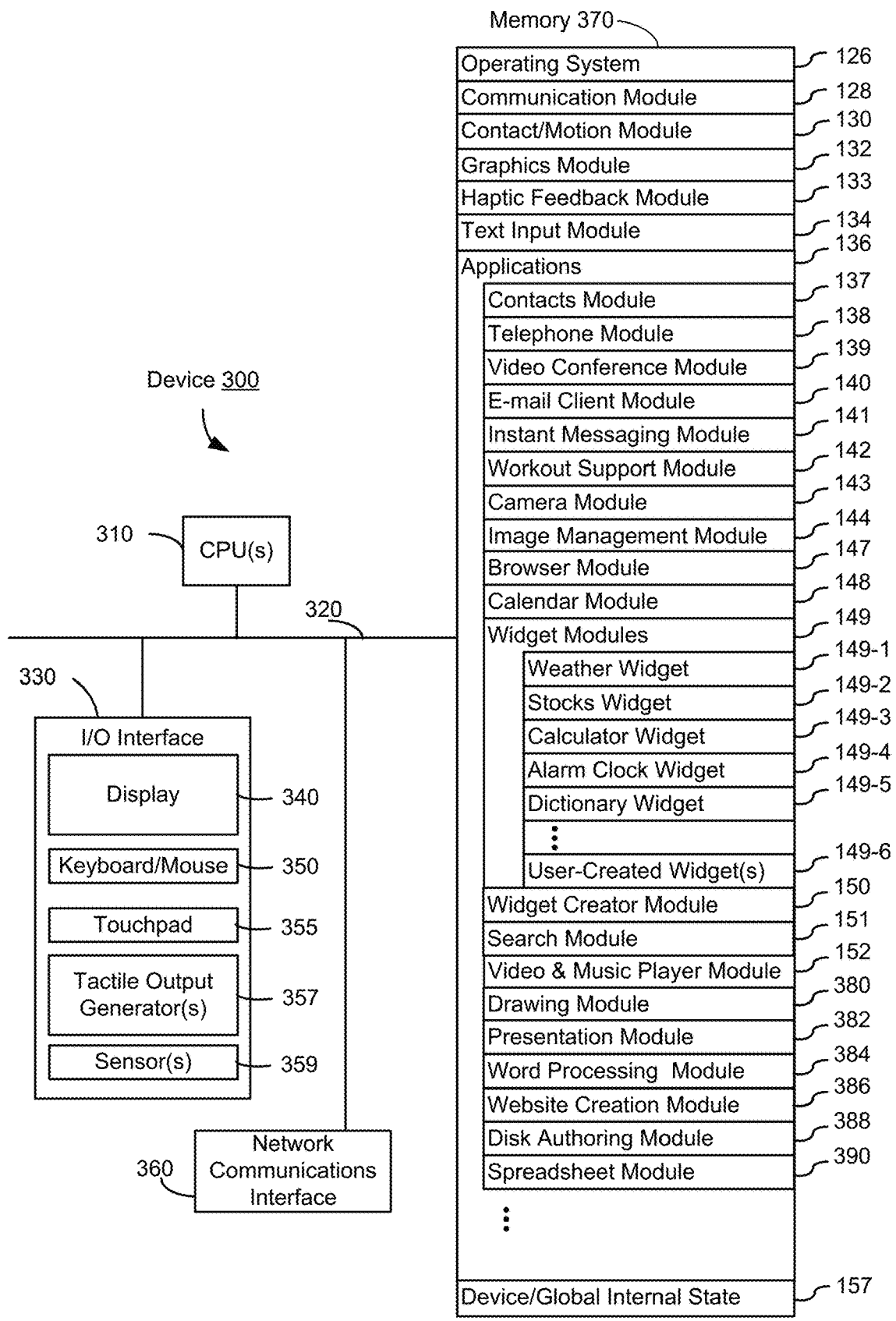
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
 contacts module 137 (sometimes called an address book or contact list);
 telephone module 138;
 video conferencing module 139;
 e-mail client module 140;
 instant messaging (IM) module 141;
 workout support module 142;
 camera module 143 for still and/or video images;
 image management module 144;
 browser module 147;
 calendar module 148;
 widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
 widget creator module 150 for making user-created widgets 149-6;
 search module 151;
 video and music player module 152, which is, optionally, made up of a video player module and a music player module;
 notes module 153;
 map module 154; and/or
 online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
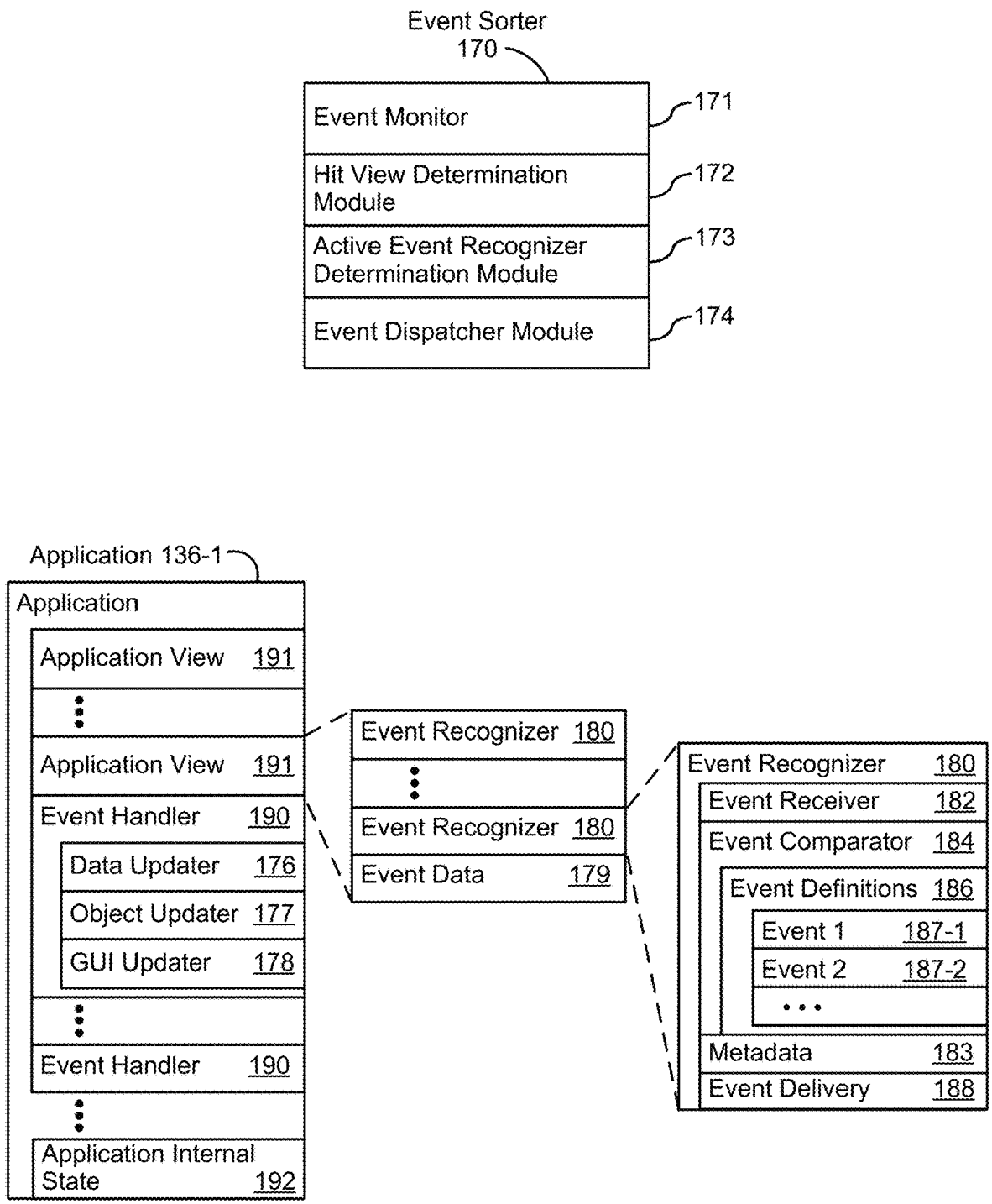
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
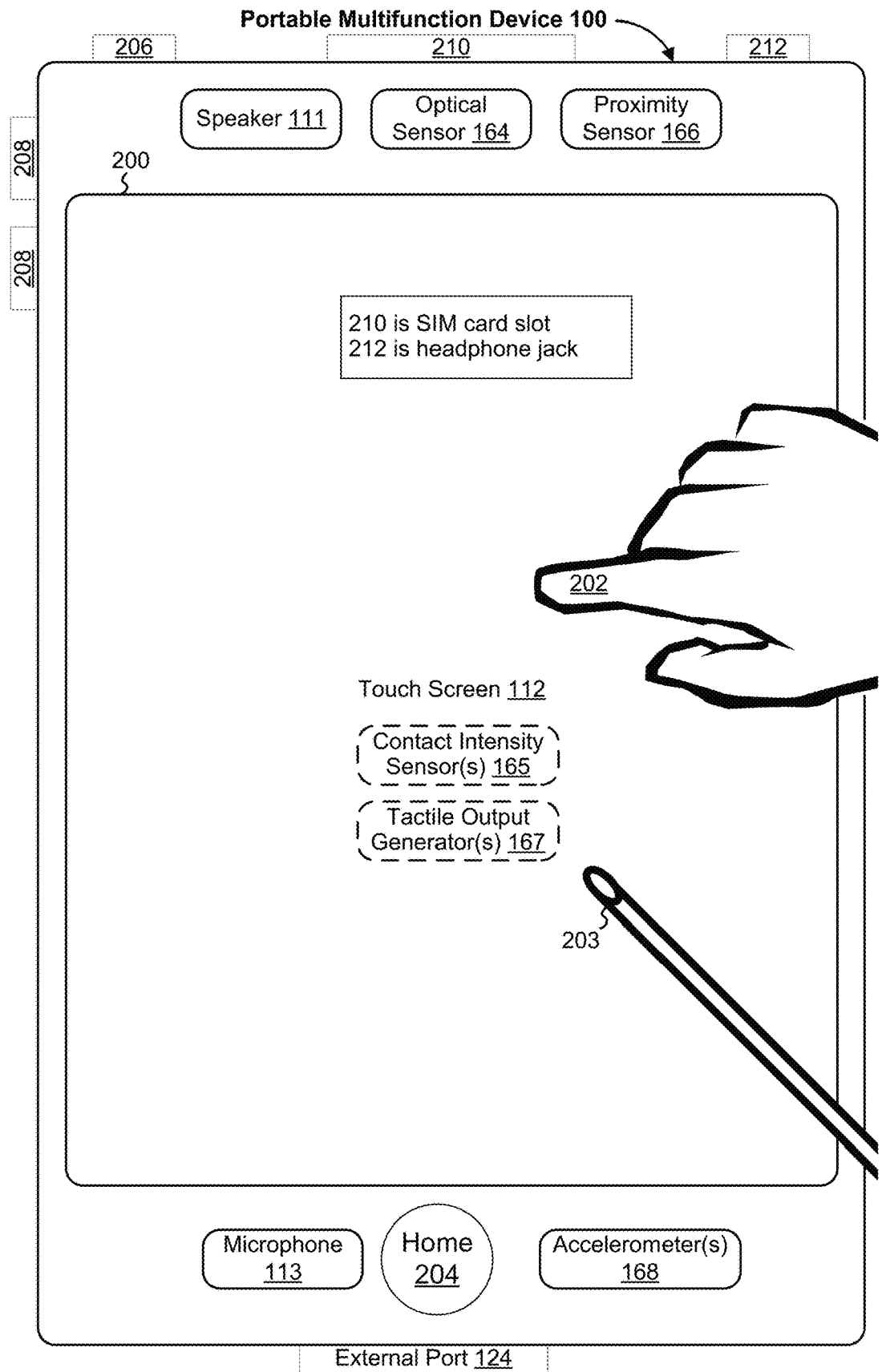
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
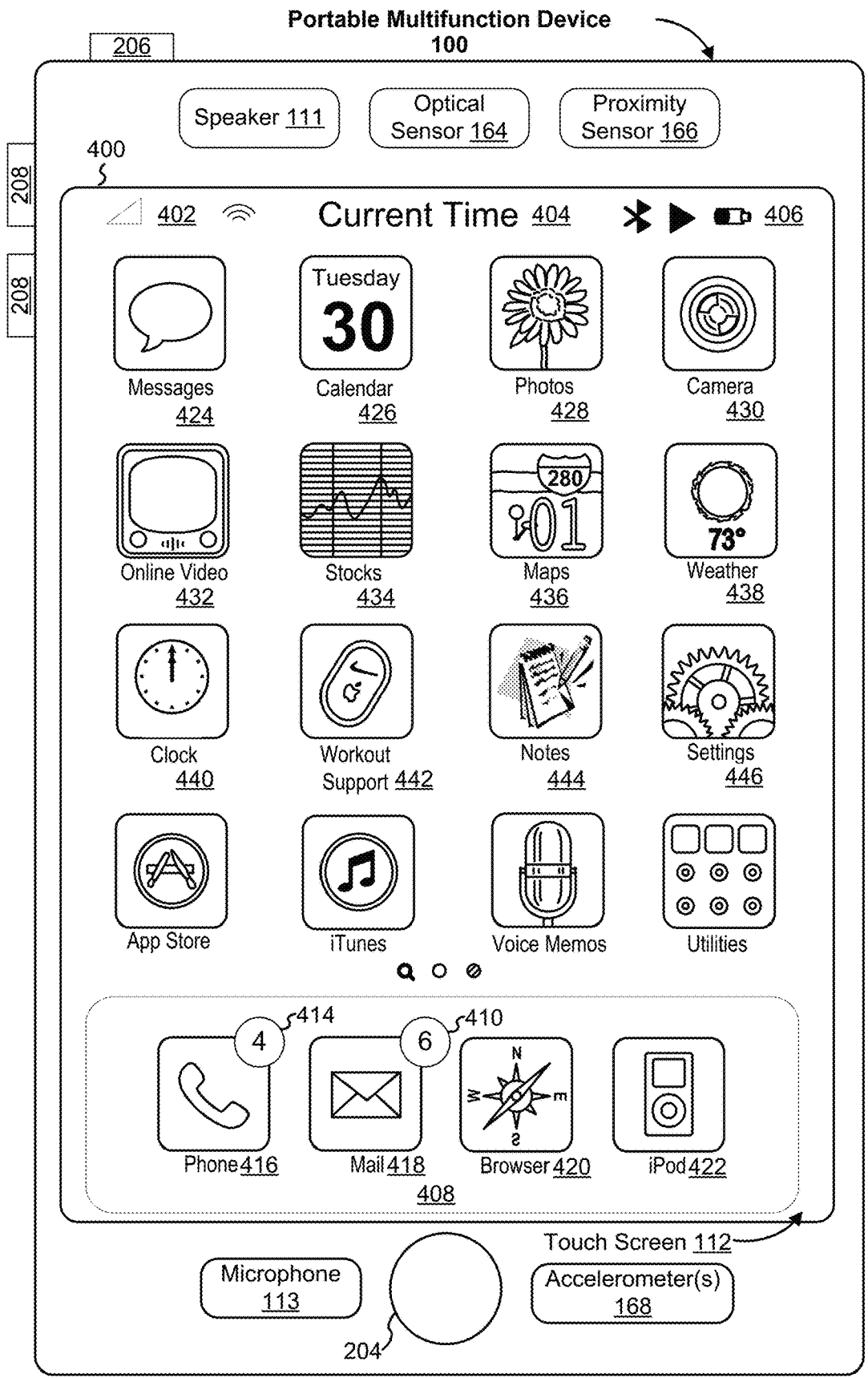
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Text;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video"
  - Icon 434 for stocks widget 149-2, labeled "Stocks;"
  - Icon 436 for map module 154, labeled "Map;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
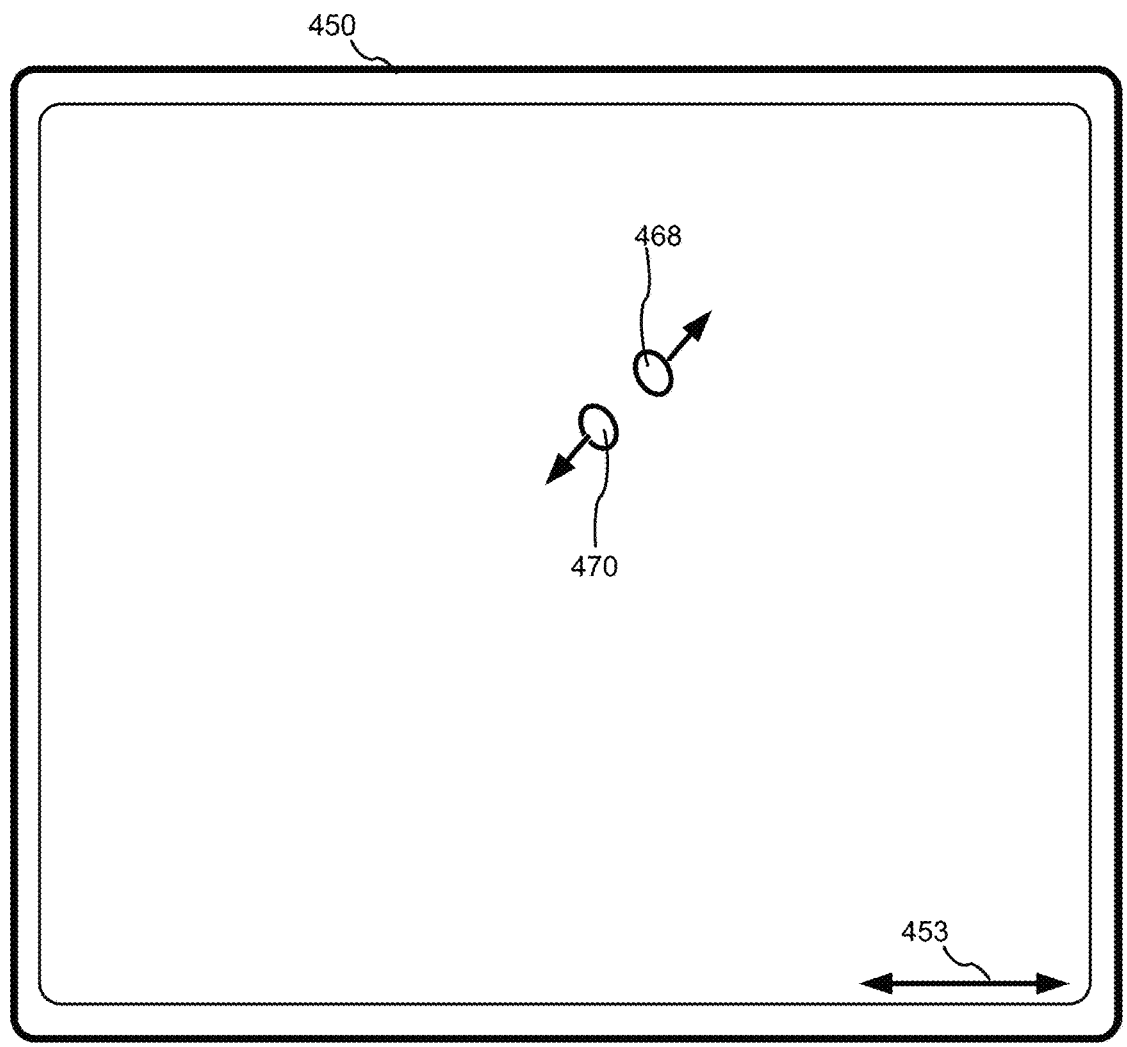
FIG. 4B illustrates an exemplary user interface for a multifunction device with a touch-sensitive surface that is separate from the display in accordance with some embodiments.
Figure 4B:
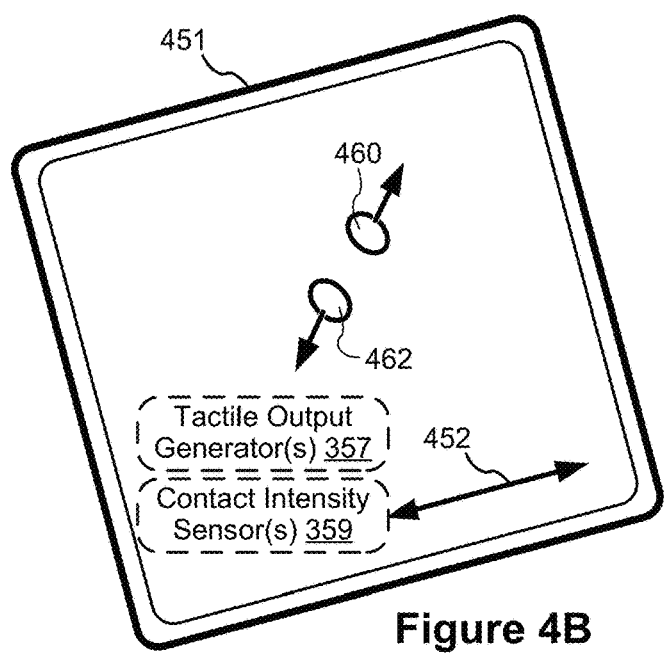

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

FIGS. 5FF-5NN described below include various diagrams that show the progress of movement of text, and change of text display properties relative to user inputs (e.g., contacts, finger tap gestures, finger swipe gestures) corresponding to requests to transition from a first user interface to a second user interface when transitioning between user interfaces. These diagrams are typically not part of the displayed user interface, but are provided to aid in the interpretation of the figures.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5EE illustrate exemplary user interfaces for animating the transition when transitioning between user interfaces in accordance with some embodiments. FIGS. 5FF-5NN illustrate graphs diagramming exemplary temporal and spatial relationships between user inputs, movement of text, and change of display properties of text when animating the transition when transitioning between user interfaces. The graphs in these figures are used to supplement the exemplary user interfaces illustrated in FIGS. 5A-5EE. The user interfaces and graphs in these figures are used to illustrate the processes described below, including the processes in FIGS. 6A-6D.

FIGS. 5A-5EE illustrate multifunction device 100 displaying one or both of first user interface 508 and second user interface 516 on touch screen 112. User interface 508 and second user interface 516 are related as different user interface hierarchy levels of an application being executed on multifunction device 100 (e.g., a music player application). In some circumstances, an application will have more than two different user interface hierarchy levels, and the steps described herein with reference to the first and second user interface also apply to switching between user interfaces that correspond to those user interface hierarchy levels. Status bar 501, displayed on touch screen 112, is common to both first user interface 508 and second user interface 516 and includes one or both of selectable control text (e.g., "Playing" text 503 in FIGS. 5A-5EE), associated with a selectable control for performing a respective operation, and descriptive text (e.g., "Bach: Contatas" text 514 in FIGS. 5C-5G, 5I-5J, 5L-5M, 5Q-5R, 5Y-5Z, and 5BB), not associated with a selectable control for performing a respective operation (e.g., text that describes content displayed in a content region of the current user interface).

In FIGS. 5A-5EE, first user interface 508 includes first text 502 (e.g., "Albums") displayed at first position 502-a on touch screen 112. First user interface 508 also includes a plurality of selectable user interface objects 504, corresponding to visual representations of musical albums (e.g., representation 504-1 of musical album "Bach: Cantatas—BWV 204 & 208"). User interface objects 504 are associated with a selectable control for changing the active user interface hierarchy from first user interface 508, displaying one or more selectable musical albums (e.g., "Bach: Cantatas—BWV 204 & 208"), to second user interface 516, displaying one or more selectable songs from the corresponding musical album (e.g., "Recitative: Was mir behagt, Ist Nur Die Muntre Jagd!").

In FIGS. 5A-5EE, second user interface 516 includes first text 502 (e.g., "Albums") displayed at second position 502-e on touch screen 112. Second user interface 516 also includes a plurality of selectable user interface objects 505, corresponding to visual representations of songs from the corresponding musical album (e.g., representation 505-1 of song "Recitative: Was mir behagt, Ist Nur Die Muntre Jagd!" from musical album "Bach: Cantatas—BWV 204 & 208").

Figure 5C:
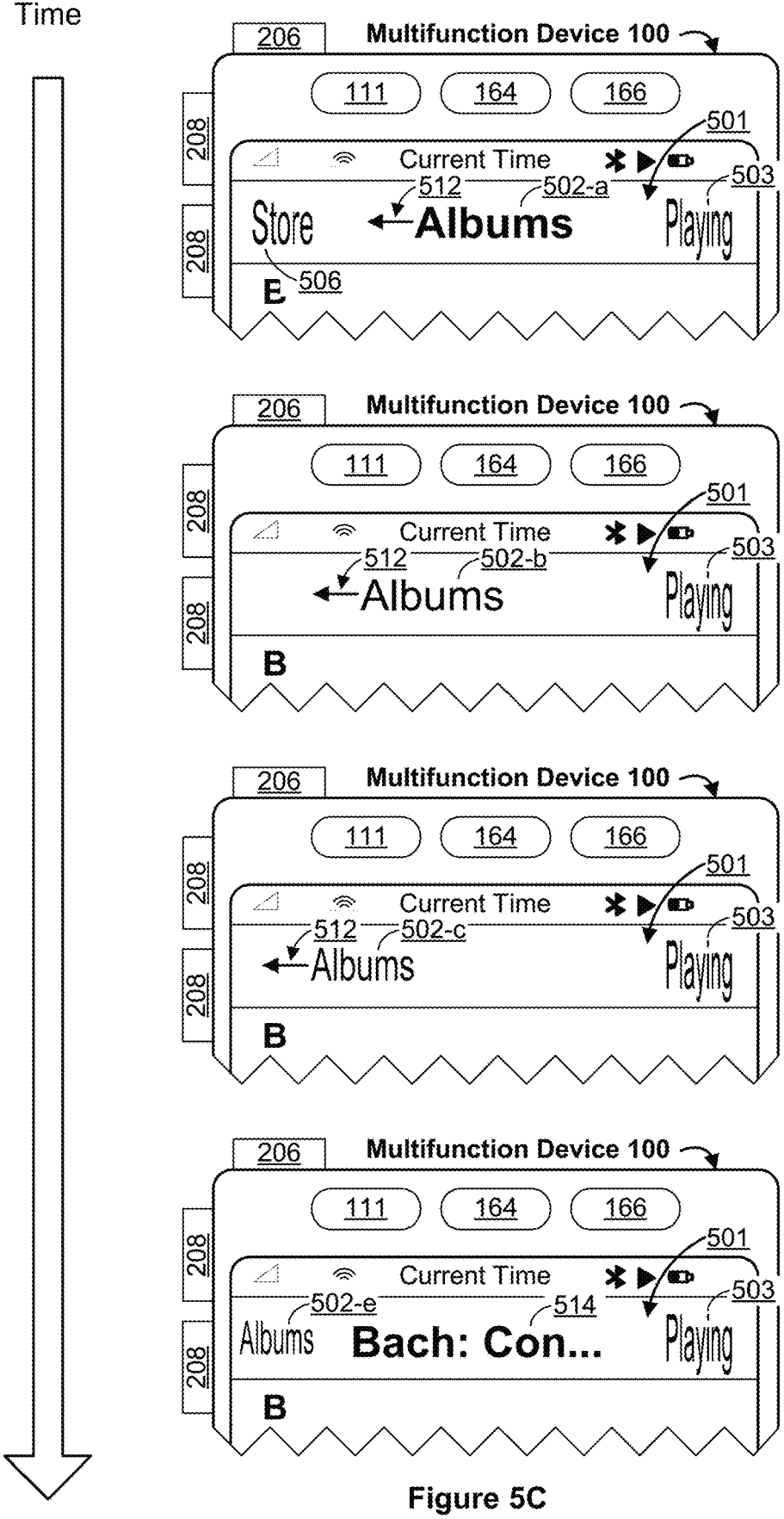
FIGS. 5A-5EE illustrate exemplary user interfaces for animating the transition when transitioning between user interfaces in accordance with some embodiments.
Figure 5D:
Figure 5E:
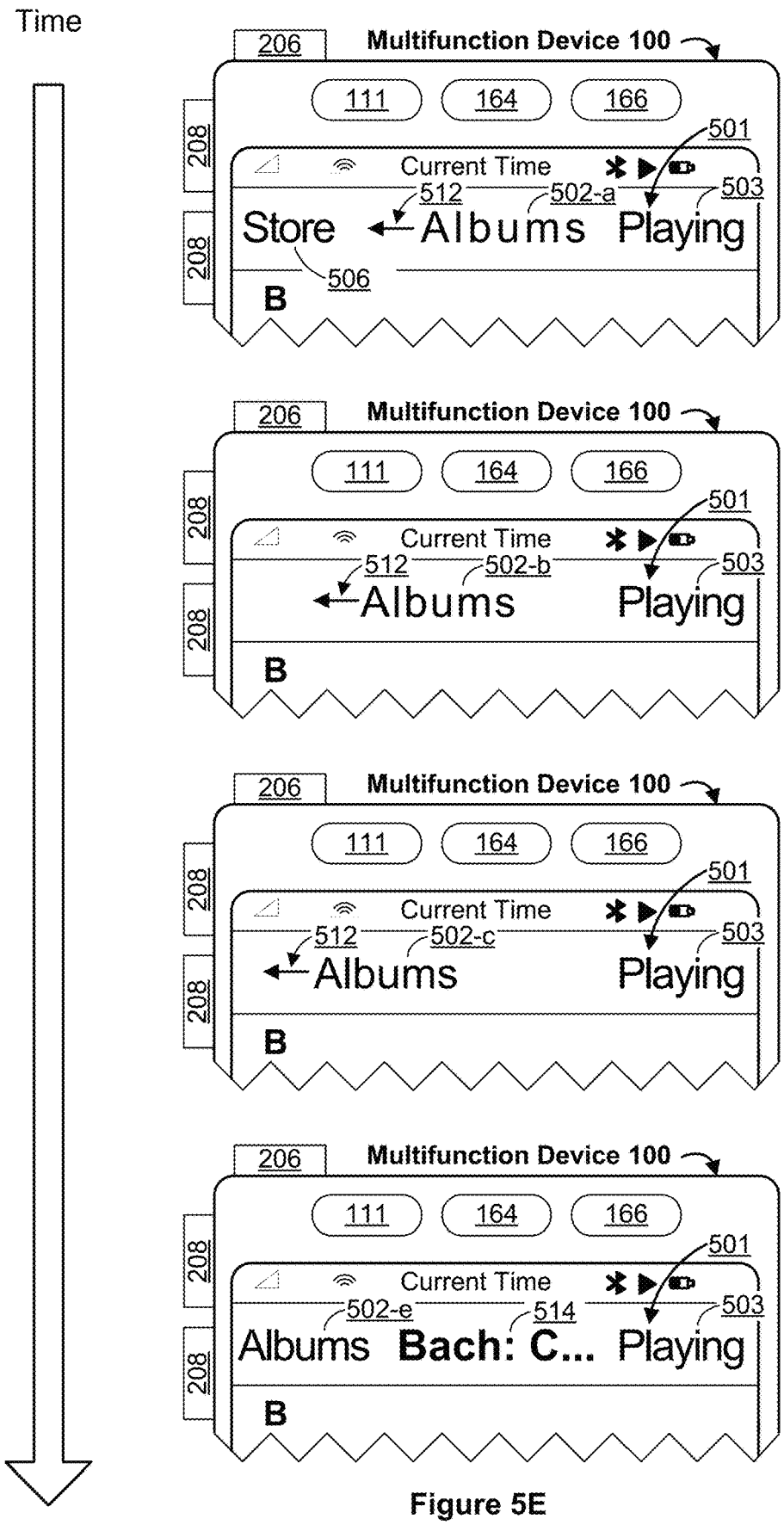
Figure 5F:
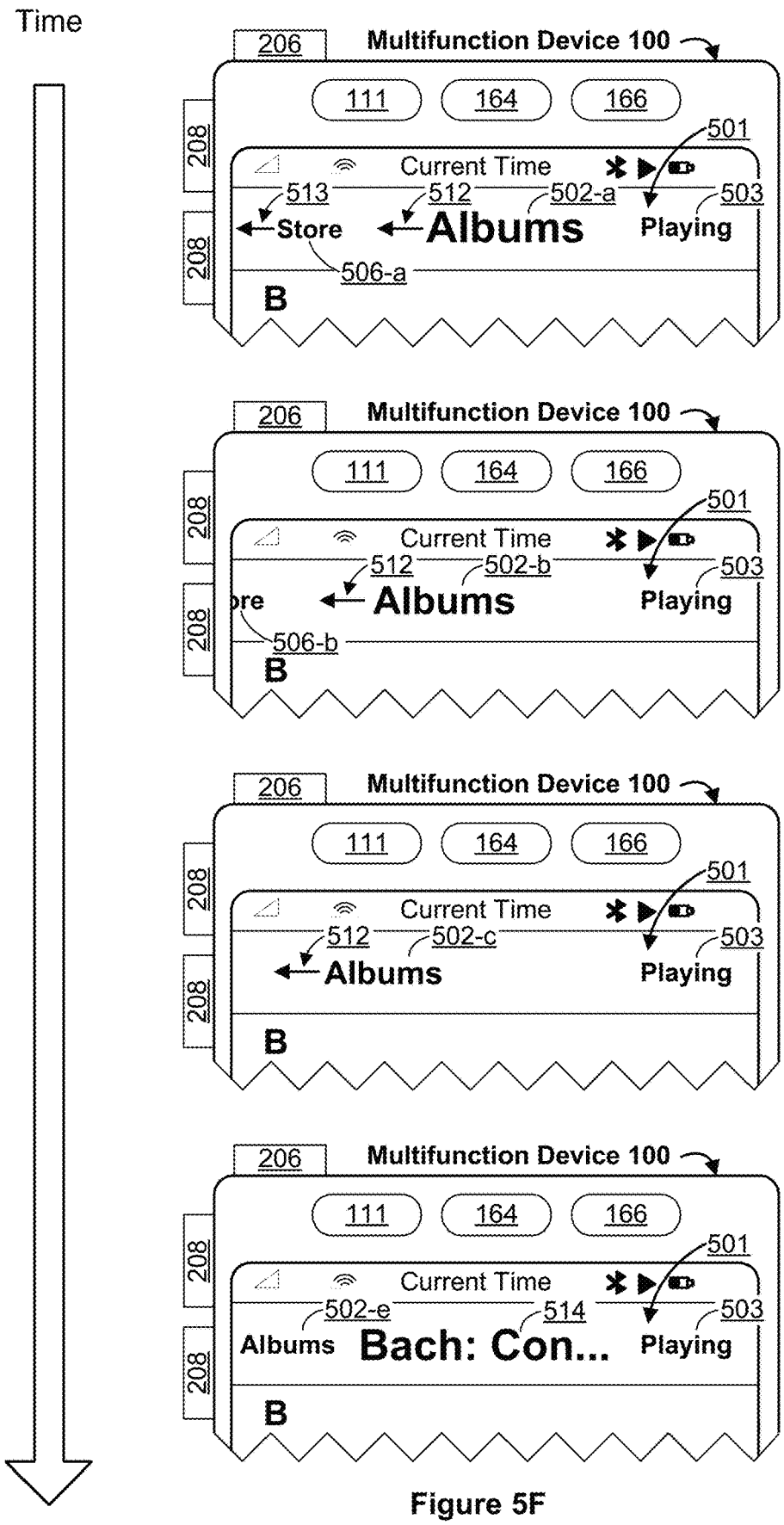
FIGS. 5FF-5NN diagram exemplary relationships between user inputs, movement of first text on a display, and progress of display property change of first text on the display associated with the transition from a first user interface to a second user interface when transitioning between user interfaces in accordance with some embodiments.
Figure 5G:
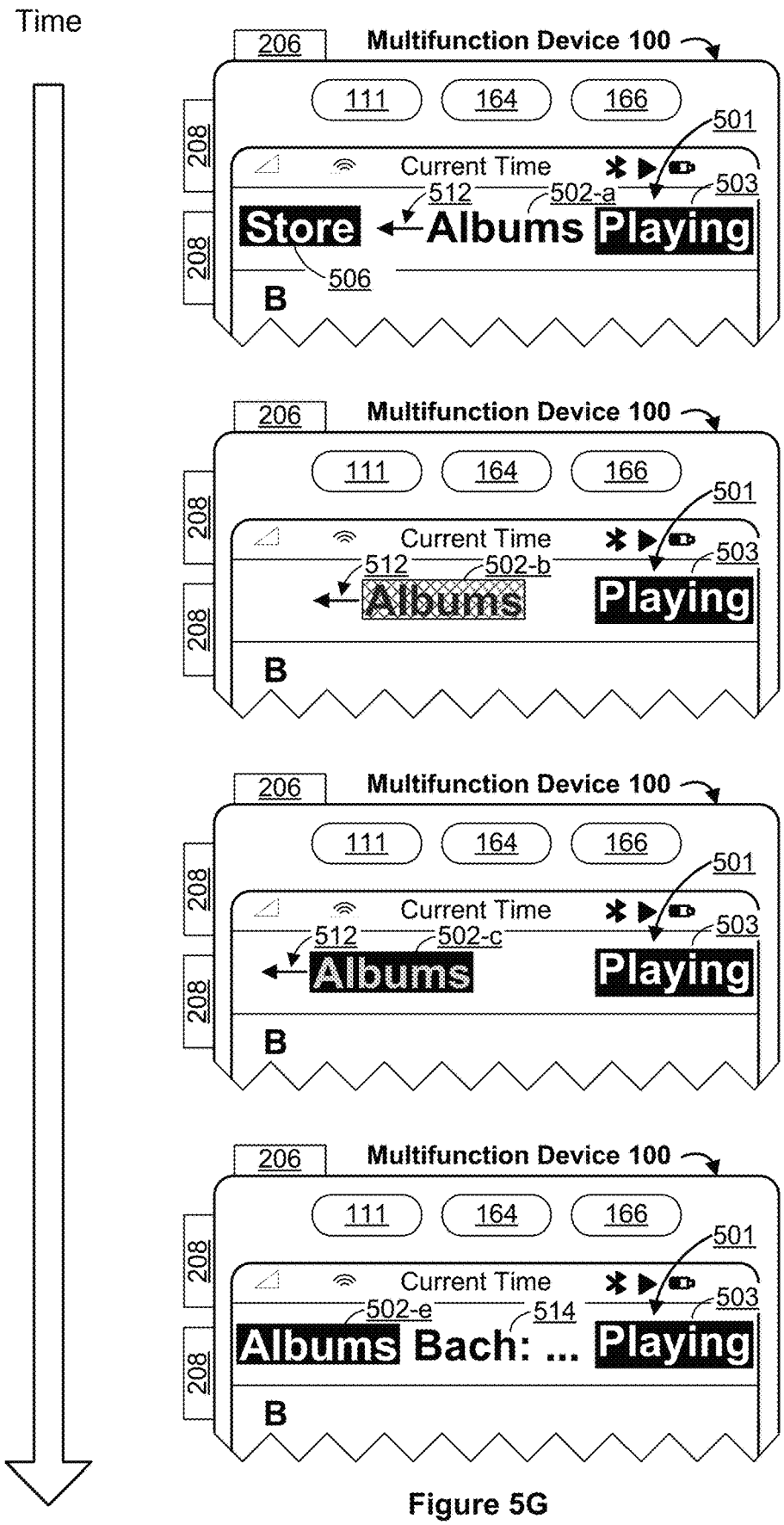
Figure 5I:
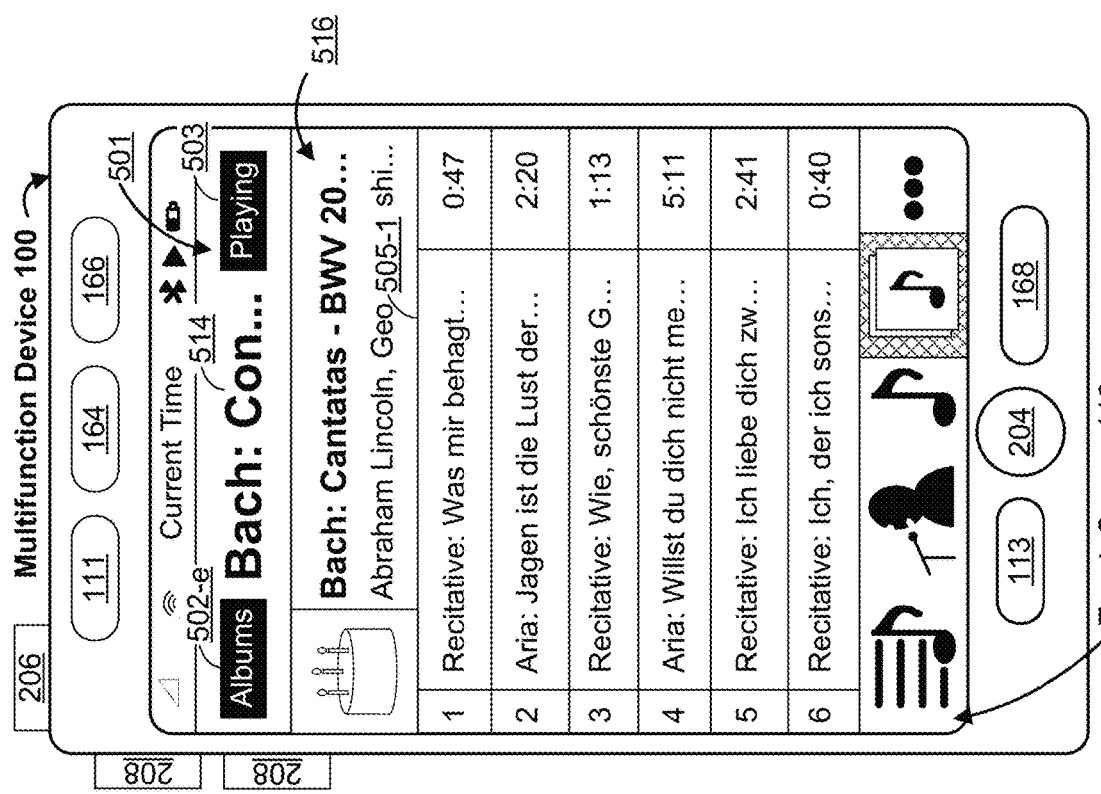
Figure 5H:
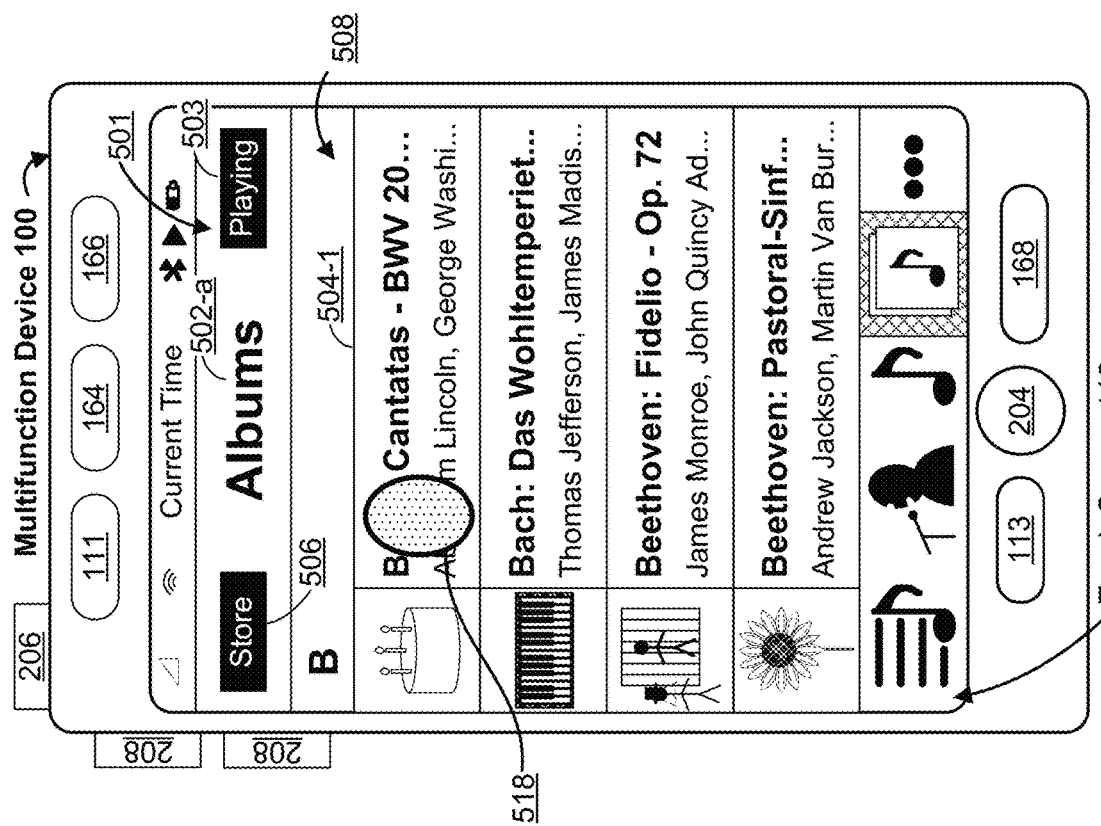
Figure 5K:
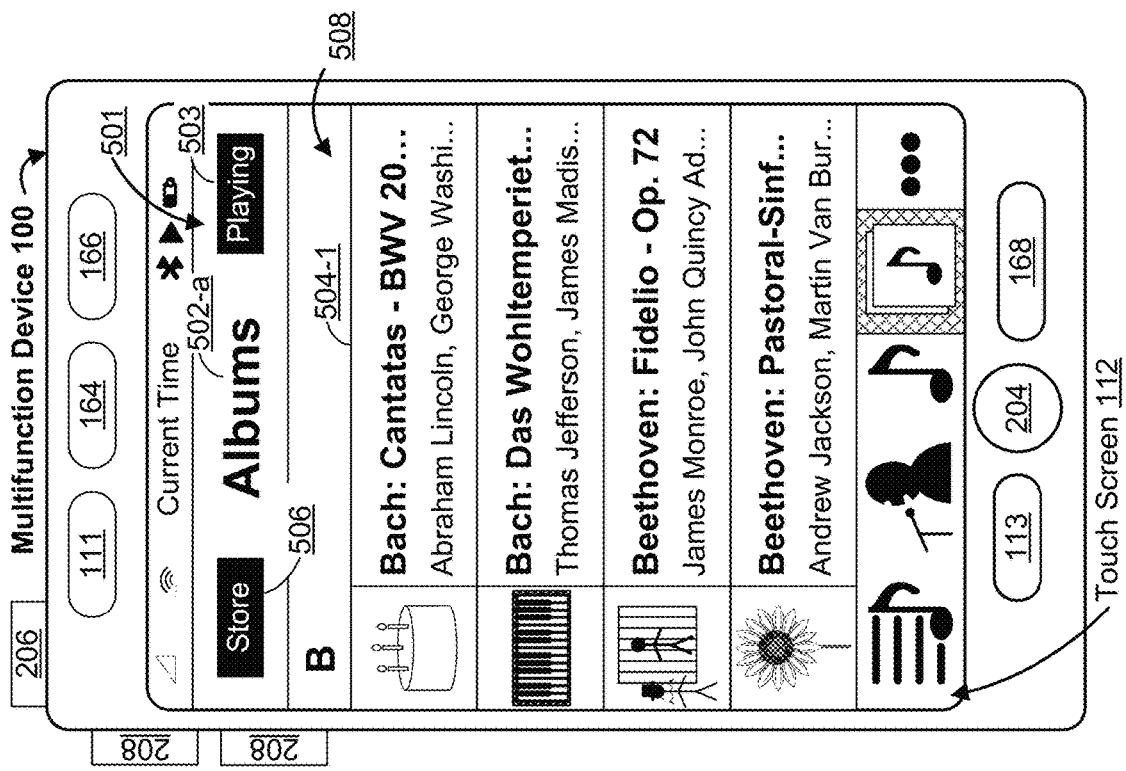
Figure 5J:
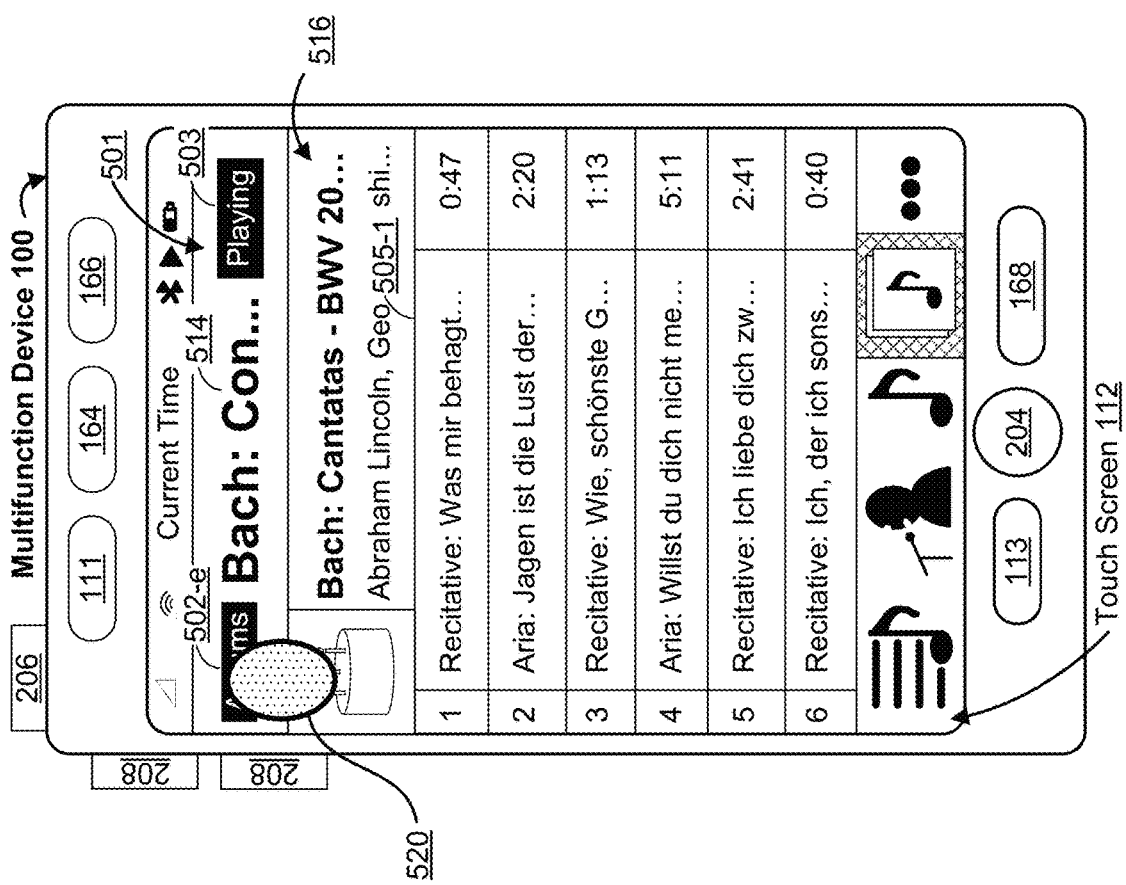
Figure 5M:
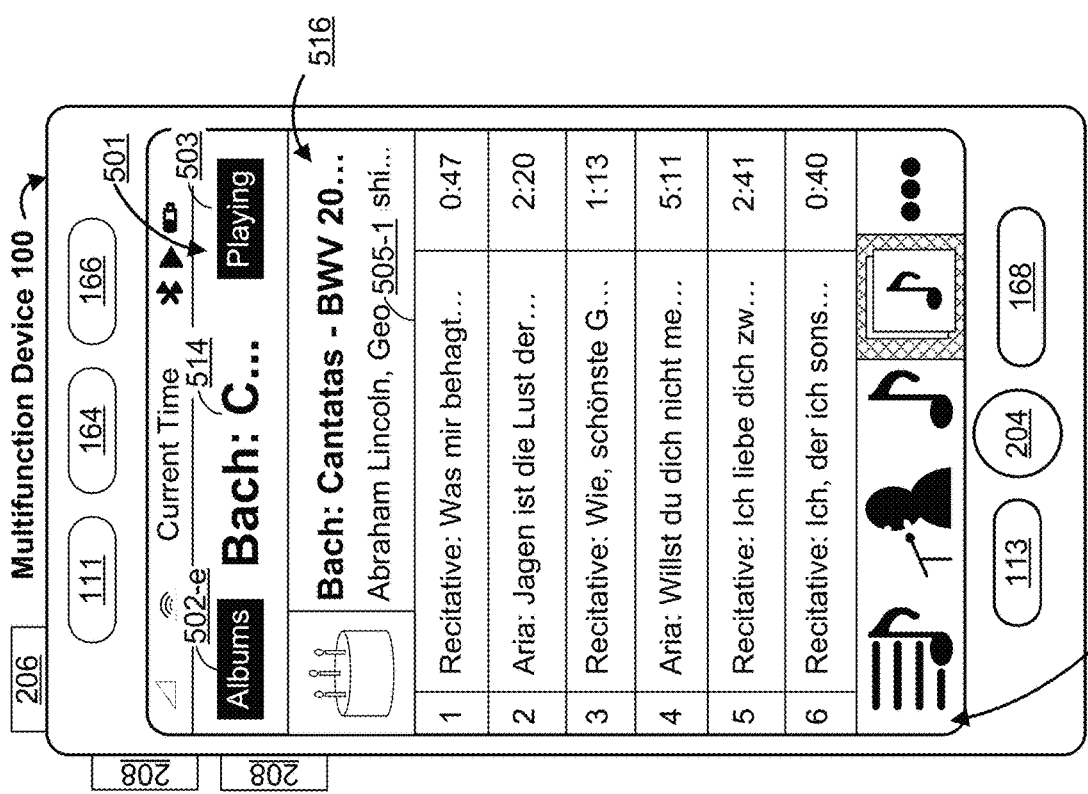
Figure 5L:
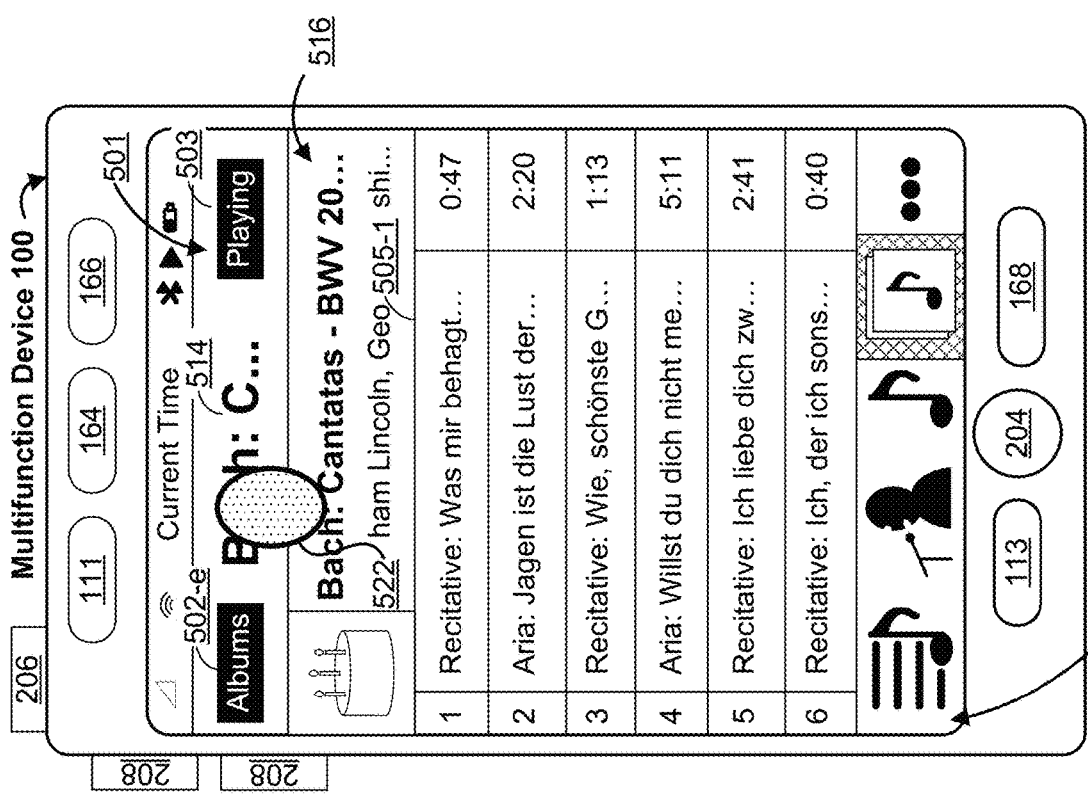
Figure 5O:
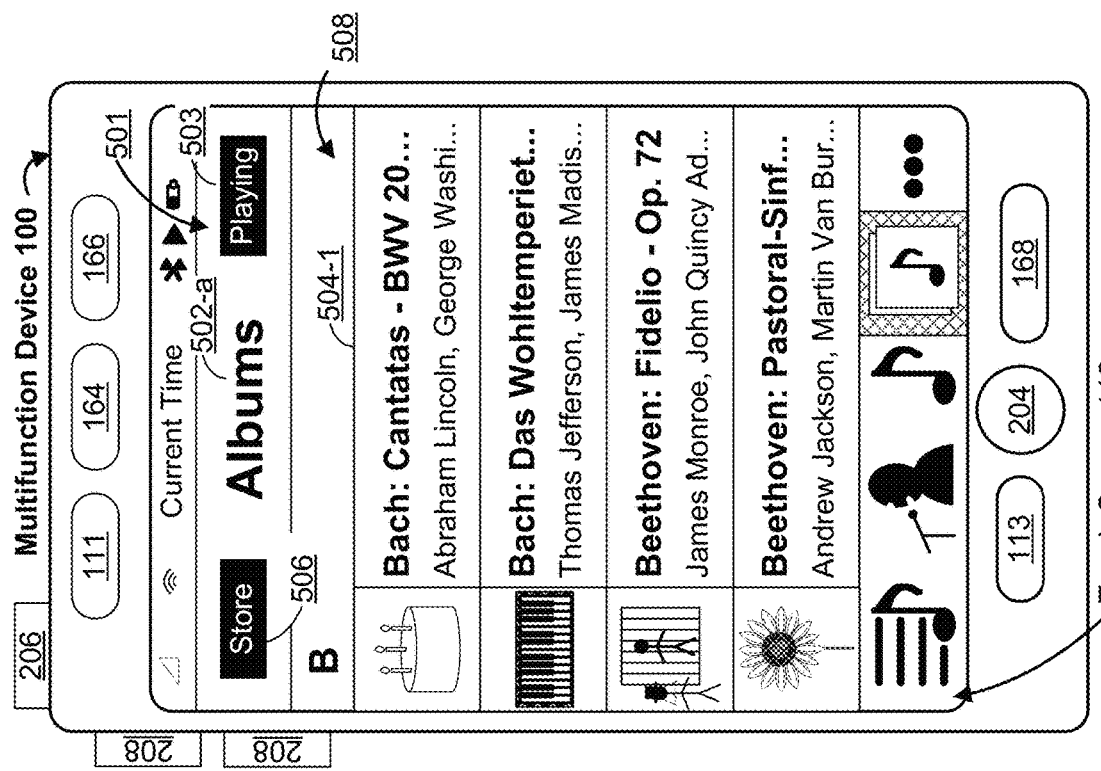
Figure 5N:
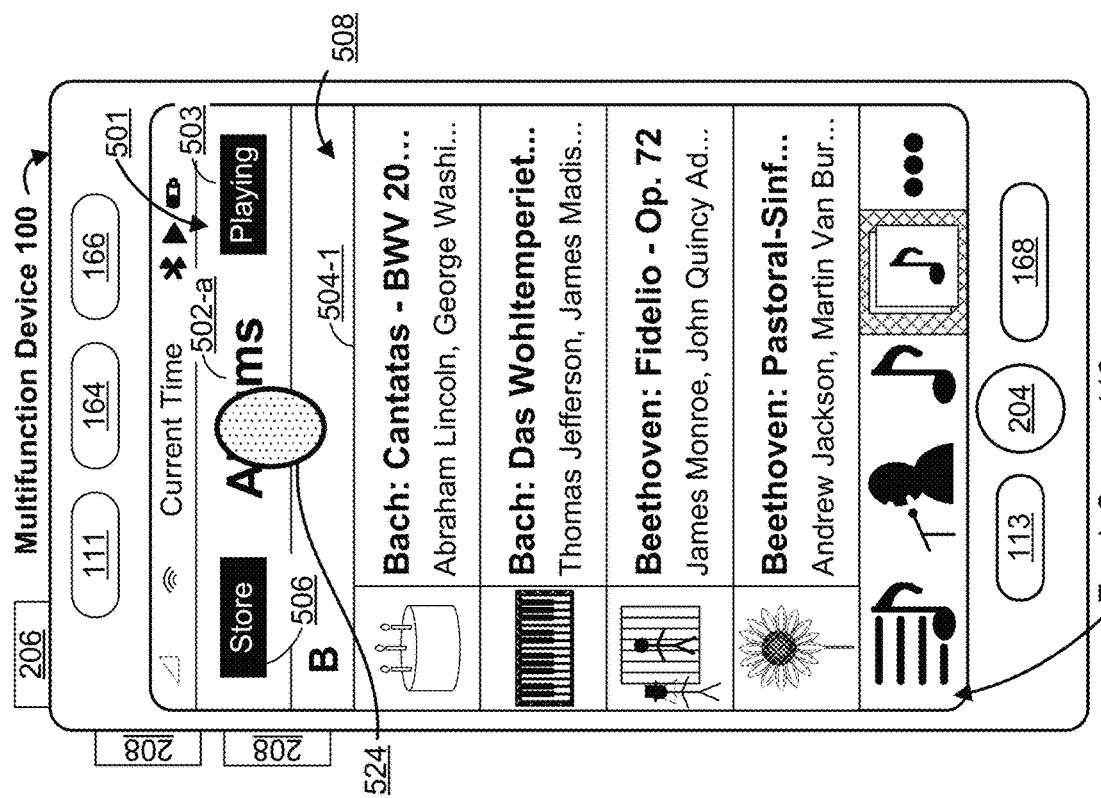
Figure 5Q:
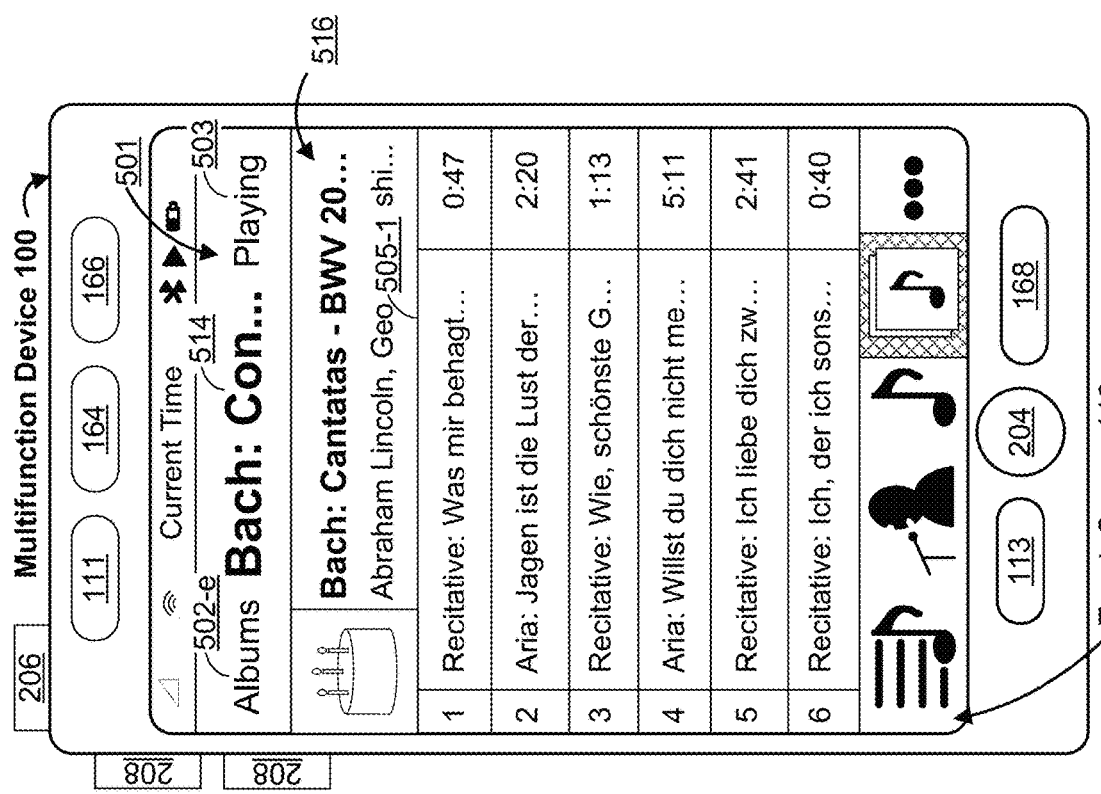
Figure 5P:
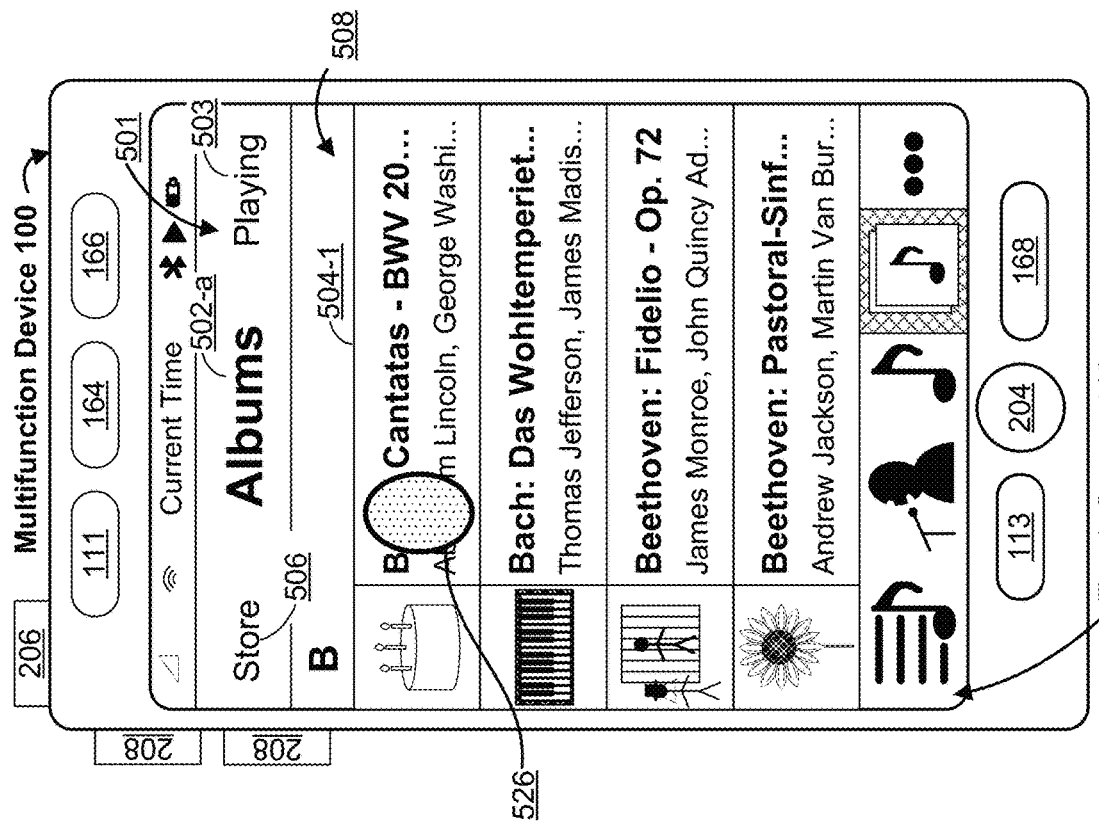
Figure 5S:
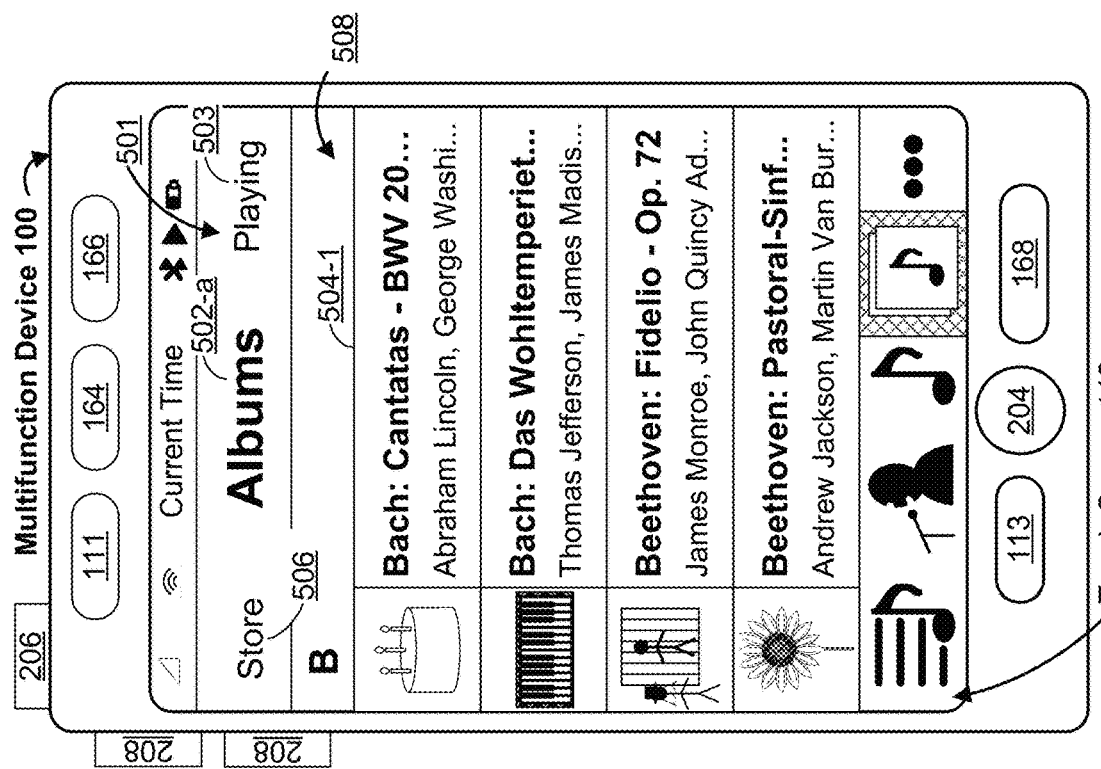
Figure 5R:
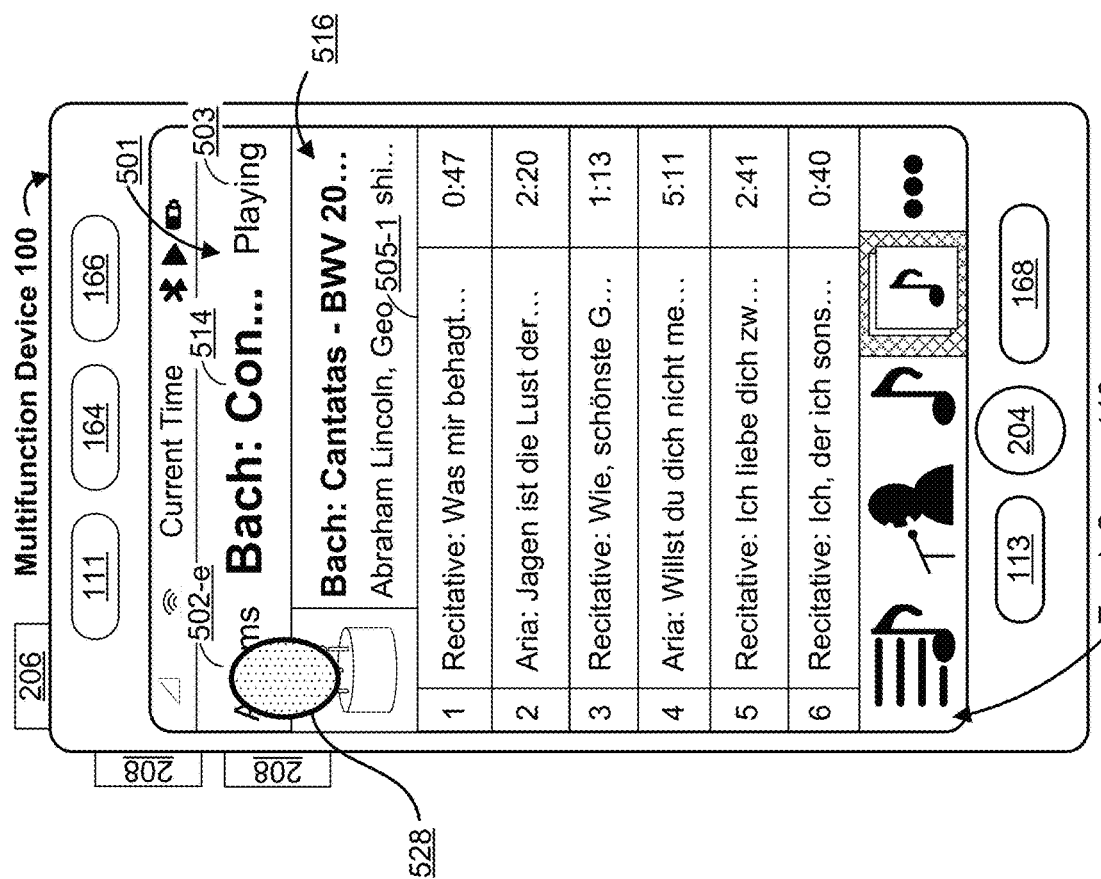
Figure 5U:
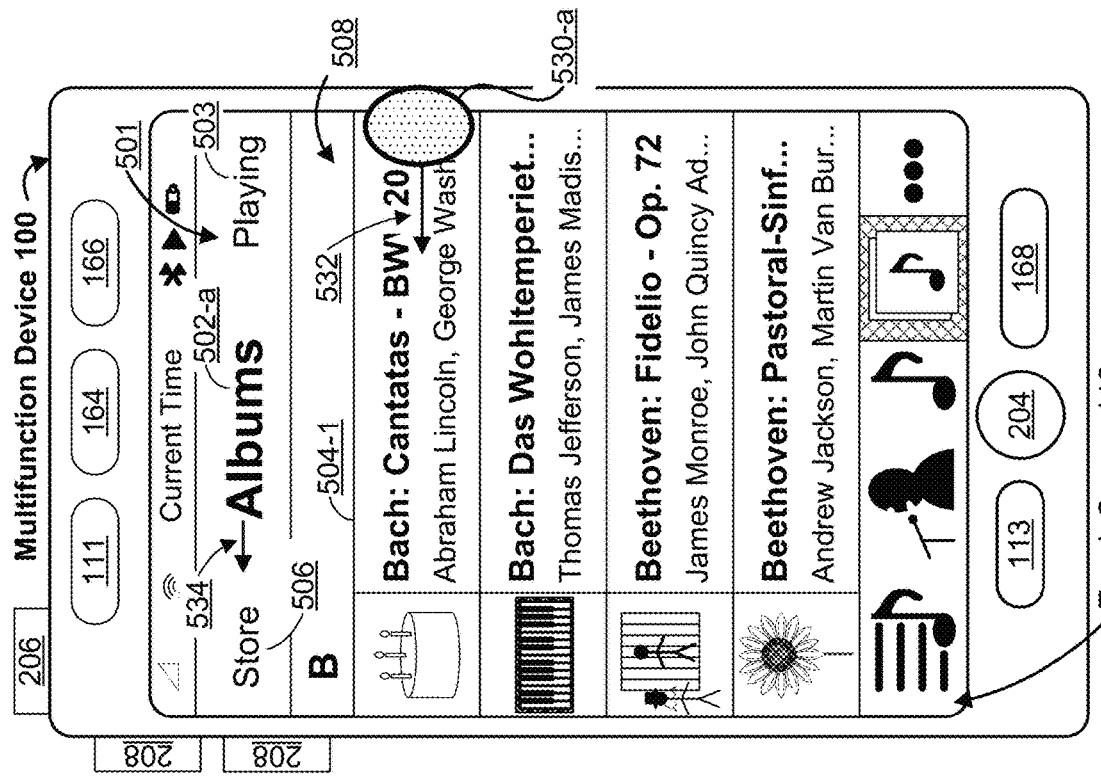
Figure 5T:
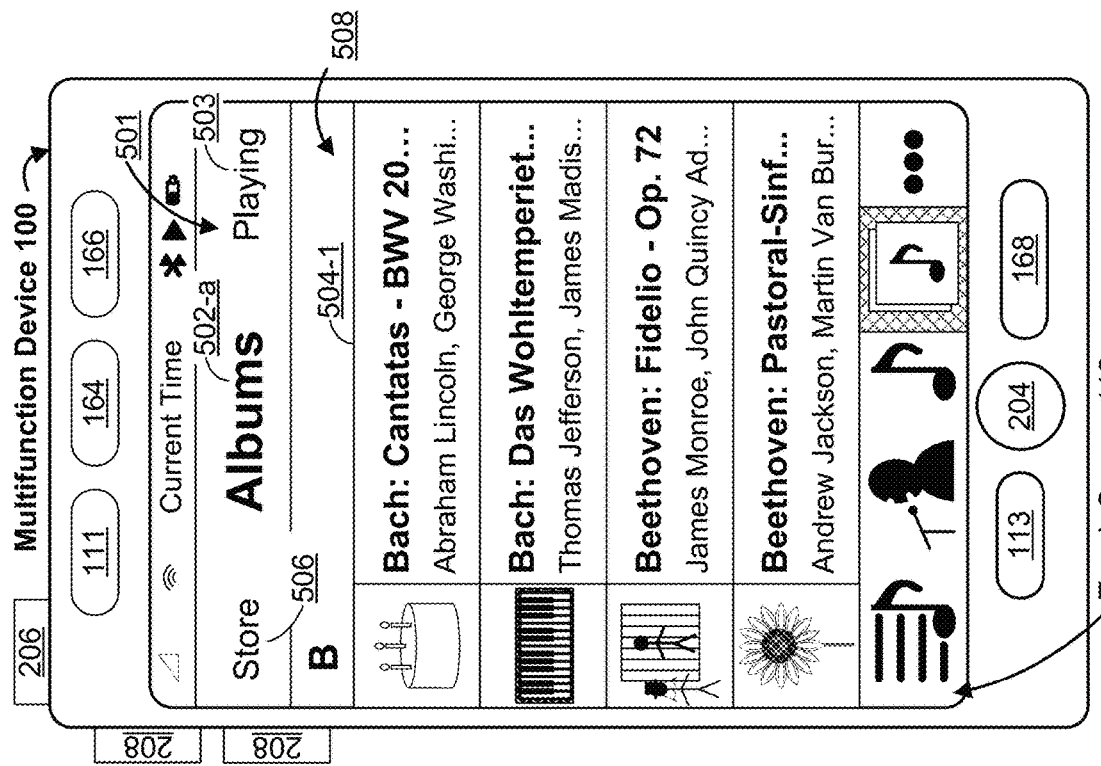
Figure 5X:
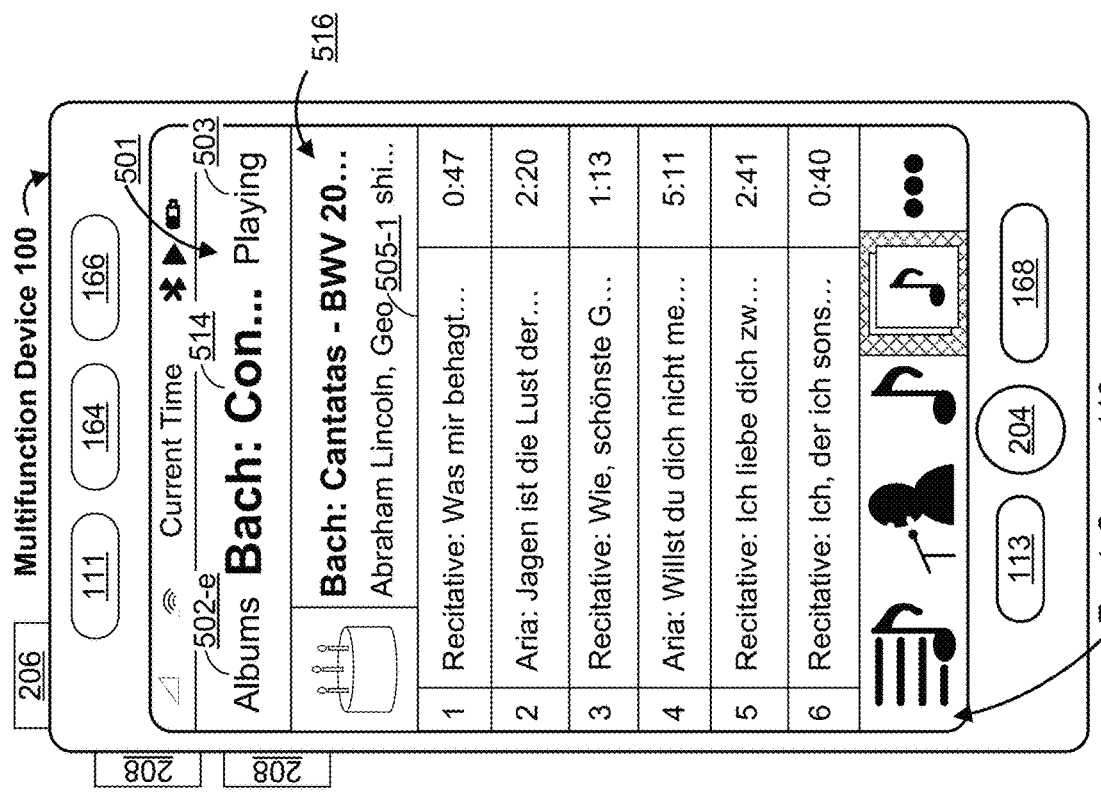
Figure 5Y:
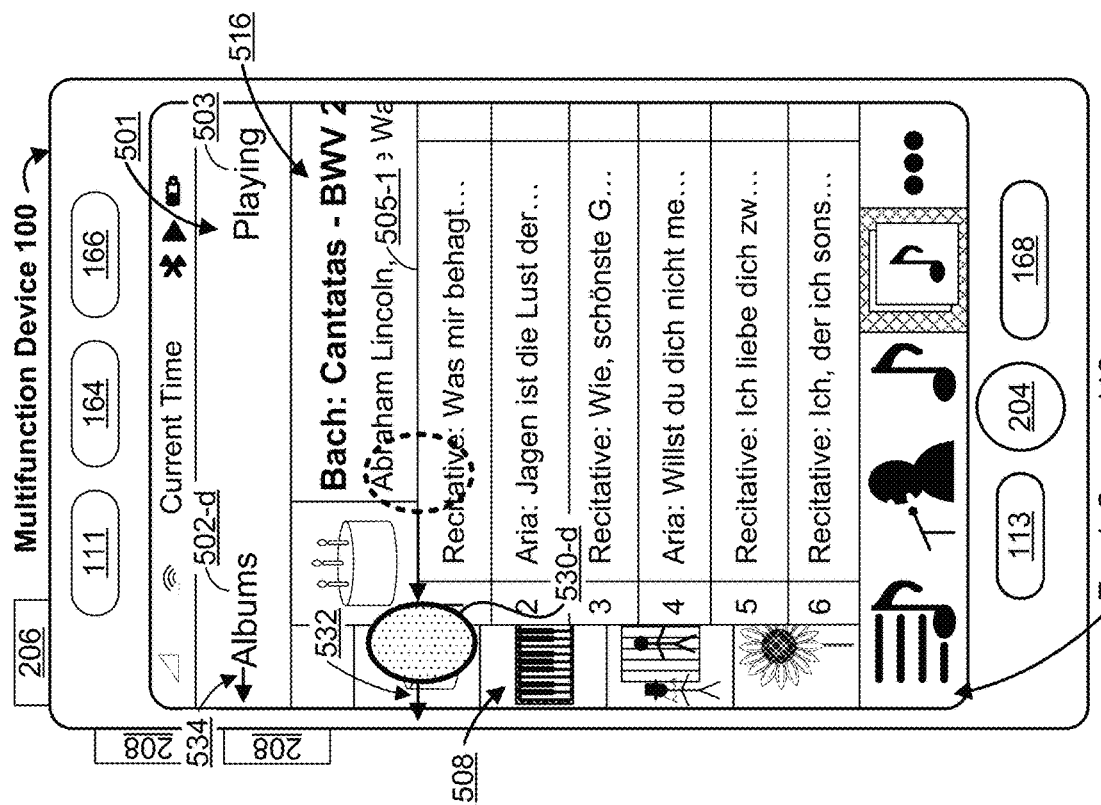
Figure 5A:
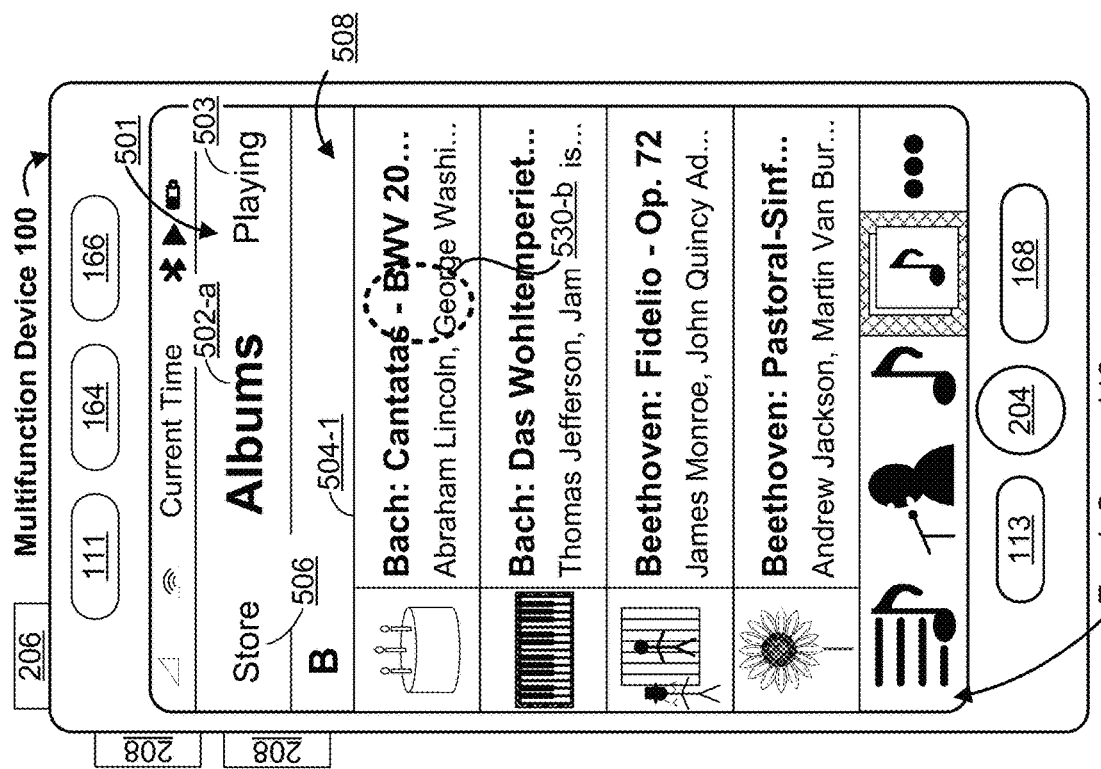

FIGS. 5A-5S illustrate various embodiments in which multifunction device 100 detects a contact (e.g., contacts 510, 518, and/or 526) at a position on touch screen 112 corresponding to the display of a selectable representation 504-1 of music album "Bach: Cantatas—BWV 204 & 208," as illustrated in FIGS. 5B, 5H, and 5P. In response, multifunction device 100 changes the active user interface hierarchy by transitioning from a first user interface 508 in which a musical album can be selected, as shown in FIGS. 5A-5B, 5H, 5K, 5N-5P, and 5S, to second user interface 516 in which a respective song of a musical album can be selected, as shown in FIGS. 5D, 5I-5J, 5L-5M, and 5Q-5R.

As illustrated in FIGS. 5C and 5E-5G, transitioning from first user interface 508 to second user interface 516 includes continuous movement 512 of first text 502 (e.g., "Albums") from first position 502-a on touch screen 112, as displayed in first user interface 508, to position 502-e on touch screen 112, as displayed in second user interface 516. Transitioning also includes change of one or more display property of first text 502.

In FIG. 5C, the one or more display property of first text 502 that change while multifunction device 100 transitions from displaying first user interface 508 to displaying second user interface 516 include a stroke width for letters in the first text. For example, in response to detecting contact 510 in FIG. 5B, multifunction device 100 displays continuous movement 512 of first text 502 from position 502-a, through intermediate positions 502-b and 502-c, to position 502-e in FIG. 5C. While displaying continuous movement 512, multifunction device decreases the stroke width for letters in first text 502, such that when first text "Album" 502 is displayed at position 502-*e* (e.g., after the transition from first user interface 508 to second user interface 516), the letters appear thinner than when first text "Album" 502 was displayed at position 502-*a* (e.g., prior to the transition from first user interface 508 to second user interface 516), as illustrated in FIG. 5C.

In FIG. 5E, the one or more display property of first text 502 that change while multifunction device 100 transitions from displaying first user interface 508 to displaying second user interface 516 include a letter spacing for letters in the first text. For example, in response to detecting contact 510 in FIG. 5B, multifunction device 100 displays continuous movement 512 of first text 502 from position 502-*a*, through intermediate positions 502-*b* and 502-*c*, to position 502-*e* in FIG. 5E. While displaying continuous movement 512, multifunction device decreases the letter spacing for letters in first text 502, such that when first text "Album" 502 is displayed at position 502-*e* (e.g., after the transition from first user interface 508 to second user interface 516), the letters appear closer together than when first text "Album" 502 was displayed at position 502-*a* (e.g., prior to the transition from first user interface 508 to second user interface 516), as illustrated in FIG. 5E.

In FIG. 5F, the one or more display property of first text 502 that change while multifunction device 100 transitions from displaying first user interface 508 to displaying second user interface 516 include a font size for letters in the first text. For example, in response to detecting contact 510 in FIG. 5B, multifunction device 100 displays continuous movement 512 of first text 502 from position 502-*a*, through intermediate positions 502-*b* and 502-*c*, to position 502-*e* in FIG. 5F. While displaying continuous movement 512, multifunction device decreases the font size for letters in first text 502, such that when first text "Album" 502 is displayed at position 502-*e* (e.g., after the transition from first user interface 508 to second user interface 516), the letters appear smaller than when first text "Album" 502 was displayed at position 502-*a* (e.g., prior to the transition from first user interface 508 to second user interface 516), as illustrated in FIG. 5F.

In FIG. 5G, the one or more display property of first text 502 that change while multifunction device 100 transitions from displaying first user interface 508 to displaying second user interface 516 include a font color for letters in the first text. For example, in response to detecting contact 510 in FIG. 5B, multifunction device 100 displays continuous movement 512 of first text 502 from position 502-*a*, through intermediate positions 502-*b* and 502-*c*, to position 502-*e* in FIG. 5G. While displaying continuous movement 512, multifunction device changes the font color for letters in first text 502 from black, as when first text "Album" 502 was displayed at position 502-*a* (e.g., prior to the transition from first user interface 508 to second user interface 516), to white, as when first text "Album" 502 is displayed at position 502-*e* (e.g., after the transition from first user interface 508 to second user interface 516), as illustrated in FIG. 5G.

In FIGS. 5H-5M, the one or more display property of text 502 that change include a font color for letters in the first text, and the font color change indicates that the text has become selectable. For example, in response to detecting contact 518 in FIG. 5H, multifunction device 100 transitions from display of first user interface 508, as illustrated in FIG. 5H, to second user interface 516, as illustrated in FIG. 5G. During the transition, the font color of first text "Album" 502 is changed from black, as displayed at position 502-*a* in FIG. 5H prior to the transition, to white, as displayed at position 502-*e* in FIG. 5G after the transition. Multifunction device 100 then detects contact 520 at a position on touch screen 112 corresponding to the display of first text "Albums" 502 in second user interface 516. In response to detection of contact 520, multifunction device 100 changes the active user interface hierarchy back from second user interface 516, as illustrated in FIG. 5J, to first user interface 508, as illustrated in FIG. 5K, because first text "Albums" 502 is selectable when displayed at position 502-*e* in second user interface 516, as indicated by the change in font color from black to white.

In contrast to selectable first text "Albums" 502, displayed in white font at position 502-*e* in second user interface 516, descriptive second text "Bach: C . . . " 514, displayed in black font in second user interface 516 is not selectable, as indicated by the black font color. For example, as illustrated in FIGS. 5L-5M, multifunction device 100 detects contact 522 at a position on touch screen 112 corresponding to the display of second text "Bach: C . . . " 514 in second user interface 516. In response to detection of contact 522, multifunction device 100 does not change the active user interface hierarchy because second text "Bach: C . . . " 514 in not selectable, as indicated by the black font color.

In some embodiments, as illustrated in FIGS. 5N-5S, first text "Albums" 504, which is descriptive and not selectable when displayed in first user interface 508, becomes selectable after the change in user interface hierarchy. For example, as illustrated in FIG. 5N, multifunction device 100 detects contact 524 at a position on touch screen 112 corresponding to the display of first text "Albums" 502 in first user interface 508. In response to detecting contact 524, multifunction device 100 does not change user interface hierarchy, as illustrated in FIG. 5O, because first text "Albums" 502 is not selectable when displayed in first user interface 508.

In contrast, multifunction device 100 detects contact 526 at a position on touch screen 112 corresponding to the display of selectable representation 504-1 of music album "Bach: Cantatas—BWV 204 & 208," as illustrated in FIG. 5P. In response to detection of contact 526, multifunction device 100 transitions from display of first user interface 508, as illustrated in FIG. 5P, to display of second user interface 516, as illustrated in FIG. 5Q, which includes movement of first text "Albums" 502 from position 502-*a* to position 502-*e* on touch screen 112 and change in the font size of letters of first text "Albums" 502. Multifunction device 100 then detects contact 528 at a position on touch screen 112 corresponding to the display of first text "Albums," as illustrated in FIG. 5R. In response to detection of contact 528, multifunction device 100 changes the active user interface hierarchy back from second user interface 516, as illustrated in FIG. 5R, to first user interface 508, as illustrated in FIG. 5S, because, in contrast to first text "Albums" 502 displayed in first user interface 508, first text "Albums" 502 is selectable when displayed in second user interface 516.

FIGS. 5FF-5GG illustrate various embodiments in which multifunction device 100 detects a user input (e.g., user input 542 and/or 548) corresponding to a request to change the active user interface hierarchy. In response to detecting the user input, multifunction device 100 transitions from display of a first user interface to display of a second user interface, the transition including continuous movement (e.g., continuous movement 544 and/or 550) of a first text and change (e.g., change 546 and/or 552) in one or more display properties of the first text.

In some embodiments, as illustrated in FIG. 5FF, in response to detection of user input 542, multifunction device 100 displays proportional movement and display property change of the first text. For example, the rate of movement of the first text on the display, respective to the total movement, is equal to the rate of change in the one or more display property of the first text, respective to the total change in the one or more display property (e.g., the slope of the graphs corresponding to movement of first text on the display and progress of display property change, as illustrated in FIG. 5GG, is are selected to be equivalent throughout some or all of the movement of the first text on the display).

In some embodiments, as illustrated in FIG. 5GG, in response to detection of user input 542, multifunction device 100 displays non-proportional movement and display property change of the first text (e.g., movement of the first text on the display is faster, slower, or occurs at a different time than does the change in the one or more display property of the first text). For example, the rate of movement of the first text on the display, respective to the total movement, is not equal to the rate of change in the one or more display property of the first text, respective to the total change in the one or more display property (e.g., the slope of the graphs corresponding to movement of first text on display and progress of display property change, as illustrated in FIG. 5GG, is not selected to be equivalent).

FIGS. 5T-5EE and 5HH-5NN illustrate various embodiments in which multifunction device 100 detects a gesture including movement (e.g., movement 532, 538, 554, 562, 568, 576, 582, 588, and/or 594) of a user contact (e.g., user contact 530, 536, 566, and/or 574) on touch screen 112 that corresponds to a request to change the active user interface hierarchy. In response to detecting the user input, multifunction device 100 displays a transitions from a first user interface (e.g., user interface 508 and/or 516) to a second user interface (e.g., user interface 508 and/or 516), the transition including movement of a first text (e.g., first text "Albums" 502) that is proportional to the movement of the user contact on touch screen 112.

FIGS. 5T-5Y illustrate an embodiment in which multifunction device 100, while displaying first user interface 508, detects a gesture including movement 532 of user contact 530, initiated at a position on touch screen 112 corresponding to the display of selectable representation 504-1 of music album "Bach: Cantatas—BWV 204 & 208," from position 530-a in FIG. 5U to position 530-d in FIG. 5X. In response to detecting the gesture, multifunction device 100 transitions from display of first user interface 508, as illustrated in FIG. 5X, to display of second user interface 516, as illustrated in FIG. 5Y. The transition shown in FIGS. 5T-5Y includes continuous movement 534 of first text "Albums" 502 from position 502-a in status bar 501, as illustrated in FIG. 5T, to position 502-e in status bar 501, as illustrated in FIG. 5Y. The transition also includes change in the font size of letters of first text "Albums" 502, such that first text "Albums" 502 appears smaller when displayed at position 502-e in second user interface 516, as illustrated in FIG. 5Y, than when displayed at position 502-a in first user interface 508, as illustrated in FIG. 5T. The transition further including animation of second user interface 516 being dragged from the right side of touch screen 112 to the left side of touch screen 112, giving the appearance that second user interface 516 is being pulled over first user interface 508 (e.g., directly manipulated by the user) in correspondence with movement 532 of contact 530.

As illustrated in the series of FIGS. 5U-5X, the rate of continuous movement 534 of user interface 516 onto the display corresponds to the rate of movement 532 of contact 530 on the display and the movement of first text 502 is proportional to the movement of user interface 516 onto the display and thus the rate of movement of first text 502 is determined based on the rate of movement 532 of corresponding contact 530. For example, movement 532 of contact 530 from position 530-a in FIG. 5U to position 530-b in FIG. 5V corresponds to movement of first text "Albums" 502 from position 502-a in FIG. 5U to position 502-b in FIG. 5V.

In some embodiments, as diagramed in FIGS. 5HH-5II, change of the one or more display properties of the first text occurs at a rate that is directly proportional to the rate of movement of the contact. For example, the slope of the graph representing progress of display property change, illustrated in FIG. 5HH, is the same as the slope of the graph representing movement of the contact on the touch sensitive surface, illustrated in FIG. 5HH. In some embodiments, as illustrated in FIG. 5II, changes in the rate and/or direction of the movement of the user contact corresponding to a request to change the active user interface hierarchy are mirrored by the movement and display property change of the first text and/or animation of a second user interface being pulled onto or pushed off of a first user interface. For example, as illustrated in FIG. 5II, where the rate of movement 560 of the contact on the touch-sensitive surface slows in second portion 560-b of the movement, corresponding movement 562 of first text on the display and/or corresponding progress 564 of display property change of first text on the display slows to a proportional or equivalent rate.

Figure 5Z:
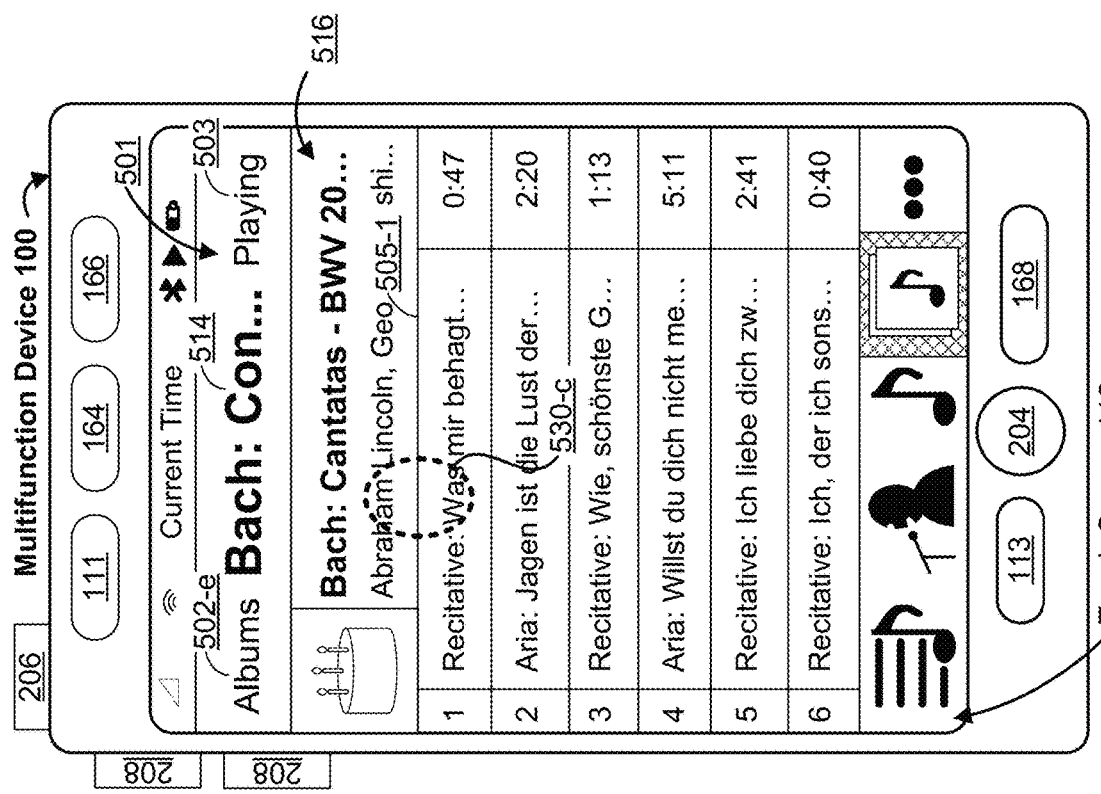
Figure 5C:
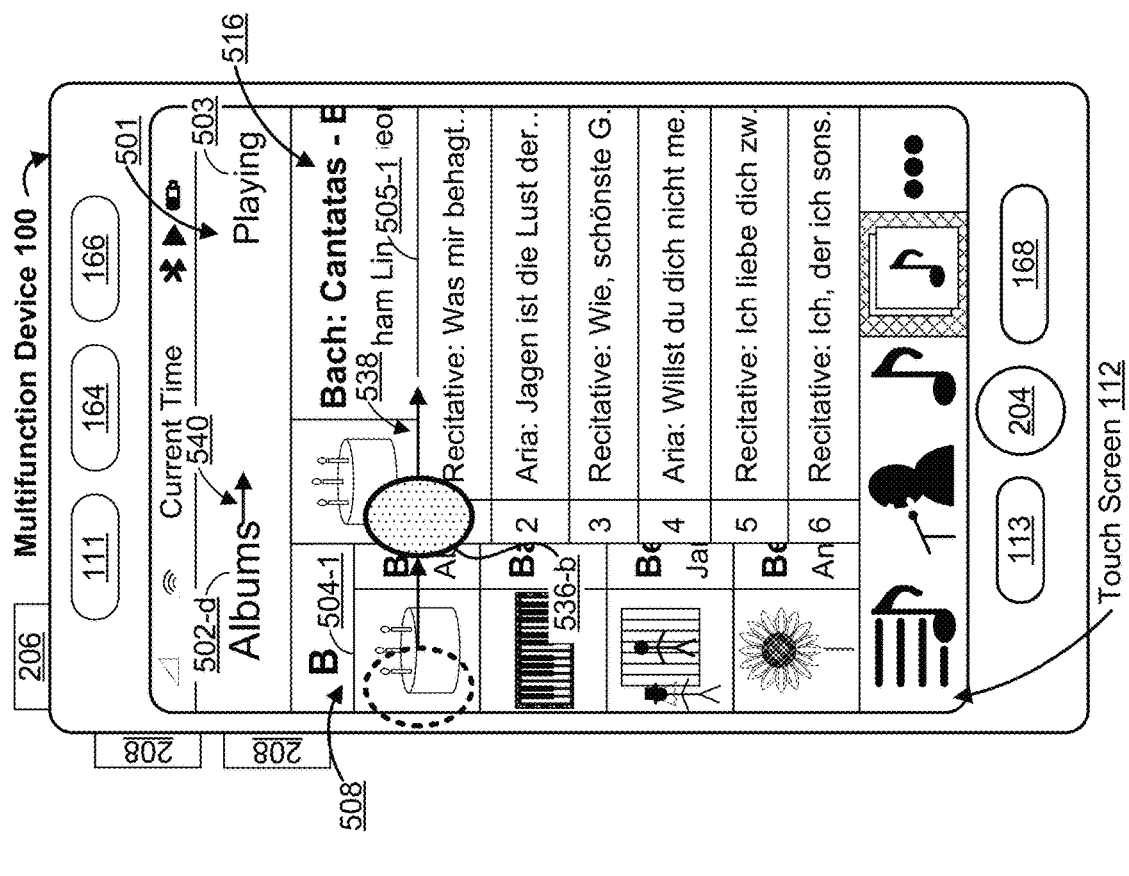
Figure 5B:
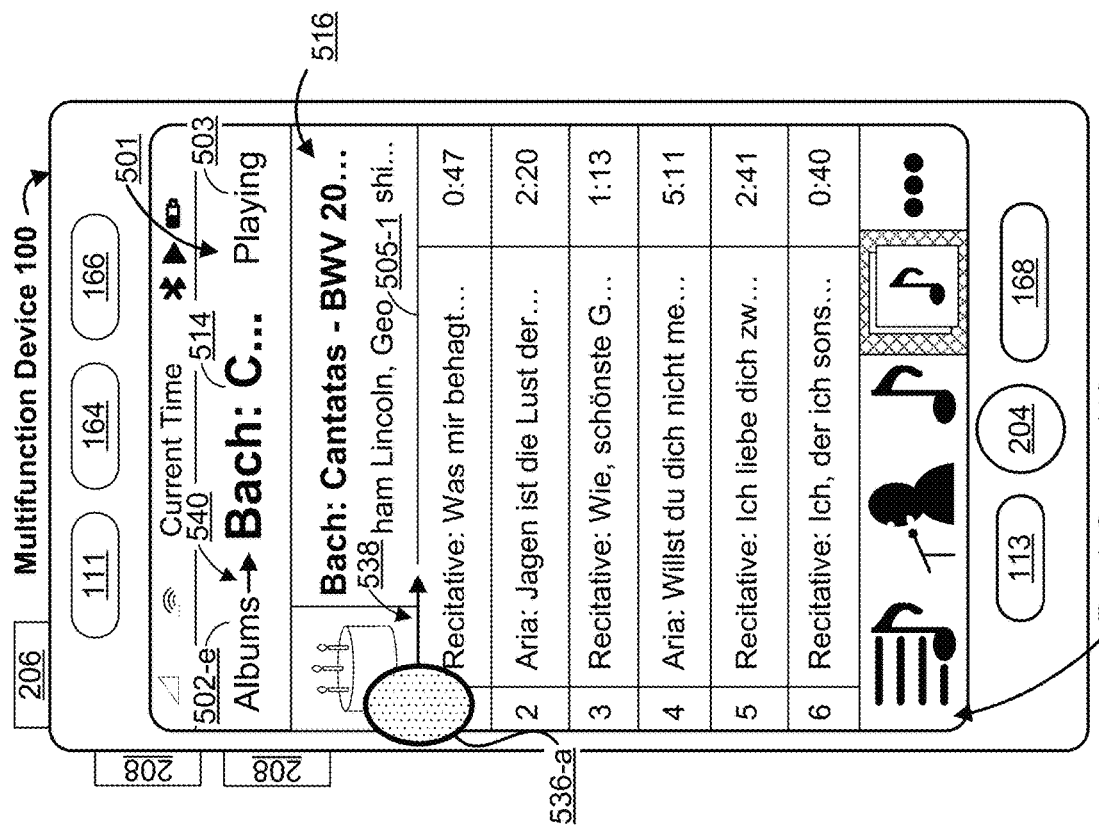
Figure 5F:
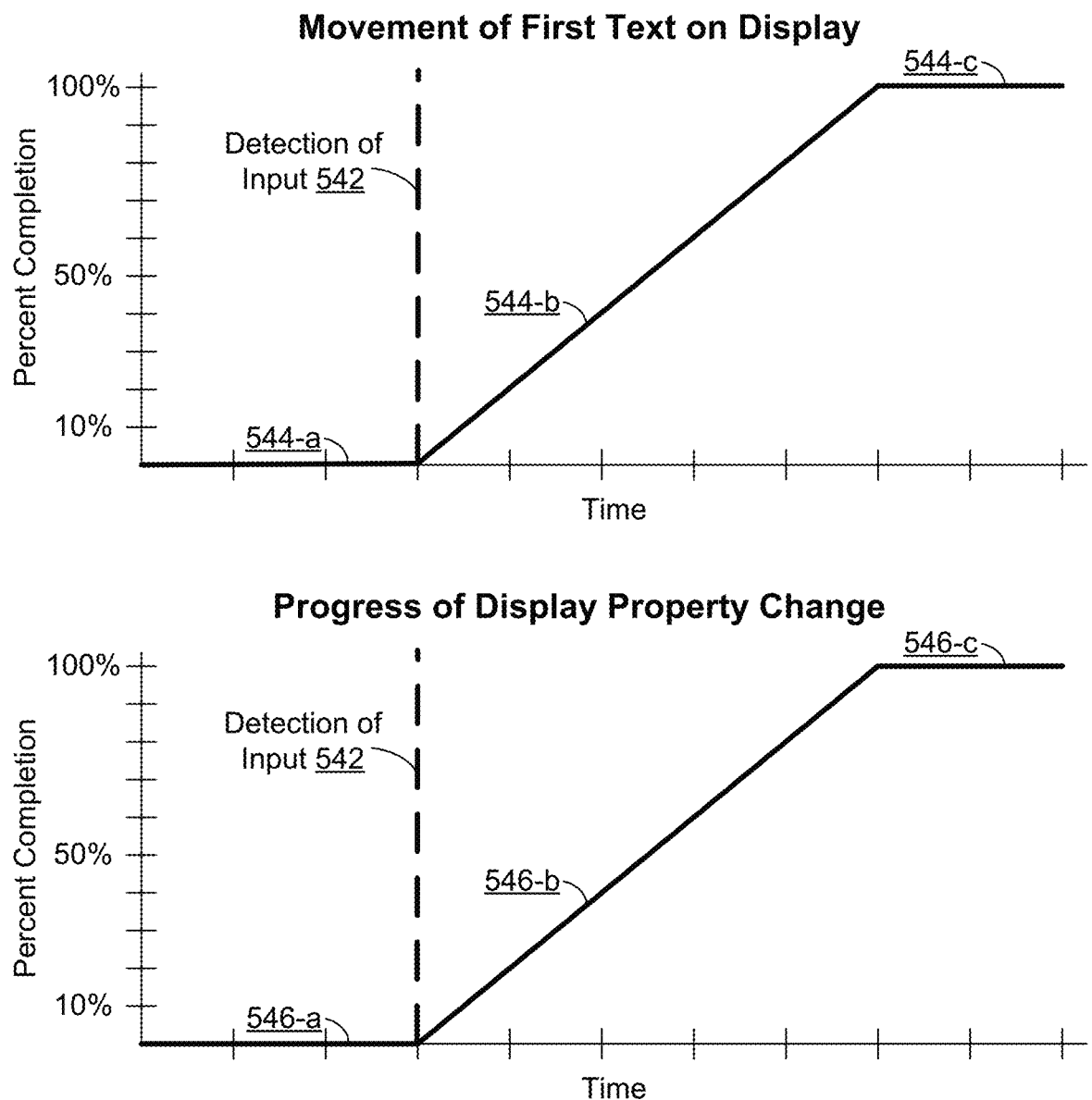
Figure 5G:
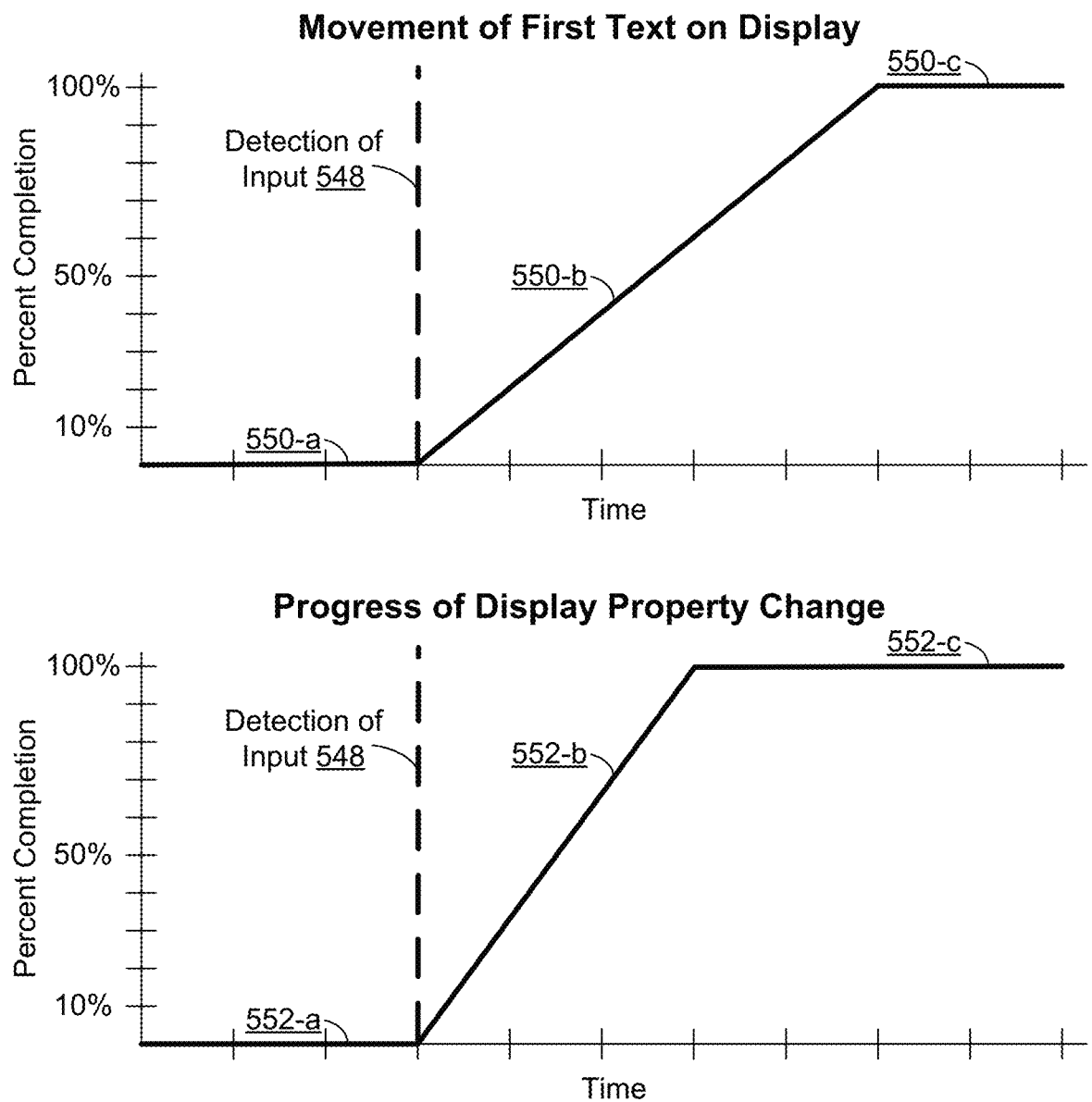
Figure 5H:
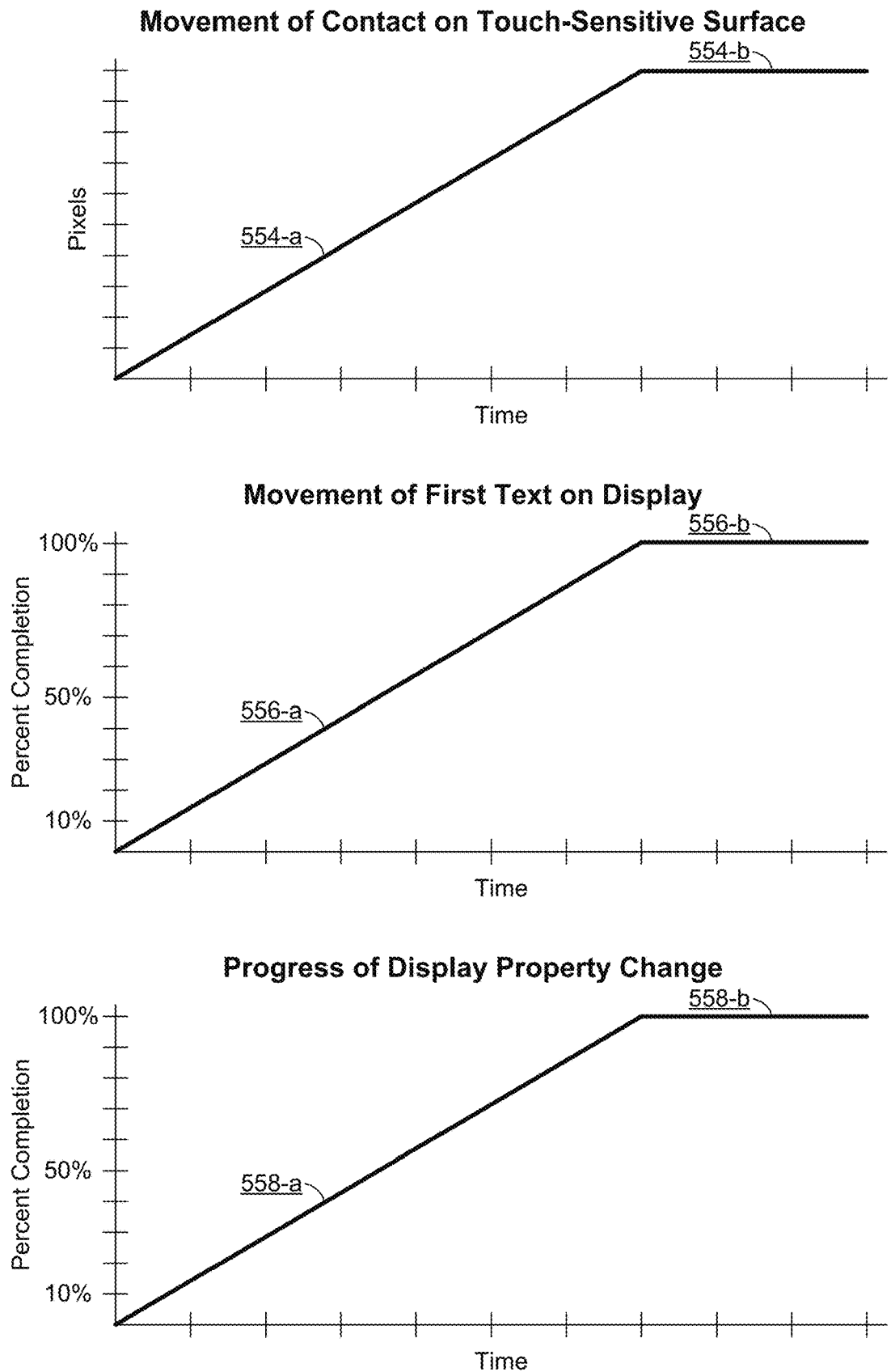
Figure 5I:
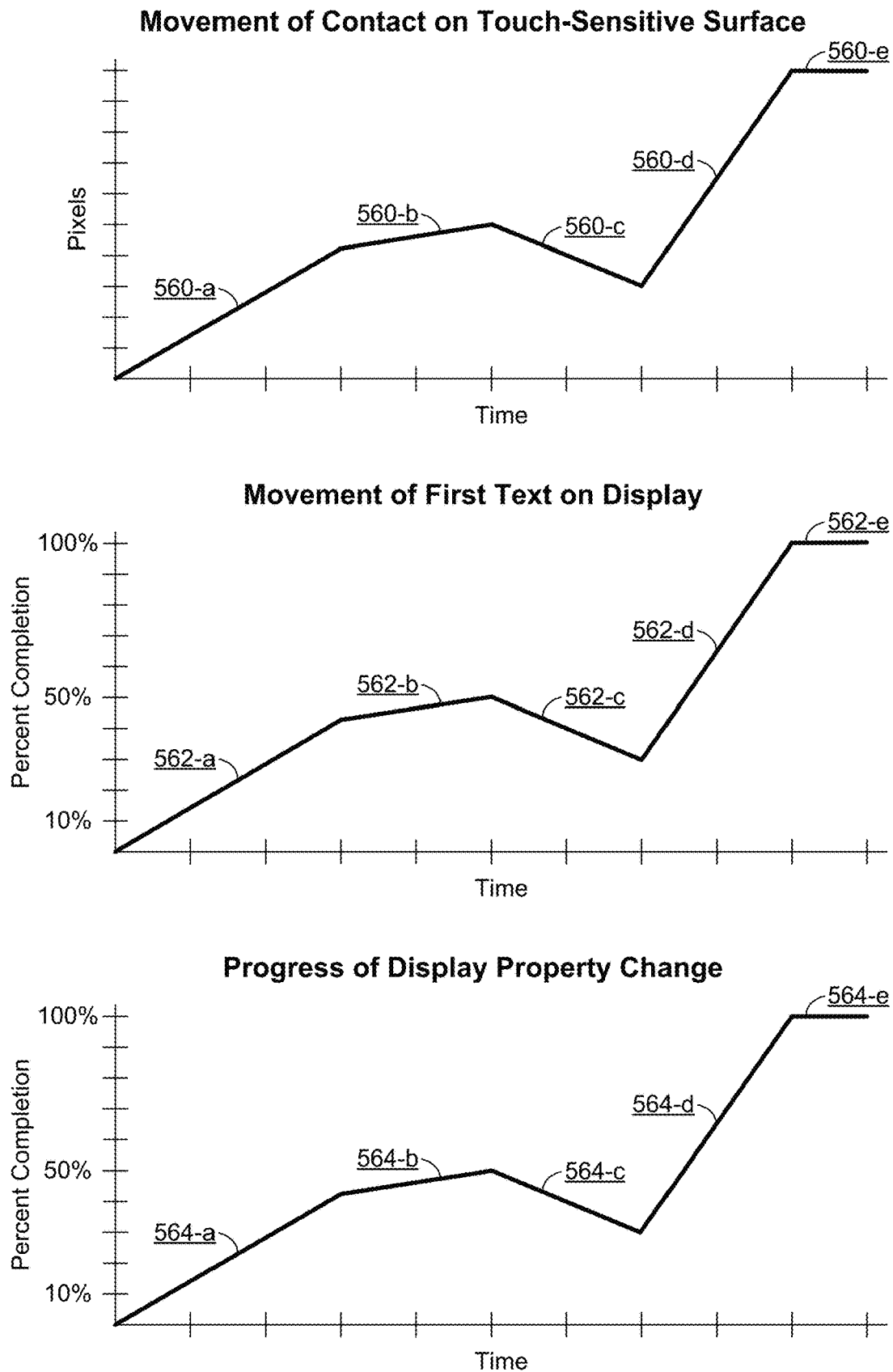
Figure 5J:
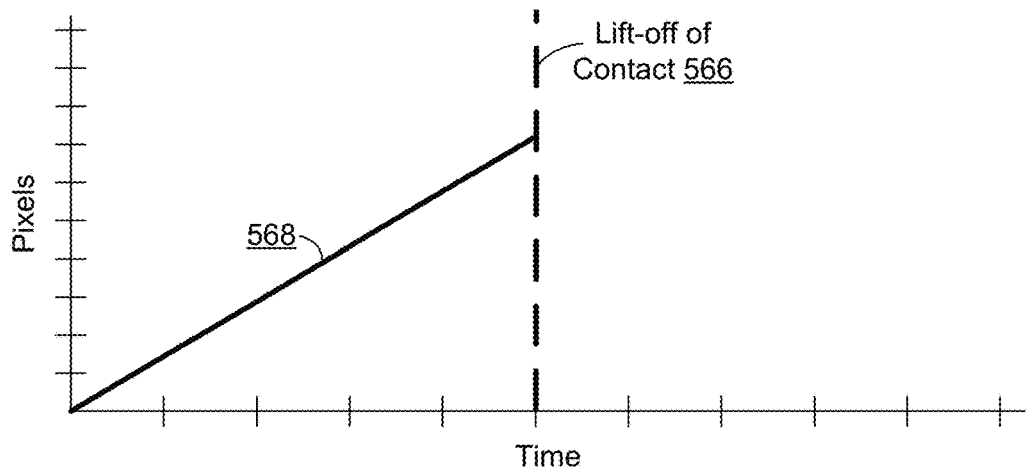
Figure 5J:
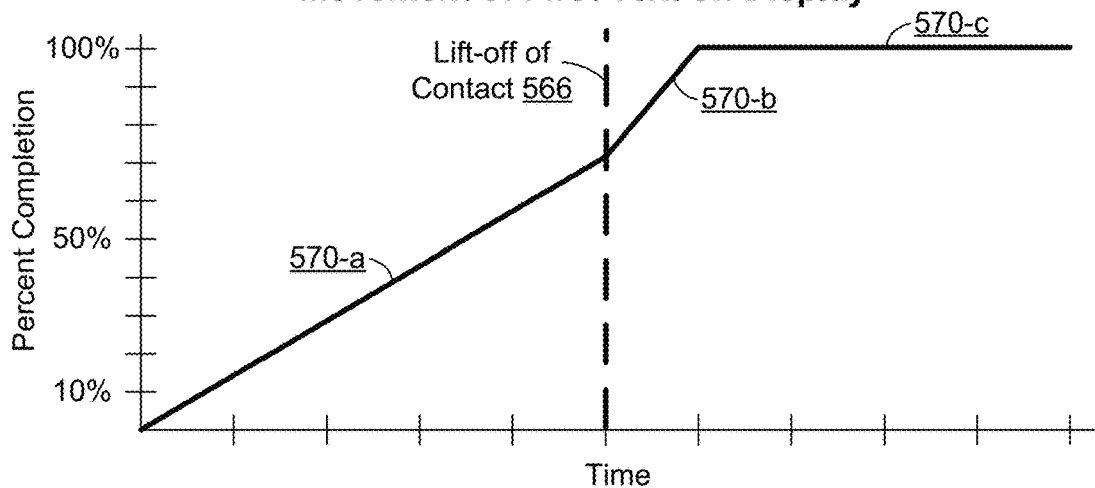
Figure 5J:
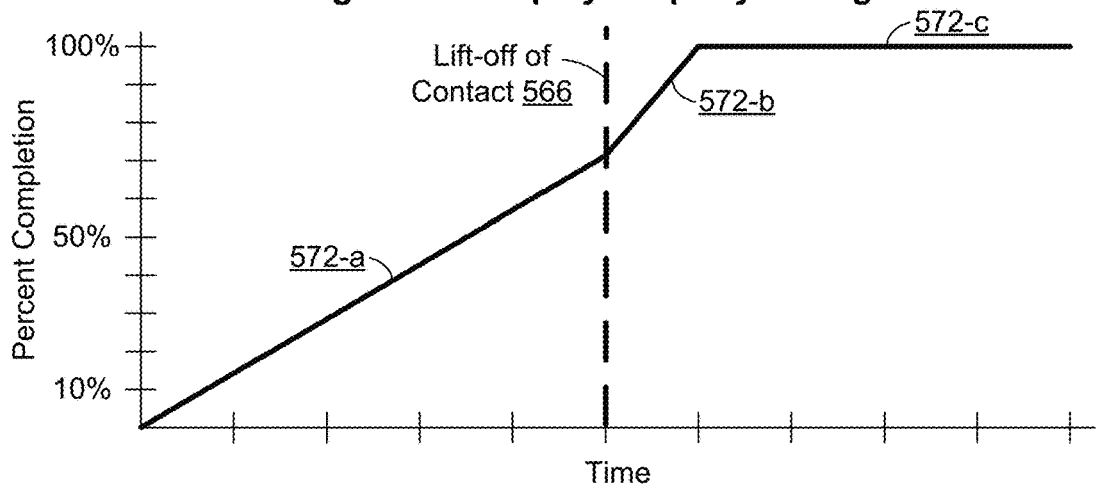
Figure 5K:
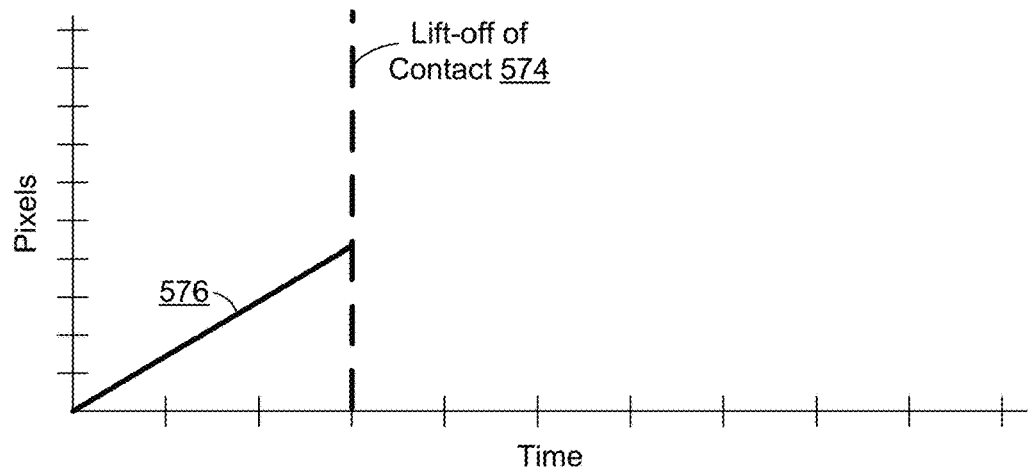
Figure 5K:
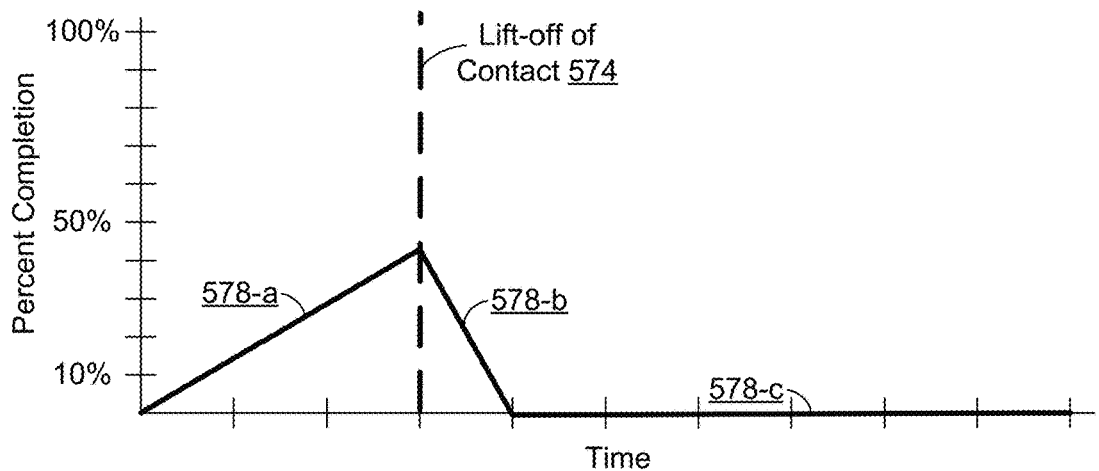
Figure 5K:
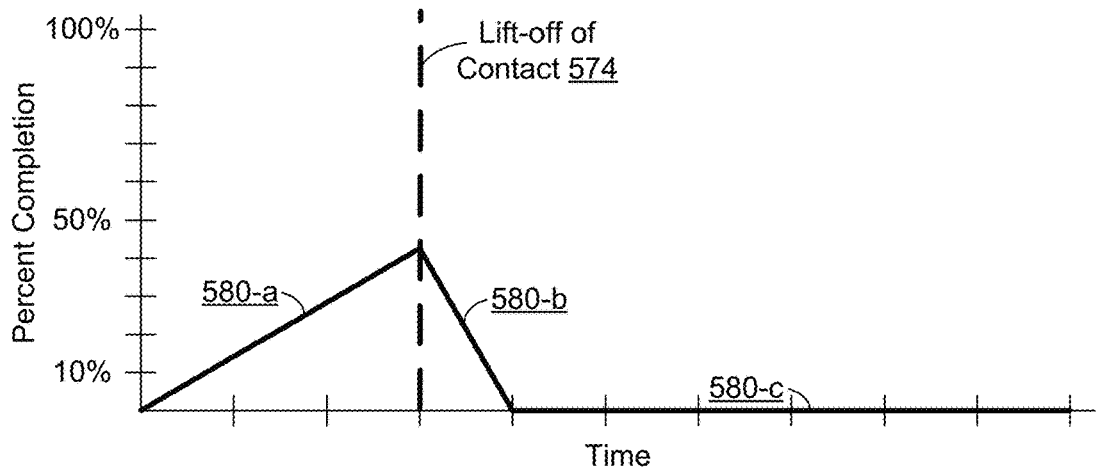
Figure 5L:
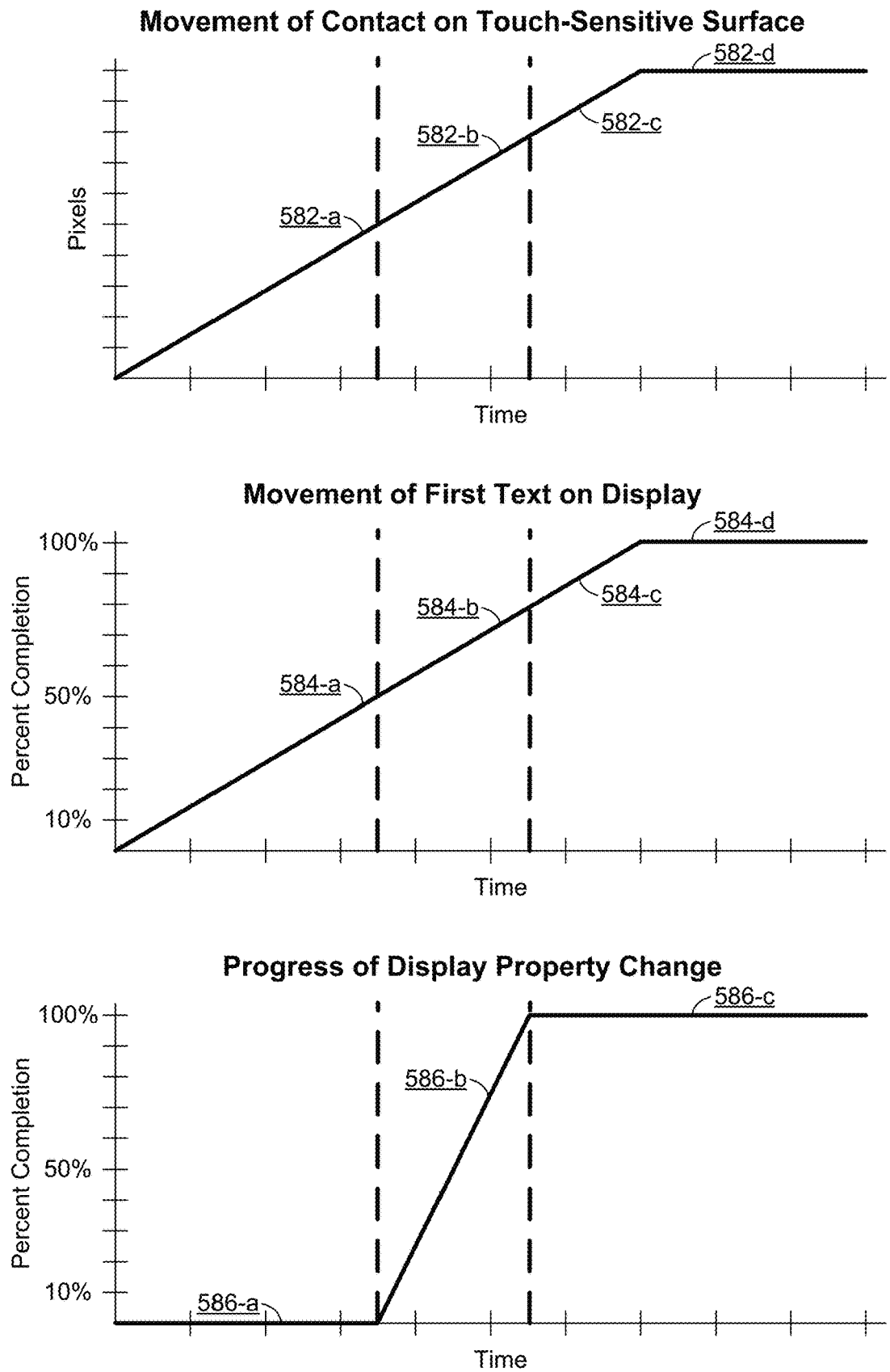
Figure 5M:
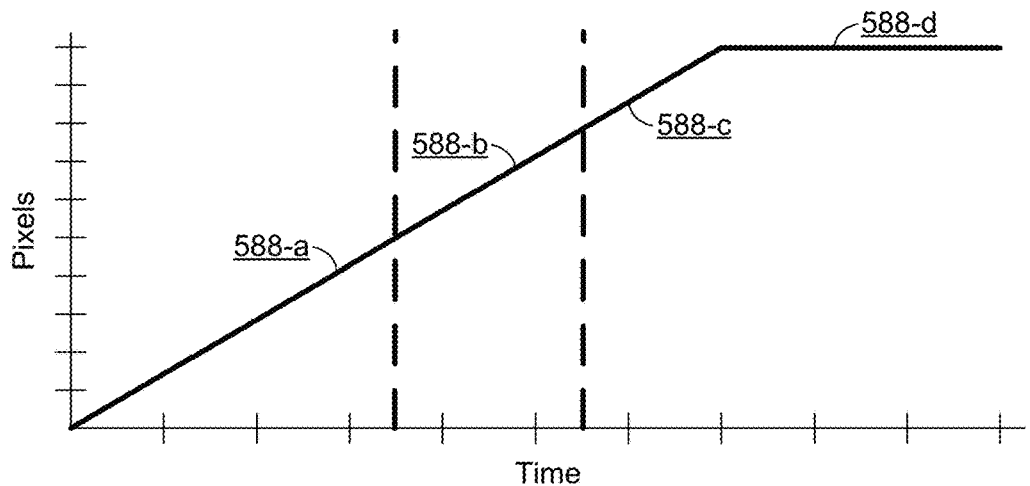
Figure 5M:
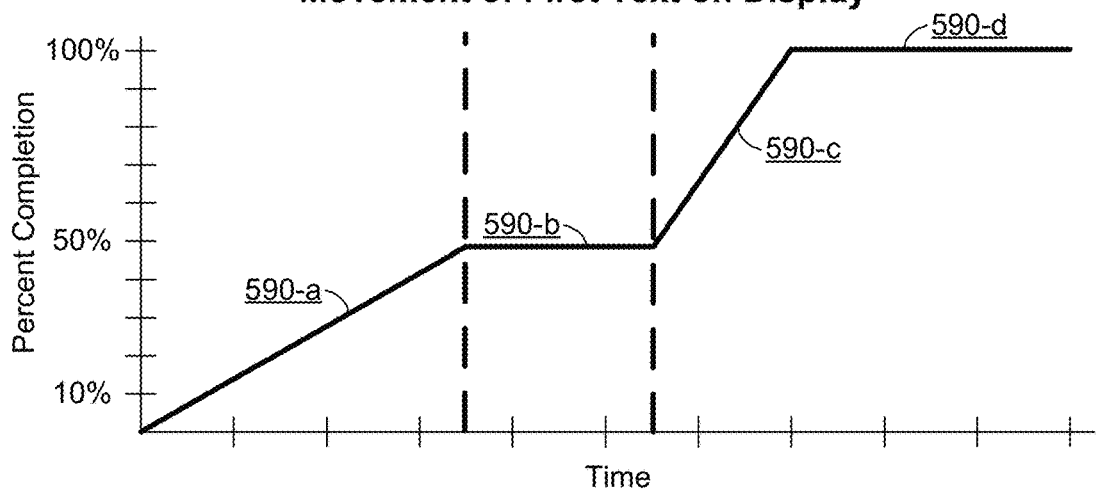
Figure 5M:
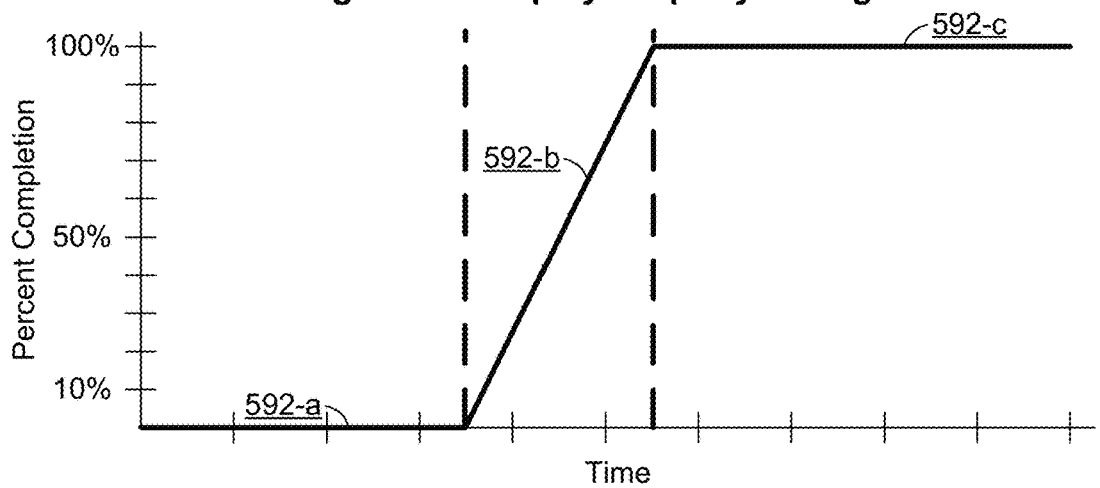
Figure 5N:
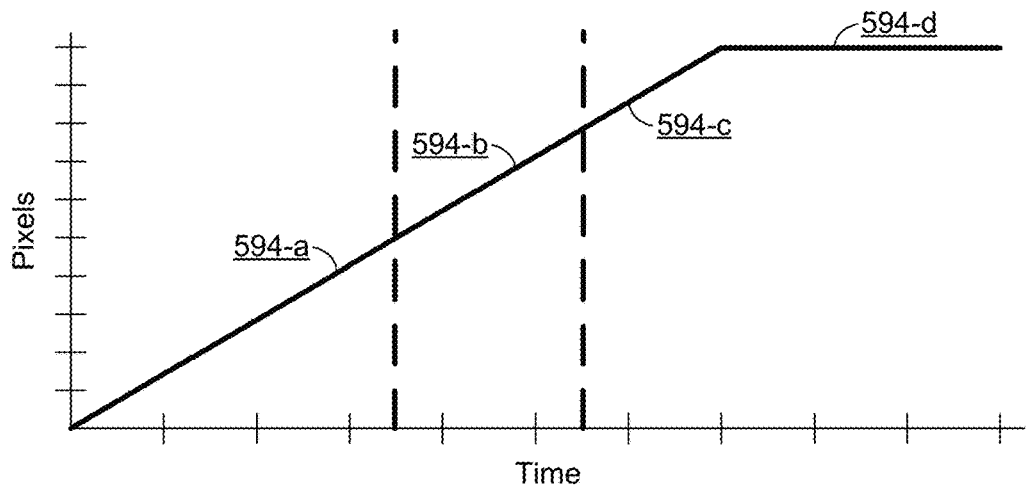
Figure 5N:
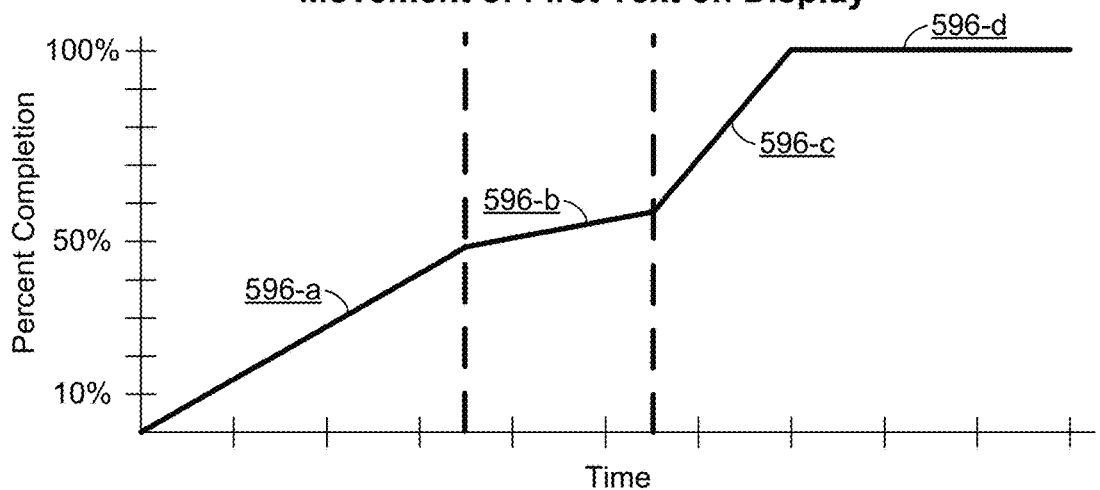
Figure 5N:
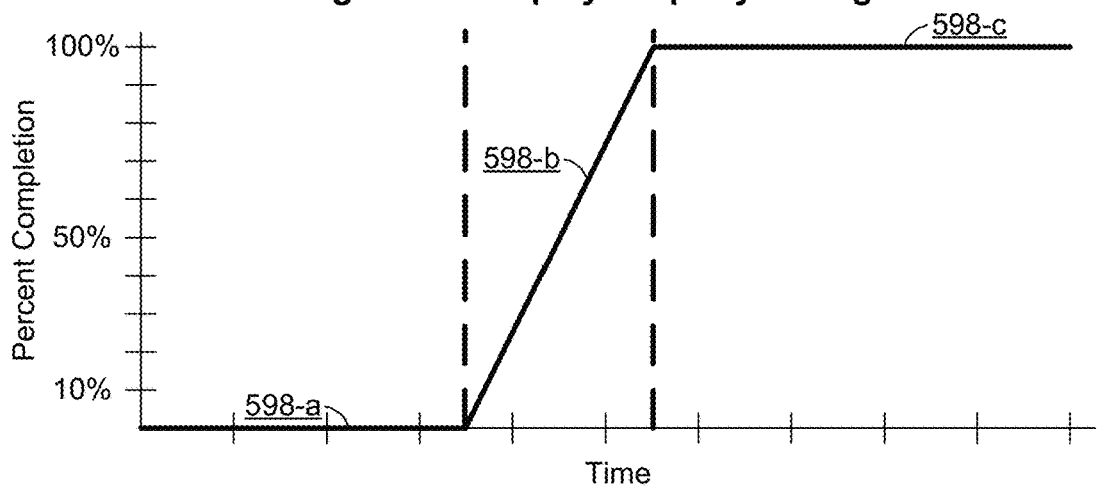
Figure 6A:
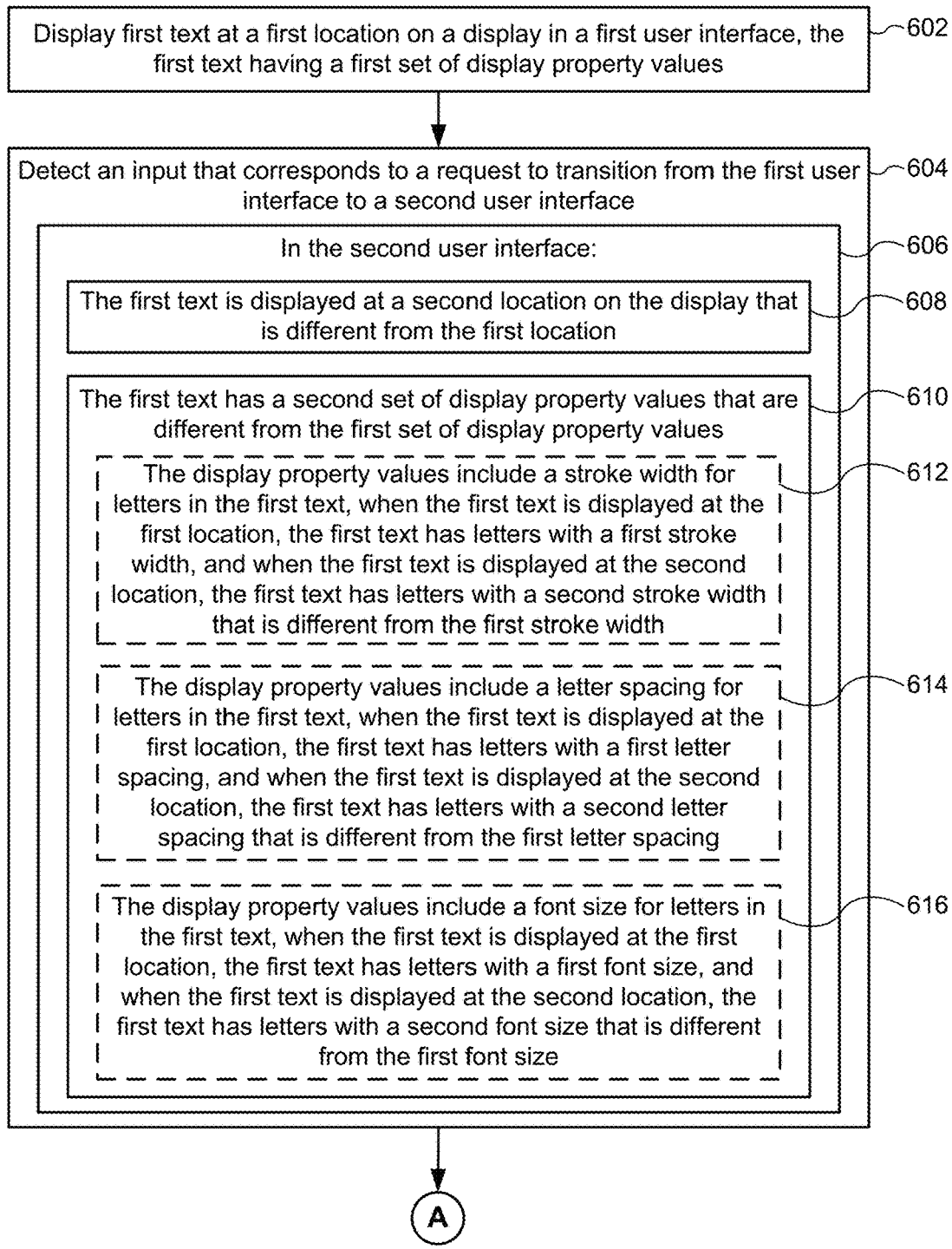
FIGS. 6A-6D are flow diagrams illustrating a method of animating the transition when transitioning between user interfaces in accordance with some embodiments.
Figure 6B:
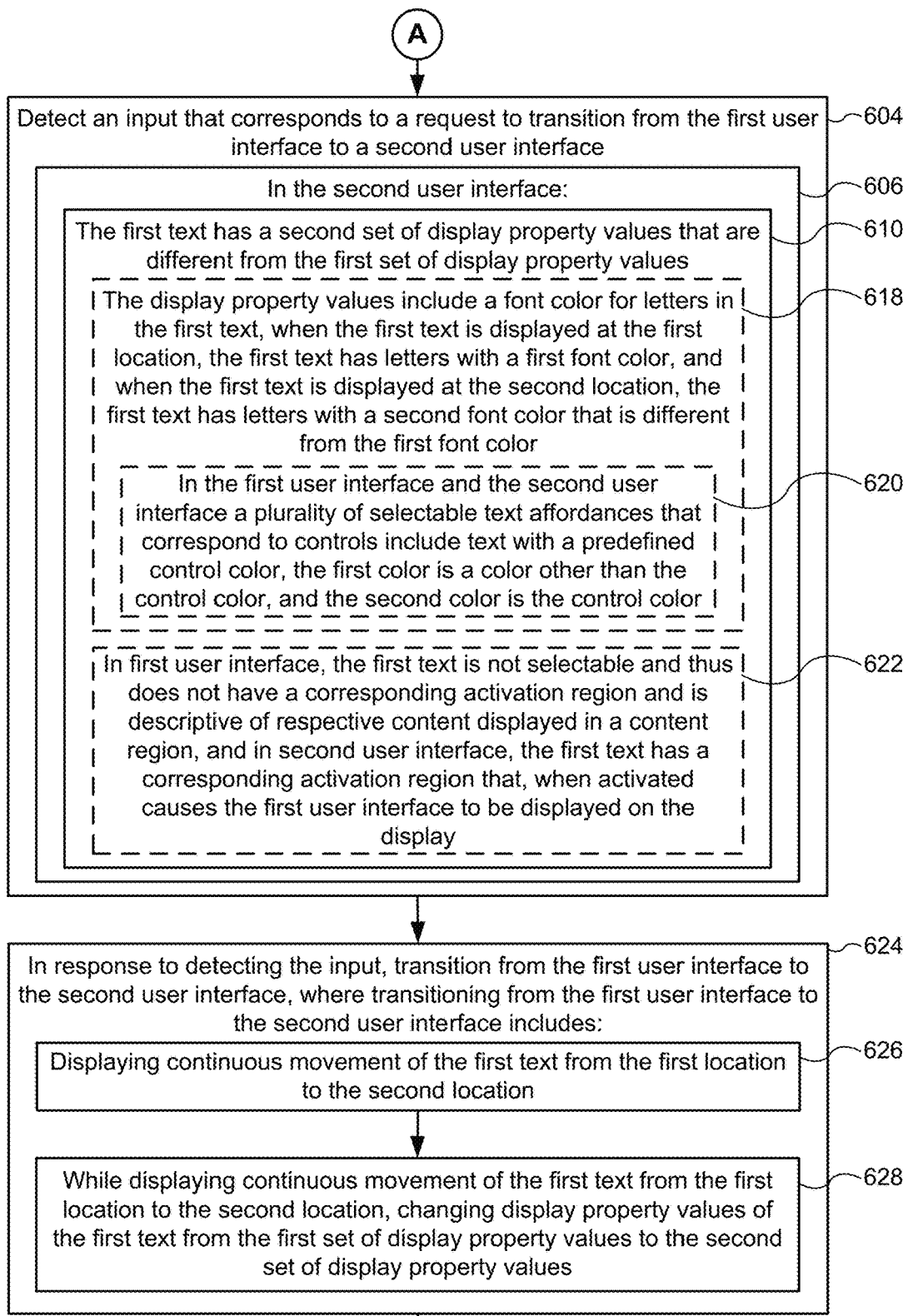
Figure 6C:
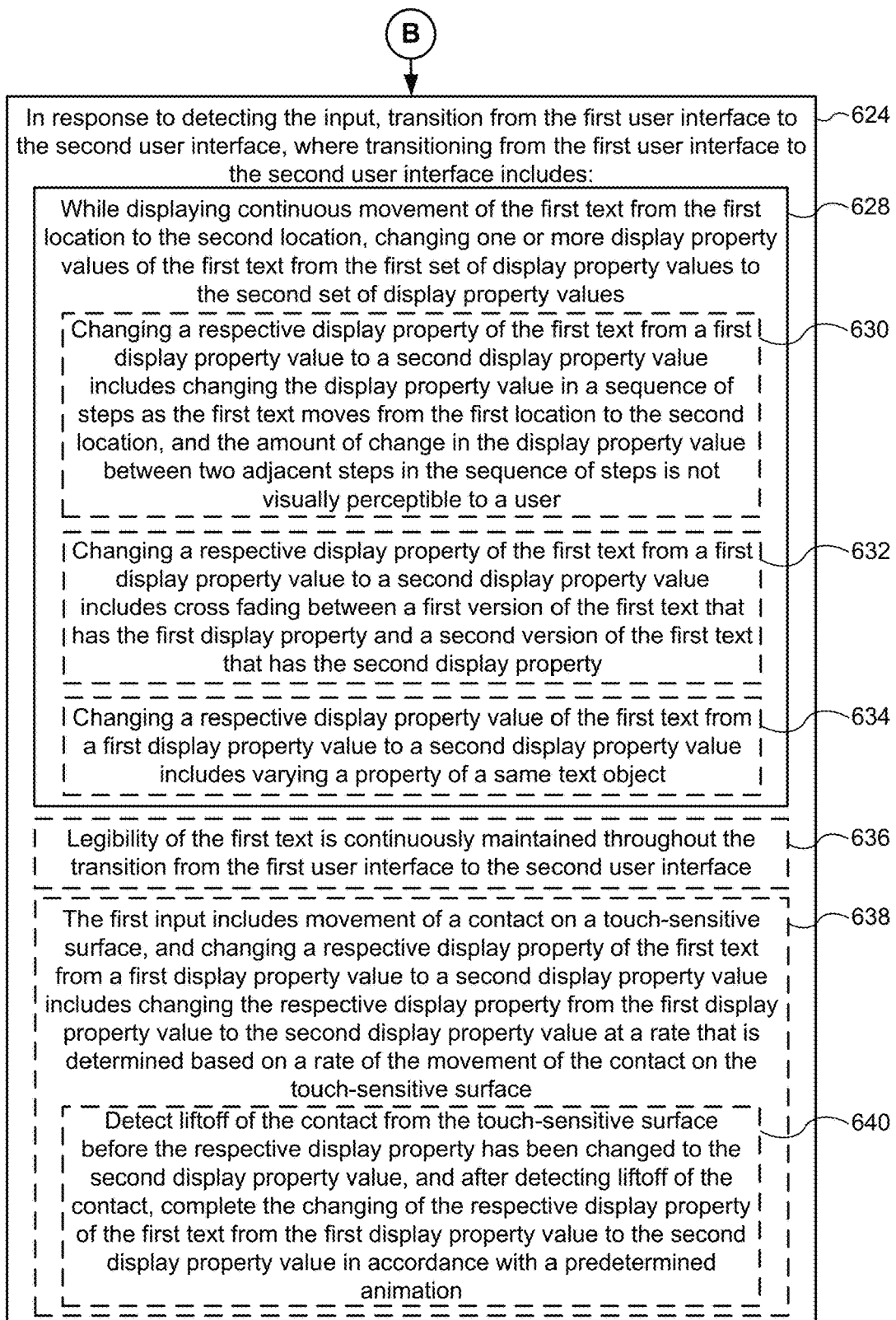
Figure 6D:
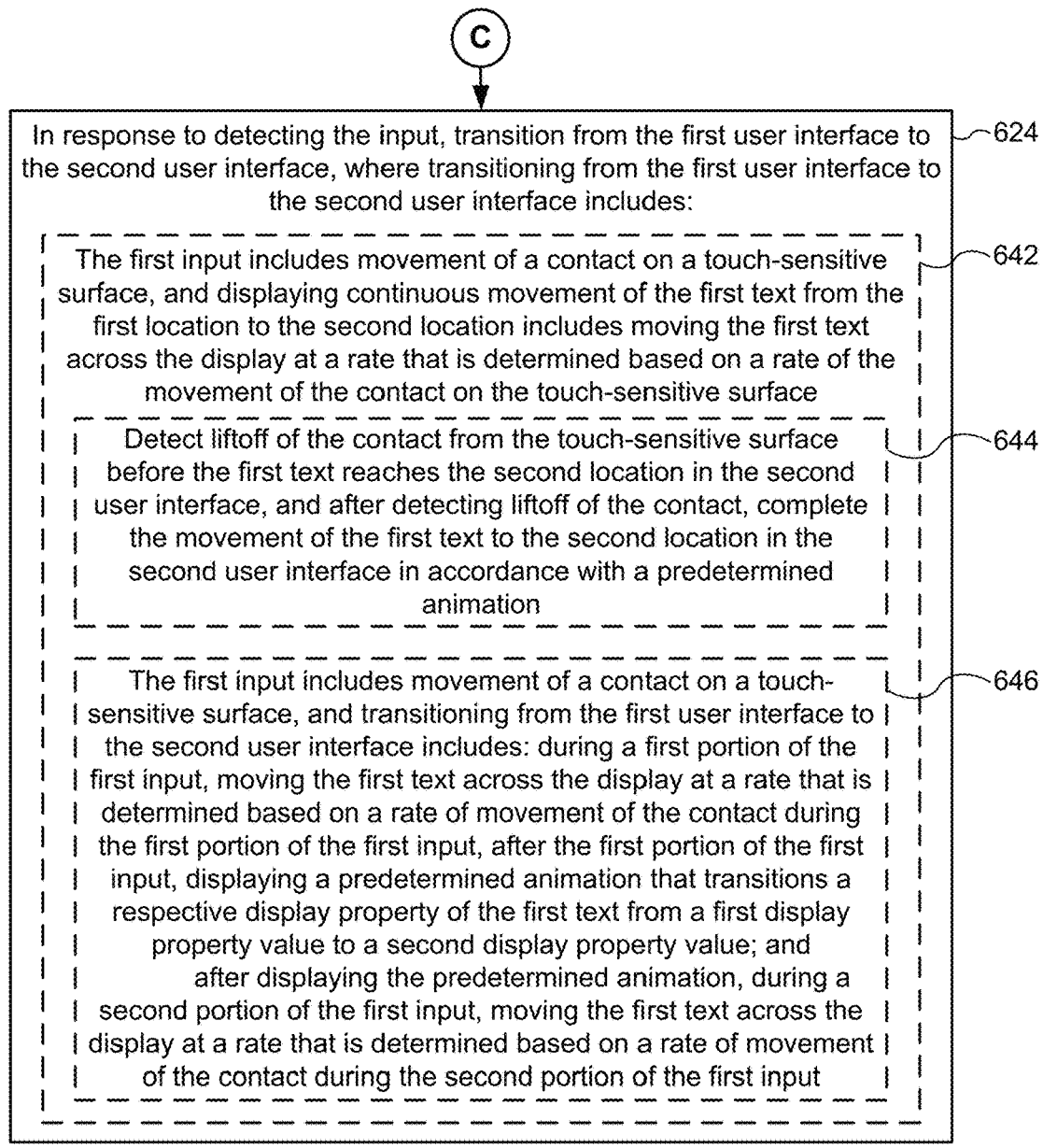

FIGS. 5Z-5AA illustrate embodiments in which multifunction device 100 detects lift-off of contact 530 on touch screen 112 in FIG. 5Z after movement 532 of the contact from position 530-a in FIG. 5U to position 530-c in FIG. 5W or position 530-b in Figure V, respectively, and prior to completion of movement 534 of first text "Albums" 502 from position 502-a, as displayed in first user interface 508 illustrated in FIG. 5T, to position 502-e, as displayed in second user interface 516 illustrated in FIG. 5Y.

In some embodiments, as illustrated in FIG. 5Z, where the gesture including movement 532 of contact 530 meets a predefined criteria including movement across at least half the width of touch screen 112, the transition from display of first user interface 508 to display of second user interface 516 is completed in accordance with a predetermined animation that completes the movement of first text 502 to position 502-e and/or completes the change in the one or more display property of first text 502. For example, as diagramed in FIG. 5JJ, when the multifunction device detects lift-off of contact 566 after movement 568 across at least half the width of the touch-sensitive surface, the movement of the first text on the display is completed at a predetermined rate, as illustrated by portion 570-b of movement 570, and the change in the display property change of the first text is completed at a predetermined rate of progress, as illustrated in second portion 572-b of progress 572. Although the predetermined rate of movement of first text on the display and the predetermined rate of change in the display property of first text on the display, following detection of lift-off of contact 566, are illustrated as equivalent, relative to the total movement and change, respectively, it is understood that the predetermined rates movement and display property change could be non-equivalent, as represented in FIG. 5GG. In some embodiments, the predefined criteria include an input corresponding to a request to change the active user interface hierarchy that does not include contact movement across touch screen 112 (e.g., tapping on a selectable user interface object such as representation 504-1).

In some embodiments, as illustrated in FIG. 5AA, where the gesture including movement 532 of contact 530 does not meet a predefined criteria including movement across at least half the width of touch screen 112, the transition from display of first user interface 508 to display of second user interface 516 is not completed, and the transition from first user interface 508 to second user interface 516 is reversed, such that first user interface 508 is restored, as illustrated in FIG. 5AA. For example, as diagramed in FIG. 5KK, when the multifunction device detects lift-off of contact 574 after movement 576 across less than half the width of the touch-sensitive surface, movement of the first text on the display is reversed at a predetermined rate, as illustrated by portion 578-b of movement 578, and the change in the display property change of the first text is reversed at a predetermined rate of progress, as illustrated in second portion 580-b of progress 580. Although the predetermined rate of movement of first text on the display and the predetermined rate of change in the display property of first text on the display, following detection of lift-off of contact 574, are illustrated as equivalent, relative to the total movement and change, respectively, it is understood that the predetermined rates movement and display property change are, in some embodiments, non-equivalent, as represented in FIG. 5GG.

FIGS. 5BB-5EE illustrate an embodiment in which the user input corresponds to a request to navigate backwards in the user interface hierarchy. For example, FIG. 5BB illustrates multifunction device 100 displaying second user interface 516, including selectable representations 505 of songs from musical album "Bach: Cantatas—BWV 204 & 208" and first text "Albums" 502 displayed at position 502-e in status bar 501 on touch screen 112. In response to detection of a gesture, including movement 538 to the right of contact 536 from the left edge of touch screen 112, multifunction device 100 displays animation of a transition from display of second user interface 516, as illustrated in FIG. 5BB, to display of first user interface 508, as illustrated in FIG. 5BB. The transition animation includes continuous movement 540 of first text "Albums" 502 from position 502-e on touch screen 112 in FIG. 5BB, through intermediate positions 502-c and 502-b on touch screen 112 in FIGS. 5CC and 5DD, respectively, to position 502-a on touch screen 112 in FIG. 5EE. The transition animation also includes an increase in font size of letters in first text "Albums" 502, such that when displayed at position 502-a in first user interface 508 in FIG. 5EE, "Albums" 502 appears larger than when displayed at position 502-e in second user interface 516 in FIG. 5BB. The transition animation also includes movement of second user interface 516 to the right of touch screen 112 at a rate determined by the rate of movement 538 of contact 536, and concurrent appearance of first user interface 508 starting from the left side of touch screen 112. This animation provides the user with the appearance that second user interface 516 was previously covering (or "on top of" in a simulated z-axis or front-to-back order) first user interface 508, and is being pushed-off of first user interface 508 by movement 538 of contact 536. In some embodiments, "Albums" 502 is selectable when displayed at location 502-e in FIG. 5BB and is not selectable when displayed at location 502-a in FIG. 5EE.

FIGS. 6A-6D are flow diagrams illustrating a method 600 of animating the transition when transitioning between user interfaces in accordance with some embodiments. The method 600 is performed at an electronic device (e.g., device 300, FIG. 3, or portable multifunction device 100, FIG. 1A) with a display and optionally a touch-sensitive surface. In some embodiments, the display is a touch screen display and the touch-sensitive surface is on the display. In some embodiments, the display is separate from the touch-sensitive surface. Some operations in method 600 are, optionally, combined and/or the order of some operations is, optionally, changed.

As described below, the method 600 provides an intuitive way to animate the transition when transitioning between user interfaces. The method reduces the cognitive burden on a user when animating the transition when transitioning between user interfaces, thereby creating a more efficient human-machine interface. For battery-operated electronic devices, enabling a user to animate the transition when transitioning between user interfaces faster and more efficiently conserves power and increases the time between battery charges.

In some embodiments, an electronic device (e.g., multifunction device 100 in FIGS. 5A-5EE) display (602) first text (e.g., "Albums 502 in FIGS. 5A-5EE) at a first location on a display (e.g., position 502-a on touch screen 112 in FIGS. 5A-5C, 5E-5H, 5K, 5N-5P, 5S-5U, 5AA, and 5EE) in a first user interface (e.g., user interface 508 in FIGS. 5A-5C, 5E-5H, 5K, 5N-5P, 5S-5U, 5AA, and 5EE), the first text having a first set of display property values (e.g., letter stroke width, letter spacing, font size, and/or font color).

The electronic device (e.g., multifunction device 100 in FIGS. 5A-5EE) detects (604) an input (e.g., contact 510, 518, 520, 526, and/or 528 in FIGS. 5B, 5H, 5J, 5P, and 5R, respectively, and/or gesture including movement of contact 530 and/or 536 in FIGS. 5U and 5BB, respectively) that corresponds to a request to transition from the first user interface (e.g., user interface 508) to a second user interface (e.g., user interface 516 in FIGS. 5D, 5I-5J, 5L-5M, 5Q-5R, 5Y-5Z, and 5BB).

In the second user interface (606): the first text is displayed at a second location on the display (e.g., position 502-e on touch screen 112 in FIGS. 5D, 5I-5J, 5L-5M, 5Q-5R, 5Y-5Z, and 5BB) that is different from the first location (608). For example, as illustrated in FIG. 5C, when multifunction device 100 animates the transition from the first user interface to the second user interface, first text "Albums" moves in status bar 501 from position 502-a in the center of touch screen 112 to position 502-e on the left side of touch screen 112, indicating a change in the active user interface hierarchy.

In the second user interface (606), the first text has a second set of display property values (e.g., letter stroke width, letter spacing, font size, and/or font color) that are different from the first set of display property values (610). For example, when the electronic device (e.g., multifunction device 100) animates the transition from the first user interface to the second user interface, the appearance of the first text (e.g., "Albums" 502) changes, indicating a change in the active user interface hierarchy.

In some embodiments, the display property values include a stroke width for letters in the first text (612), when the first text (e.g., "Albums" 502) is displayed at the first location (e.g., position 502-a on touch screen 112 in FIGS. 5A-5C), the first text has letters with a first stroke width, and when the first text is displayed at the second location (e.g., position 502-e on touch screen 112 in FIGS. 5C-5D), the first text has letters with a second stroke width that is different from (e.g., narrower than or wider than) the first stroke width. For example, as illustrated in FIG. 5C, when multifunction device 100 animates the transition from the first user interface to the second user interface, the letters of first text "Albums" 502 appear to become narrower in the second user interface (e.g., in the bottom panel), as compared to in the first interface (e.g., in the top panel).

In some embodiments, the display property values include a letter spacing for letters in the first text (614), when the first text (e.g., "Albums" 502) is displayed at the first location (e.g., position 502-a on touch screen 112 in the top panel of FIG. 5E), the first text has letters with a first letter spacing, and when the first text is displayed at the second location (e.g., position 502-e on touch screen 112 in the bottom panel of FIG. 5E), the first text has letters with a second letter spacing that is different (e.g., larger than or smaller than) from the first letter spacing. For example, as illustrated in FIG. 5E, when multifunction device 100 animates the transition from the first user interface to the second user interface, the letters of first text "Albums" 502 appear to become closer together (e.g., the letter spacing of the text appears to become smaller) in the second user interface (e.g., in the bottom panel), as compared to in the first interface (e.g., in the top panel).

In some embodiments, the display property values include a font size for letters in the first text (616), when the first text (e.g., "Albums" 502) is displayed at the first location (e.g., position 502-a on touch screen 112 in the top panel of FIG. 5F, and/or in FIGS. 5P, 5S-5T, 5AA, and/or 5EE), the first text has letters with a first font size, and when the first text is displayed at the second location (e.g., position 502-e on touch screen 112 in the bottom panel of FIG. 5F, and/or in FIGS. 5Q-5R, 5Y-5Z, and/or 5BB), the first text has letters with a second font size that is different (e.g., larger than or smaller than) from the first font size. For example, as illustrated in FIG. 5F, when multifunction device 100 animates the transition from the first user interface to the second user interface, the letters of first text "Albums" 502 appear to become smaller (e.g., the font size of the letters is decreased) in the second user interface (e.g., in the bottom panel), as compared to in the first interface (e.g., in the top panel). In some embodiments, the device gradually changes a size of a continuously variable font size that varies stroke width, letter size and letter spacing simultaneously as the font size changes.

In some embodiments, the display property values include a font color for letters in the first text (618), when the first text is displayed at the first location (e.g., position 502-a on touch screen 112 in the top panel of FIG. 5G, and/or in FIGS. 5H, 5K-5L, and/or 5N-5O), the first text has letters with a first font color (e.g., black), and when the first text is displayed at the second location (e.g., position 502-e on touch screen 112 in the bottom panel of FIG. 5G, and/or in FIGS. 5I-5J and/or 5L-5M), the first text has letters with a second font color (e.g., white or blue) that is different from the first font color. For example, as illustrated in FIG. 5G, when multifunction device 100 animates the transition from the first user interface to the second user interface, first text "Albums" 502 appears to change color from black (e.g., as illustrated in the top panel) to white (e.g., as illustrated in the bottom panel).

In some embodiments, in the first user interface (e.g., user interface 508 in FIGS. 5H, 5K-5L, and/or 5N-5O) and the second user interface (e.g., user interface 516 in FIGS. 5I-5J and/or 5L-5M) a plurality of selectable text affordances that correspond to controls (e.g., text 503 and 506 in FIGS. 5H, 5K-5L, and/or 5N-5O) include text with a predefined control color (e.g., the application that includes the first user interface and the second user interface uses the first color as a "control color" to indicate that a string of text is a selectable control for performing a respective operation, while other strings of text that do not correspond to controls do not include text of the first color), the first color is a color other than the control color (e.g., a color such as black that is associated with descriptive text), and the second color is the control color (e.g., a color such as blue that is associated with selectable controls). For example, control text "Store" 506 and "Playing" 503 in first user interface 508 in FIGS. 5H, 5K-5L, and/or 5N-5O, and control text "Albums" 502 and "Playing" 503" in second user interface 516 in FIGS. 5I-5J and/or 5L-5M, are displayed in white, indicating that they are selectable and associated with a respective control (e.g., control text). In contrast, descriptive text "Albums" 502 in first user interface 508 in FIGS. 5H, 5K-5L, and/or 5N-5O, and descriptive text "Bach C . . . " 514 in second user interface 516 in FIGS. 5I-5J and/or 5L-5M, are displayed in black, indicating that they are not selectable and are not associated with a respective control (e.g., descriptive text).

In some embodiments, in the first user interface (e.g., user interface 508 in FIGS. 5A-5C, 5E-5H, 5K, 5N-5P, 5S-5U, 5AA, and 5EE), the first text (e.g., "Albums" 502) is not selectable and thus does not have a corresponding activation region and is descriptive of respective content displayed in a content region (e.g., "Albums" 502 is descriptive of selectable representations 504 of musical albums displayed below status bar 501 in first user interface 508 in FIGS. 5A-5C, 5E-5H, 5K, 5N-5P, 5S-5U, 5AA, and 5EE), and in second user interface (e.g., user interface 516 in FIGS. 5D, 5I-5J, 5L-5M, 5Q-5R, 5Y-5Z, and 5BB), the first text (e.g., "Albums" 502) has a corresponding activation region that, when activated causes the first user interface to be displayed on the display (e.g., activation of "Albums" 502 when displayed at position 502-e in second user interface 516, causes multifunction device 100 to change the user interface back to first user interface 508, navigating backwards in the user interface hierarchy).

In some embodiments, in the first user interface, the first text is purely descriptive text, and there are no operations associated with the first text (e.g., the device does not respond to tap inputs on the first text). For example, multifunction device 100 detects contact 524 at a position corresponding to display of first text "Albums" 502 on touch screen 112 in FIG. 5N. In response to detecting the contact, multifunction device 100 does not change the active user interface from first user interface 508 to second user interface 516 because first text "Albums" 502 is descriptive and not associated with an operation, as illustrated by FIG. 5O, where multifunction device continues to display first user interface 508 after detection of contact 524.

In some embodiments, in the second user interface, the first text is a selectable affordance or control for performing a corresponding operation (e.g., in the transition from the first user interface to the second user interface, the first text transforms into a back button that describes the user interface that will be displayed when the back button is activated). For example, in contrast to FIGS. 5N-5O in which first text "Albums" 502 is not selectable when displayed in first user interface 508, multifunction device 100 detects contact 528 at a position corresponding to display of first text "Albums" 502 on touch screen 112 displaying second user interface 516 in FIG. 5R. In response to detecting the contact, multifunction device 100 navigates backwards in the user interface hierarchy, as illustrated in FIG. 5S, where multifunction device displays first user interface 508 after detection of contact 528.

In response to detecting the input (e.g., contact 510, 518, 520, 526, and/or 528 in FIGS. 5B, 5H, 5J, 5P, and 5R, respectively, and/or gesture including movement of contact 530 and/or 536 in FIGS. 5U and 5BB, respectively), the electronic device (e.g., multifunction device 100) transitions (624) from the first user interface (e.g., user interface 508 in FIGS. 5A-5C, 5E-5H, 5K, 5N-5P, 5S-5U, 5AA, and 5EE) to the second user interface (e.g., user interface 516 in FIGS. 5D, 5I-5J, 5L-5M, 5Q-5R, 5Y-5Z, and 5BB), where transitioning from the first user interface to the second user interface includes: displaying continuous movement (626) of the first text (e.g., "Albums" 502) from the first location (e.g., position 502-a on touch screen 112 in FIGS. 5A-5C, 5E-5H, 5K, 5N-5P, 5S-5U, 5AA, and 5EE) to the second location (e.g., position 502-e on touch screen 112 in FIGS. 5C-5D, 5I-5J, 5L-5M, 5Q-5R, 5Y-5Z, and 5BB), and while displaying continuous movement of the first text from the first location to the second location, changing (e.g., continuously changing) one or more display property values (628) of the first text (e.g., Albums" 502) from the first set of display property values to the second set of display property values (e.g., letter stroke width, letter spacing, font size, and/or font color). For example, in some embodiments, as illustrated in FIGS. 5C and 5E-5G, transitioning from a first user interface to a second user interface includes continuous movement 512 of first text "Albums" 502 from first position 502-a (e.g., as displayed in status bar 501 in the first user interface) to position 502-e (e.g., as displayed in status bar 501 in the second user interface).

In some embodiments, first text is displayed within a region of the display that is common to the first and second user interfaces (e.g., status bar 501). The shared region (e.g., status bar) provides continuity between the first and second user interfaces, as well as provides controls for navigating through the user interface hierarchy (e.g., selectable user interface objects associated with operations for changing the active user interface). In some embodiments, when the electronic device is displaying the first user interface, the first text represents a description of the content displayed outside of the common region (e.g., above, below, to the right, and/or to the left of the status bar) and is displayed at a location within the shared region associated with descriptive text (e.g., in the center of the status bar 501). When a change from the first user interface to the second user interface is requested by the user (e.g., through a dedicated input), the electronic device displays an animation of the first text continuously moving from the location associated with descriptive text (e.g., first location 502-a) to a second location associated with a control (e.g., second location 502-e, associated with an operation that navigates back to the first user interface), as illustrated in FIGS. 5C and 5E-5G. In some embodiments, the first text (e.g., "Albums" 502) replaces a second text (e.g., "Store" 506 in FIG. 5C) that is displayed in the first user interface at the second location (e.g., a position on touch screen 112 associated with an operation that navigates through related user interfaces). In some embodiments, in response to the user request to change from the first user interface to the second user interface, the electronic device (e.g., multifunction device 100) displays an animation (e.g., movement 513) of the second text (e.g., "Store" 506), leaving the display (e.g., touch screen 112), for example, in the same direction as the movement of first text (e.g., first text "Albums" and second text "Store" appear to the user as being connected on a moveable row and/or column of text in the status bar).

In some embodiments, changing display property values of the first text (e.g., Albums 502) from a first display property value to a second display property value includes changing the display property value in a sequence of steps as the first text moves from the first location (e.g., position 502-a on touch screen 112) to the second location (e.g., position 502-e on touch screen 112), and the amount of change in the display property value between two adjacent steps in the sequence of steps is not (630) visually perceptible to a user. In some embodiments, the change in the respective display property advances in steps that are selected to be small enough that a user of the device does not perceive the change in the respective display property (e.g., font size, font color, letter spacing or stroke width) between any two adjacent steps in the sequence of steps when holding the device at a standard viewing distance such as (e.g., a distance greater than 5, 10, 12, 15 or 20 inches). Rather, the user sees a smooth (e.g., continuous) transition between the first display property value and the second display property value.

For example, as illustrated in FIG. 5F, multifunction device 100 displays animation including movement 512 of first text "Albums" 502 from first position 502-a to second position 502-e, and simultaneously reduction of font size, such that when displayed at position 502-e, first text "Albums" 502 appears smaller to the user than when it was displayed at position 502-a. However, individual incremental change in the font size of first text "Albums" 502, which occurs between the illustrated snap-shots of first text "Albums" 502 displayed at positions 502-a, 502-b, 502-c, and 502-e on touch screen 112 is not perceptible to the user (e.g., the font size changes in small steps such at 0.2 point, 0.1 point, 0.05 point, 0.02 point, 0.01 point, or smaller increments).

In some embodiments, changing a respective display property of the first text (e.g., "Albums" 502) from a first display property value to a second display property value includes cross fading (632) between a first version of the first text that has the first display property (e.g., has a first color) and a second version of the first text that has the second display property (e.g., has a first color). For example, in some embodiments, where multifunction device 100 displays animation including movement 512 of first text "Albums" 502 from first position 502-a to second position 502-e on touch screen 112, as illustrated in FIG. 5G, and simultaneously change in the color of first text "Albums" 502, for example from black when displayed at position 502-a to blue when displayed at position 502-e, multifunction device cross-fades a first user interface text "Albums" 502-1 (displayed, for example, having 0% transparency at position 502-a and 100% transparency at position 502-e) having a black font color for the duration of the animation and a second interface text "Albums" 502-2 (displayed, for example, having 100% transparency at position 502-a and 0% transparency at position 502-e) having a blue font color for the duration of the animation. In some embodiments, the first user interface text "Albums" 502-1 and the second user interface text "Albums" 502-2 being displayed with perfect overlay for the entire animation, appearing as a single user interface text "Albums" 502 to the user.

In some embodiments, changing a respective display property value of the first text from a first display property value to a second display property value includes varying (634) a property of a same text object (e.g., gradually decreasing a stroke width, a letter spacing, a font size, and/or a font color of the first text by changing text properties of a single continuously displayed text object). For example, in some embodiments, where multifunction device 100 displays animation including movement 512 of first text "Albums" 502 from first position 502-a to second position 502-e on touch screen 112, as illustrated in FIG. 5G, and simultaneously change in the color of first text "Albums" 502, for example from black when displayed at position 502-a to blue when displayed at position 502-e, multifunction device incrementally changes the font color of "Albums" 502 (e.g., at when displayed at one or more of positions 502-a, 502-b, 502-c, 502-e, and/or intermediate positions).

In some embodiments, legibility of the first text (e.g., "Albums" 502) is continuously maintained (636) throughout the transition from the first user interface to the second user interface. In some embodiments, changing a respective display property of the first text from a first display property value to a second display property value includes changing the respective display property in a sequence of steps as the first text moves from the first location to the second location; and at any of the steps, the first text is legible. In some embodiments, at any point in the transition between the first display property value and the second display property value as the first text moves across the display, the user can clearly read the first text. This continuously maintained legibility of the first text is particularly helpful in situations where the transition proceeds in accordance with direct manipulation by a user. With direct manipulation, the user is able to control a speed of the animation by controlling a speed of movement of a contact on a touch-sensitive surface and thus if the legibility was not continuously maintained throughout the transition, there would be one or more points where the text was illegible to the user which would, in some circumstances, be confusing or distracting to the user.

In some embodiments, the first input includes movement (e.g., movement 532, 536, 554, 560, 568, 576, 582, 588, and/or 594 in FIGS. 5U-5X, 5BB-5DD, 5HH, 5II, 5JJ, 5KK, 5LL, 5MM, and 5NN, respectively) of a contact (e.g., contact 530 and/or 536 in FIGS. 5U-5X and 5BB-5DD, respectively) on a touch-sensitive surface (e.g., touch screen display 112), and changing a respective display property of the first text from a first display property value to a second display property value includes changing the respective display property from the first display property value to the second display property value at a rate that is determined based on a rate of the movement (e.g., the slope of line 554, 560, 568, 576, 582, 588, and/or 594 representing movement of a contact in FIGS. 5HH, 5II, 5JJ, 5KK, 5LL, 5MM, and 5NN, respectively) of the contact (638) on the touch-sensitive surface (e.g., for every 10 pixels the contact moves, the device advances the transition from the first display property value to the second display property value by 10%).

For example, as diagramed in FIG. 5HH, in response to detection of movement 554 of a contact on a touch sensitive surface (top panel), having a first rate of movement (e.g., the slope of movement 554), the electronic device animates change in the display property of first text, the change progressing at a rate (e.g., slope of progress 558 in the bottom panel) corresponding to the rate of movement 554 (e.g., as evidenced by the equivalent slopes of movement 554 and progress 558 at all points in time). This is further illustrated in FIG. 5II, which shows that as the rate of movement of the contact on the touch sensitive surface changes (e.g., slows as between portions 560-a and 560-b, increases as between portions 560-c and 560-d, and/or changes direction as between portions 560-b and 560-c), the rate of progress of the display property varies (e.g., change in letter stroke width, letter spacing, font size, and/or font color) correspondingly changes (e.g., the rate of progress slows as between portions 564-a and 564-b, increases as between portions 564-c and 564-d, or regresses as between portions 564-b and 564-c).

In some embodiments, the electronic device (e.g., multifunction device 100) detects (640) liftoff of the contact (e.g., contact 530 and/or 536 in FIGS. 5U-5X and 5BB-5DD, respectively) from the touch-sensitive surface (e.g., touch screen 112) before the respective display property has been changed to the second display property value, and after detecting liftoff of the contact, the device completes the changing of the respective display property of the first text from the first display property value to the second display property value in accordance with a predetermined animation (e.g., the device automatically completes the animated transition once the user has ended the direct manipulation).

For example, as diagramed in FIG. 5JJ, movement 568 of contact 566 (e.g., diagramed in the top panel) corresponds to progress 572 of the display property change of first text (e.g., diagramed in the bottom panel. The electronic device then detects lift-off of contact 566 at some time (represented by the dashed line in each panel) after initiation of movement 568. After detecting the lift-off of contact 566, the electronic device completes the display property change, represented by progress 572, at a predetermined rate (e.g., at a rate corresponding to the slope of portion 572-b in the bottom panel), which, in some embodiments, is different from the previous rate of change (e.g., the slope of portion 572-a in the bottom panel) dictated by the rate of movement of contact 566 (e.g., the slope of 568 in the top panel).

In some embodiments, where the input corresponding to a request to change the displayed user interface includes movement of a user contact, the electronic device detects lift-off of a contact (e.g., lift-off of contact 566 in FIG. 5JJ and/or contact 574 in FIG. 5KK) and completes the display property change (e.g., completes the transition from display of a first user interface to display of a second user interface) is a predefined criteria has been met (e.g., the input includes movement of a user contact across at least half the width of the touch-sensitive surface). For example, where movement of contact 566 in FIG. 5JJ includes movement across more than half the width of the touch sensitive surface (e.g., as indicated by greater than 50% completion in the progress of the display property change in the bottom panel), after detecting lift-off of contact 566, the electronic device completes the display property change of the first text. In contrast, as diagramed in FIG. 5KK, where movement of contact 574 includes movement across less than half the width of the touch sensitive surface (e.g., as indicated by less than 50% completion in the progress of the display property change in the bottom panel), after detecting lift-off of contact 574, the electronic device does not complete the display property change of the first text (e.g., does not complete the transition from display of the first user interface to the second user interface).

In some embodiments, the first input 642 includes movement (e.g., movement 532, 536, 554, 560, 568, 576, 582, 588, and/or 594 in FIGS. 5U-5X, 5BB-5DD, 5HH, 5II, 5JJ, 5KK, 5LL, 5MM, and 5NN, respectively) of a contact (e.g., contact 530 and/or 536 in FIGS. 5U-5X and 5BB-5DD, respectively) on a touch-sensitive surface (e.g., touch sensitive surface 112), and displaying continuous movement of the first text (e.g., "Albums" 502) from the first location (e.g., position 502-a on touch screen 112) to the second location (e.g., position 502-e on touch screen 112) includes moving the first text across the display at a rate (e.g., the slope of line 556, 562, 570, 578, 584, 590, and/or 596 representing movement of first text on the display in FIGS. 5HH-5NN, respectively) that is determined based on a rate of the movement of the contact (e.g., the slope of line 554, 560, 568, 576, 582, 588, and/or 594 representing movement of the contact on the touch-sensitive surface in FIGS. 5HH-5NN, respectively) on the touch-sensitive surface. For example, the device moves the first text (e.g., "Albums" 502) with direct manipulation where, for every 10 pixels the contact moves, the first text moves by 10 pixels or the device moves the first text with proportional manipulation where, for every 10 pixels the contact moves, the first text moves by a predetermined amount of pixels such as 1, 5, or 15 pixels.

In some embodiments, the user manipulates a user interface object on the display with direct manipulation. For example, the user is switching between two user interfaces and a second user interface (e.g., user interface 516 in FIGS. 5U-5Y) appears to slide over a first user interface (e.g., user interface 508 in FIGS. 5U-5Y) at a rate that corresponds to a rate of movement (e.g., movement 532 in FIGS. 5U-5Y) of the contact (e.g., contact 530 in FIGS. 5U-5Y) on the touch-sensitive surface (e.g., touch screen 112) with a 1:1 correspondence between the number of pixels that the contact moves in a respective direction and the number of pixels that the first user interface moves on the display in the respective direction. The first text (e.g., "Albums" 502) moves from the first location (e.g., position 502-a on touch screen 112 in FIG. 5U) to the second location (e.g., position 502-3 on touch screen 112 in FIG. 5Y) in proportion to the movement (e.g., movement 532) of the second user interface (e.g., user interface 516) across the display (e.g., if the first user interface has moved 50% of the way across the display the first text will have moved 50% of the way between the first location and the second location, and if the first user interface has moved 75% of the way across the display the first text will have moved 75% of the way between the first location and the second location.).

For example, as diagramed in FIG. 5HH, in response to detection of movement 554 of a contact on a touch sensitive surface (top panel), having a first rate of movement (e.g., the slope of movement 554), the electronic device animates movement of first text, the movement having a rate (e.g., slope of movement 556 in the middle panel) corresponding to the rate of movement 554 of the contact (e.g., as evidenced by the equivalent slopes of movement 554 and movement 556 at all points in time). This is further illustrated in FIG. 5II, which shows that as the rate of movement of the contact on the touch sensitive surface changes (e.g., slows as between portions 560-a and 560-b, increases as between portions 560-c and 560-d, and/or changes direction as between portions 560-b and 560-c), the rate of movement of first text on the display changes correspondingly (e.g., the rate of movement slows as between portions 564-a and 564-b, increases as between portions 564-c and 564-d, or regresses as between portions 564-b and 564-c).

In some embodiments, the electronic device (e.g., multifunction device 100) detects (644) liftoff of the contact (e.g., contact 530 and/or 536 in FIGS. 5U-5X and 5BB-5DD, respectively) from the touch-sensitive surface (e.g., touch screen 112) before the first text (e.g., "Albums" 502) reaches the second location (e.g., position 502-e on touch screen 112) in the second user interface (e.g., user interface 516), and after detecting liftoff of the contact, complete the movement of the first text to the second location in the second user interface in accordance with a predetermined animation (e.g., the device automatically completes the animated transition once the user has stopped the direct manipulation).

For example, as diagrammed in FIG. 5JJ, portion 570-a of movement 570 of first text on the display (middle panel) has a first rate corresponding to the rate of movement 568 of contact 566 (top panel). The electronic device then detects lift-off of contact 566 at some time (represented by the dashed line in each panel) after initiation of movement 568. After detecting the lift-off of contact 566, the electronic device completes display of movement 570 of first text from the first position on the display to the second position on the display at a predetermined rate (e.g., the slope of portion 570-b of movement 570 in the middle panel), which, in some embodiments, is different from the previous rate of movement (e.g., the slope of portion 570-a of movement 570 in the middle panel) dictated by the rate of movement of contact 566 (e.g., the slope of 568 in the top panel).

In some embodiments, if the first input meets operation performance criteria (e.g., movement of contact a predetermined distance and/or a user contact having a pressure maximum exceeding a predetermined pressure threshold), the device automatically completes the animated transition once the user has stopped the direct manipulation and if the first input does not meet the operation performance criteria, the device reverses the animated transition to redisplay the first text in the first location in the first user interface with the respective display property having the first display property value.

For example, where movement of contact 566 in FIG. 5JJ includes movement across more than half the width of the touch sensitive surface (e.g., as indicated by greater than 50% completion of the movement of the first text in the middle panel), after detecting lift-off of contact 566, the electronic device completes movement 570 of the first text from the first location to the second location on the display. In contrast, as diagramed in FIG. 5KK, where movement of contact 574 includes movement across less than half the width of the touch sensitive surface (e.g., as indicated by less than 50% completion of the movement of the first text in the middle panel), after detecting lift-off of contact 574, the electronic device does not complete movement 570 of the first text from the first location to the second location on the display (e.g., does not complete the transition from display of the first user interface to the second user interface).

In some embodiments, the first input includes movement of a contact (e.g., movement 582, 588, and/or 594 in FIGS. 5LL-5NN, respectively) on a touch-sensitive surface (e.g., touch sensitive surface 112), and transitioning from the first user interface (e.g., user interface 508) to the second user interface (e.g., user interface 516) includes (646): during a first portion of the first input (e.g., portion 588-a), moving the first text across the display at a rate (e.g., slope of portion 590-a) that is determined based on a rate of movement of the contact (e.g., slope of portion 588-a) during the first portion of the first input (e.g., the device moves the first text with direct manipulation where, for every 10 pixels the contact moves, the first text moves by 10 pixels or the device moves the first text with proportional manipulation where, for every 10 pixels the contact moves, the first text moves by a predetermined amount of pixels such as 1, 5, or 15 pixels), after the first portion of the first input (e.g., portion 588-b), displaying a predetermined animation that transitions a respective display property of the first text from a first display property value to a second display property value (e.g., the device displays a previously defined animation that progresses at a rate determined by a preexisting definition of the animation), and after displaying the predetermined animation, during a second portion of the first input, moving the first text across the display at a rate (e.g., slope of portion 590-c) that is determined based on a rate of movement of the contact (e.g., slope of portion 588-c) during the third portion (e.g., portion 588-c) of the first input (e.g., the device moves the first text with direct manipulation where, for every 10 pixels the contact moves, the first text moves by 10 pixels or the device moves the first text with proportional manipulation where, for every 10 pixels the contact moves, the first text moves by a predetermined amount of pixels such as 1, 5, or 15 pixels)

In some embodiments, as illustrated in FIG. 5LL, the device continues to move the first text across the display at a rate that is determined based on the rate of movement of the contact while the predetermined animation is displayed. In some embodiments, as illustrated in FIG. 5MM, the first text ceases to move the first text across the display at a rate that is determined based on the rate of movement of the contact while the predetermined animation is displayed. In some embodiments, as illustrated in FIG. 5NN, the first text moves at a predetermined rate across the display while the predetermined animation is displayed.

Thus, in some embodiments, the transition between the first user interface (e.g., user interface 508) and the second user interface (e.g., user interface 516) includes moving the first text (e.g., "Albums" 502) to a transition point (e.g., a predetermined location on the display) with direct manipulation or proportional manipulation, and then displaying a predetermined animation (e.g., a change in one or more display property of the first text), and after the predetermined animation has been displayed, continuing to display movement of the first text from the transition point to the second location in the second user interface in accordance with direct manipulation or proportional manipulation by the user.

It should be understood that the particular order in which the operations in FIGS. 6A-6D have been described is merely exemplary and is not intended to indicate that the described order is the only order in which the operations could be performed. One of ordinary skill in the art would recognize various ways to reorder the operations described herein.

Figure 7:
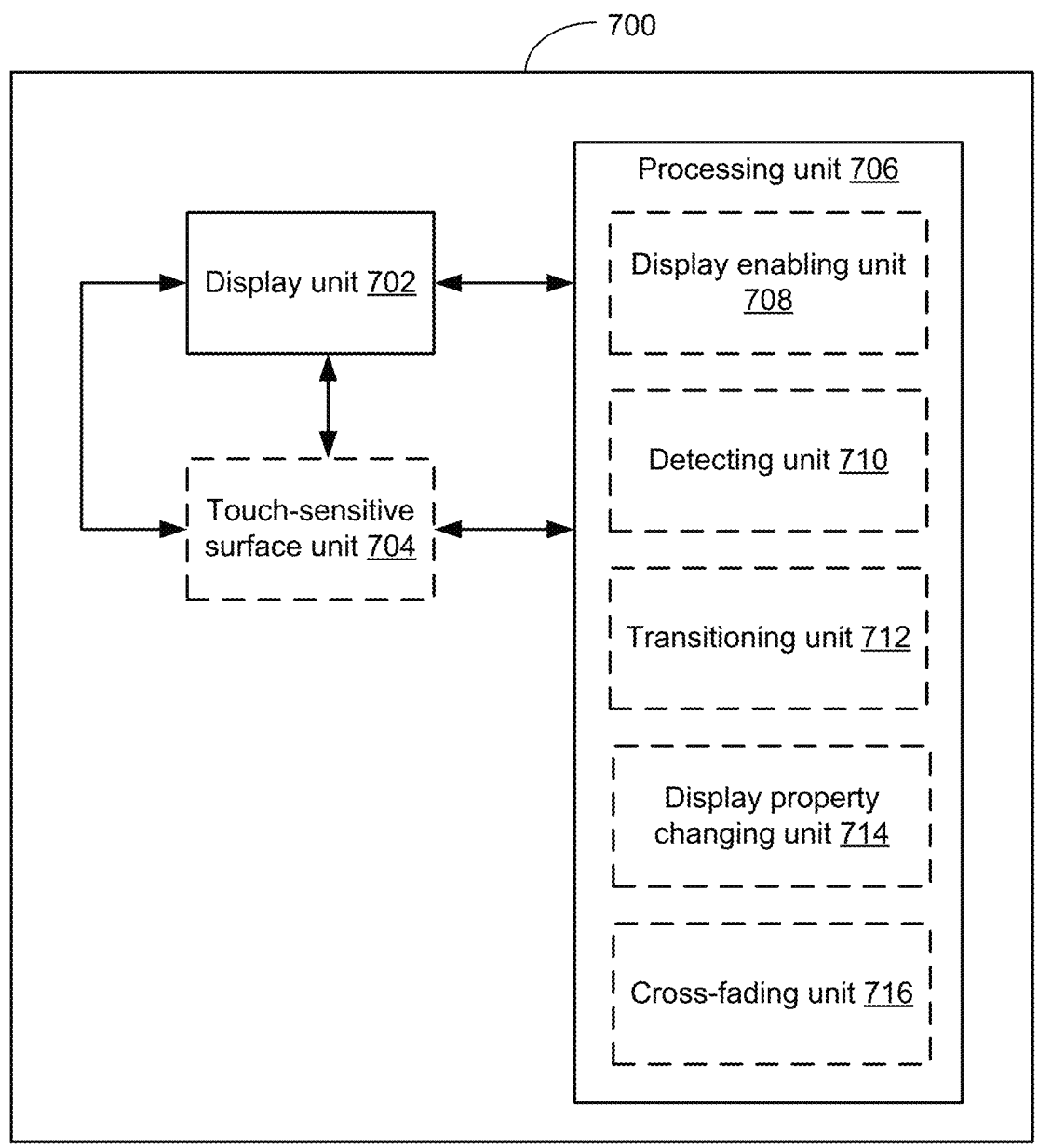
FIG. 7 is a functional block diagram of an electronic device in accordance with some embodiments.

In accordance with some embodiments, FIG. 7 shows a functional block diagram of an electronic device 700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, an electronic device 700 includes a display unit 702 configured to display a first graphic user interface and a second graphic user interface; optionally, a touch-sensitive surface unit 704 configured to receive contacts; and a processing unit 706 coupled to the display unit 702 and the touch-sensitive surface unit 704. In some embodiments, the processing unit 706 includes a display enabling unit 708, a detecting unit 710, a transitioning unit 712, a display property changing unit 714, and a cross-fading unit 716.

The processing unit 706 is configured to: enable display of first text at a first location on the display unit in a first user interface (e.g., with display enabling unit 708), the first text having a first set of display property values; detect an input that corresponds to a request to transition from enabling display of the first user interface to enabling display of a second user interface (e.g., with the detecting unit 710), where, in the second user interface: display of the first text is enabled (e.g., with the display enabling unit 708) at a second location on the display unit 702 that is different from the first location, and the first text has a second set of display property values that are different from the first set of display property values; and, in response to detecting the input, transition from enabling display of the first user interface to enabling display of the second user interface (e.g., with the transitioning unit 712), wherein transitioning from enabling display of the first user interface to enabling display of the second user interface includes: enabling display of continuous movement of the first text from the first location to the second location (e.g., with the display enabling unit 708); and while enabling display of continuous movement of the first text from the first location to the second location, enabling display of a change of a respective display property of the first text from the first set of display property values to the second set of display property values (e.g., with the display enabling unit 708 and display property changing unit 714).

In some embodiments, the display property values include a stroke width for letters in the first text; when display of the first text is enabled at the first location, the first text has letters with a first stroke width; and when display of the first text is enabled at the second location, the first text has letters with a second stroke width that is different from the first stroke width.

In some embodiments, the display property values include a letter spacing for letters in the first text; when display of the first text is enabled at the first location, the first text has letters with a first letter spacing; and when display of the first text is enabled at the second location, the first text has letters with a second letter spacing that is different from the first letter spacing.

In some embodiments, the display property values include a font size for letters in the first text; when display of the first text is enabled at the first location, the first text has letters with a first font size; and when display of the first text is enabled at the second location, the first text has letters with a second font size that is different from the first font size.

In some embodiments, the display property values include a font color for letters in the first text; when display of the first text is enabled at the first location, the first text has letters with a first font color; and when display of the first text is enabled at the second location, the first text has letters with a second font color that is different from the first font color.

In some embodiments, processing unit 706 is further configured to enable display of a plurality of selectable text affordances in the first user interface and the second user interface that correspond to controls (e.g., with the display enabling unit 708), the plurality of selectable text affordances include text with a predefined control color, where the first color is a color other than the control color, and the second color is the control color.

In some embodiments, in the first user interface, the first text is not selectable and thus does not have a corresponding activation region and is descriptive of respective content displayed in a content region, and in second user interface, the first text has a corresponding activation region that, when activated causes the first user interface to be displayed on the display unit 702.

In some embodiments, enabling display of a change of a respective display property of the first text from a first display property value to a second display property value includes enabling display of the change of the display property value in a sequence of steps as the first text moves from the first location to the second location (e.g., with the display enabling unit 708); and the amount of change in the display property value between two adjacent steps in the sequence of steps is not visually perceptible to a user.

In some embodiments, legibility of the first text is continuously maintained throughout the transition from enabling display of the first user interface to enabling display of the second user interface.

In some embodiments, enabling display of a change of a respective display property of the first text from a first display property value to a second display property value includes enabling display of cross fading between a first version of the first text that has the first display property and a second version of the first text that has the second display property (e.g., with the display enabling unit 708 and/or cross fading unit 716).

In some embodiments, enabling display of a change of a respective display property value of the first text from a first display property value to a second display property value includes varying a property of a same text object.

In some embodiments, the first input includes movement of a contact on touch-sensitive surface unit 704; and enabling display of a change of a respective display property of the first text from a first display property value to a second display property value includes enabling display of the change of the display property from the first display property value to the second display property value at a rate that is determined based on a rate of the movement of the contact on the touch-sensitive surface (e.g., with the display enabling unit 708 and/or display property changing unit 714).

In some embodiments, processing unit 706 is further configured to: detect liftoff of the contact from the touch-sensitive surface unit 704 before the respective display property has been changed to the second display property value (e.g., with the detecting unit 710); and after detecting liftoff of the contact, complete the enabling display of the change of the respective display property of the first text from the first display property value to the second display property value in accordance with a predetermined animation (e.g., with the display enabling unit 708 and/or display property changing unit 714).

In some embodiments, the first input includes movement of a contact on touch-sensitive surface unit 704; and enabling display of continuous movement of the first text from the first location to the second location includes, enabling display of movement of the first text across the display unit (e.g., with the display enabling unit 708) at a rate that is determined based on a rate of the movement of the contact on the touch-sensitive surface unit 704.

In some embodiments, processing unit 706 is further configured to: detect liftoff of the contact from the touch-sensitive surface unit 704 before the first text reaches the second location in the second user interface (e.g., with detecting unit 710); and after detecting liftoff of the contact, complete the enabling display of movement of the first text to the second location in the second user interface in accordance with a predetermined animation (e.g., with the display enabling unit 708).

In some embodiments, the first input includes movement of a contact on touch-sensitive surface unit 704; and transitioning from enabling display of the first user interface to enabling display of the second user interface includes: during a first portion of the first input, enabling display of movement of the first text across the display unit at a rate that is determined based on a rate of movement of the contact during the first portion of the first input (e.g., with the display enabling unit 708); after the first portion of the first input, enabling display of a predetermined animation that transitions a respective display property of the first text from a first display property value to a second display property value (e.g., with the display enabling unit 708 and display property changing unit 714); and after displaying the predetermined animation, during a second portion of the first input, enabling display of movement of the first text across the display unit at a rate that is determined based on a rate of movement of the contact during the second portion of the first input (e.g., with the display enabling unit 708).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6D are, optionally, implemented by components depicted in FIGS. 1A-1B or FIG. 7. For example, displaying operation 602, detection operation 604, and transitioning operation 624 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
    at an electronic device with a display:
        displaying a first user interface in a hierarchy of user interfaces, wherein the first user interface includes a text object displayed at a first location in the first user interface, the text object including first text having a first set of display property values;

while continuously displaying the text object:
  detecting a user input;
  in response to detecting the user input, transitioning to a second user interface in the hierarchy of user interfaces, including:
    moving the entire text object from the first location, at which the first text has the first set of display property values, to a second location, at which the first text has a second set of display property values;
    varying, as the entire text object moves from the first location to the second location, one or more properties of the continuously displayed text object, including a font color of the text object, from the first set of display property values to the second set of display property values through a plurality of intermediate states, the plurality of intermediate states including:
      a first intermediate state in which the first text has a first intermediate set of display property values that are between the first set of display property values and the second set of display property values; and
      a second intermediate state in which the first text has a second intermediate set of display property values that are between the first intermediate set of display property values and the second set of display property values.

2. The method of claim 1, wherein:
the electronic device includes a touch-sensitive surface;
the user input includes a contact on the touch-sensitive surface; and
the one or more properties of the text object are varied at a rate that is determined based on a characteristic of the contact on the touch-sensitive surface.

3. The method of claim 2, wherein the characteristic of the contact is a rate of movement of the contact.

4. The method of claim 1, wherein:
the electronic device includes a touch-sensitive surface;
the user input includes a contact on the touch-sensitive surface; and
the one or more properties of the text object are varied in accordance with a position of the contact on the touch-sensitive surface.

5. The method of claim 1, wherein:
the electronic device includes a touch-sensitive surface;
the user input includes a contact on the touch-sensitive surface; and
the one or more properties of the text object are varied in accordance with an amount of movement of the contact on the touch-sensitive surface.

6. The method of claim 5, wherein moving the entire text object from the first location, at which the first text has the first set of display property values, to the second location, at which the first text has the second set of display property values includes:
moving the entire text object from the first location, at which the first text has the first set of display property values, to the second location, at which the first text has the second set of display property values at a rate that is determined based on a rate of the movement of the contact on the touch-sensitive surface.

7. The method of claim 1, wherein the one or more display property values that are varied include a stroke width for letters in the first text.

8. The method of claim 1, wherein the one or more display property values that are varied include a letter spacing for letters in the first text.

9. The method of claim 1, wherein the one or more display property values that are varied include a font size for letters in the first text.

10. The method of claim 1, wherein legibility of the first text is maintained as the one or more display property values are continuously varied.

11. The method of claim 1, wherein the electronic device includes a touch-sensitive surface and the user input is a tap gesture on the touch-sensitive surface.

12. The method of claim 11, wherein the tap gesture is detected at a location on the touch-sensitive surface that corresponds to the text object.

13. The method of claim 11, wherein the tap gesture is detected at a location on the touch-sensitive surface that corresponds to a location on the display that is away from the text object.

14. The method of claim 1, wherein:
at the first location, the text object is associated with a selectable control; and
at the second location, the text object is not associated with a selectable control.

15. The method of claim 1, wherein:
at the first location, the text object is not associated with a selectable control; and
at the second location, the text object is associated with a selectable control.

16. A non-transitory computer readable storage medium storing one or more programs, the one or more programs comprising instructions which, when executed by an electronic device with a display, cause the electronic device to:
  display a first user interface in a hierarchy of user interfaces, wherein the first user interface includes a text object displayed at a first location in the first user interface, the text object including first text having a first set of display property values;
  while continuously displaying the text object:
    detect a user input;
    in response to detecting the user input, transition to a second user interface in the hierarchy of user interfaces, including:
      moving the entire text object from the first location, at which the first text has the first set of display property values, to a second location, at which the first text has a second set of display property values;
      varying, as the entire text object moves from the first location to the second location, one or more properties of the continuously displayed text object, including a font color of the text object, from the first set of display property values to the second set of display property values through a plurality of intermediate states, the plurality of intermediate states including:
        a first intermediate state in which the first text has a first intermediate set of display property values that are between the first set of display property values and the second set of display property values; and
        a second intermediate state in which the first text has a second intermediate set of display property values that are between the first intermediate set of display property values and the second set of display property values.

17. The non-transitory computer readable storage medium of claim 16, wherein:
the electronic device includes a touch-sensitive surface;
the user input includes a contact on the touch-sensitive surface; and
the one or more properties of the text object are varied at a rate that is determined based on a characteristic of the contact on the touch-sensitive surface.

18. The non-transitory computer readable storage medium of claim 17, wherein the characteristic of the contact is a rate of movement of the contact.

19. The non-transitory computer readable storage medium of claim 16, wherein:
the electronic device includes a touch-sensitive surface;
the user input includes a contact on the touch-sensitive surface; and
the one or more properties of the text object are varied in accordance with a position of the contact on the touch-sensitive surface.

20. The non-transitory computer readable storage medium of claim 16, wherein:
the electronic device includes a touch-sensitive surface;
the user input includes a contact on the touch-sensitive surface; and
the one or more properties of the text object are varied in accordance with an amount of movement of the contact on the touch-sensitive surface.

21. The non-transitory computer readable storage medium of claim 20, wherein moving the entire text object from the first location, at which the first text has the first set of display property values, to the second location, at which the first text has the second set of display property values includes:
moving the entire text object from the first location, at which the first text has the first set of display property values, to the second location, at which the first text has the second set of display property values at a rate that is determined based on a rate of the movement of the contact on the touch-sensitive surface.

22. The non-transitory computer readable storage medium of claim 16, wherein the one or more display property values that are varied include a stroke width for letters in the first text.

23. The non-transitory computer readable storage medium of claim 16, wherein the one or more display property values that are varied include a letter spacing for letters in the first text.

24. The non-transitory computer readable storage medium of claim 16, wherein the one or more display property values that are varied include a font size for letters in the first text.

25. The non-transitory computer readable storage medium of claim 16, wherein legibility of the first text is maintained as the one or more display property values are continuously varied.

26. The non-transitory computer readable storage medium of claim 16, wherein the electronic device includes a touch-sensitive surface and the user input is a tap gesture on the touch-sensitive surface.

27. The non-transitory computer readable storage medium of claim 26, wherein the tap gesture is detected at a location on the touch-sensitive surface that corresponds to the text object.

28. The non-transitory computer readable storage medium of claim 26, wherein the tap gesture is detected at a location on the touch-sensitive surface that corresponds to a location on the display that is away from the text object.

29. The non-transitory computer readable storage medium of claim 16, wherein:
at the first location, the text object is associated with a selectable control; and
at the second location, the text object is not associated with a selectable control.

30. The non-transitory computer readable storage medium of claim 16, wherein:
at the first location, the text object is not associated with a selectable control; and
at the second location, the text object is associated with a selectable control.

31. An electronic device, comprising:
a display;
one or more processors;
memory; and
one or more programs, wherein the one or more programs are stored in the memory and configured to be executed by the one or more processors, the one or more programs including instructions for:
displaying a first user interface in a hierarchy of user interfaces, wherein the first user interface includes a text object displayed at a first location in the first user interface, the text object including first text having a first set of display property values;
while continuously displaying the text object:
detecting a user input;
in response to detecting the user input, transitioning to a second user interface in the hierarchy of user interfaces, including:
moving the entire text object from the first location, at which the first text has the first set of display property values, to a second location, at which the first text has a second set of display property values;
varying, as the entire text object moves from the first location to the second location, one or more properties of the continuously displayed text object, including a font color of the text object, from the first set of display property values to the second set of display property values through a plurality of intermediate states, the plurality of intermediate states including:
a first intermediate state in which the first text has a first intermediate set of display property values that are between the first set of display property values and the second set of display property values; and
a second intermediate state in which the first text has a second intermediate set of display property values that are between the first intermediate set of display property values and the second set of display property values.

32. The electronic device of claim 31, wherein:
the electronic device includes a touch-sensitive surface;
the user input includes a contact on the touch-sensitive surface; and
the one or more properties of the text object are varied at a rate that is determined based on a characteristic of the contact on the touch-sensitive surface.

33. The electronic device of claim 32, wherein the characteristic of the contact is a rate of movement of the contact.

34. The electronic device of claim 31, wherein:
the electronic device includes a touch-sensitive surface;
the user input includes a contact on the touch-sensitive surface; and the one or more properties of the text object are varied in accordance with a position of the contact on the touch-sensitive surface.

35. The electronic device of claim 31, wherein:
the electronic device includes a touch-sensitive surface;
the user input includes a contact on the touch-sensitive surface; and
the one or more properties of the text object are varied in accordance with an amount of movement of the contact on the touch-sensitive surface.

36. The electronic device of claim 35, wherein moving the entire text object from the first location, at which the first text has the first set of display property values, to the second location, at which the first text has the second set of display property values includes:
moving the entire text object from the first location, at which the first text has the first set of display property values, to the second location, at which the first text has the second set of display property values at a rate that is determined based on a rate of the movement of the contact on the touch-sensitive surface.

37. The electronic device of claim 31, wherein the one or more display property values that are varied include a stroke width for letters in the first text.

38. The electronic device of claim 31, wherein the one or more display property values that are varied include a letter spacing for letters in the first text.

39. The electronic device of claim 31, wherein the one or more display property values that are varied include a font size for letters in the first text.

40. The electronic device of claim 31, wherein legibility of the first text is maintained as the one or more display property values are continuously varied.

41. The electronic device of claim 31, wherein the electronic device includes a touch-sensitive surface and the user input is a tap gesture on the touch-sensitive surface.

42. The electronic device of claim 41, wherein the tap gesture is detected at a location on the touch-sensitive surface that corresponds to the text object.

43. The electronic device of claim 41, wherein the tap gesture is detected at a location on the touch-sensitive surface that corresponds to a location on the display that is away from the text object.

44. The electronic device of claim 31, wherein:
at the first location, the text object is associated with a selectable control; and
at the second location, the text object is not associated with a selectable control.

45. The electronic device of claim 31, wherein:
at the first location, the text object is not associated with a selectable control; and
at the second location, the text object is associated with a selectable control.

* * * * *